US009789467B2

(12) United States Patent
Mori et al.

(10) Patent No.: US 9,789,467 B2
(45) Date of Patent: Oct. 17, 2017

(54) COMPOSITE MATERIAL, ELECTRODE FILM AND METHOD FOR PRODUCING THE SAME, ELECTRODE TERMINAL AND METHOD FOR PRODUCING THE SAME, SUBSTRATE AND METHOD FOR PRODUCING THE SAME, AND BONDING MATERIAL AND METHOD FOR PRODUCING SUBSTRATE BY BONDING SPLIT PARTS TOGETHER WITH BONDING MATERIAL

(71) Applicants: Rentaro Mori, Kasugai (JP); Sumio Kamiya, Toyota (JP); Yukihiro Kato, Okazaki (JP); Susumu Sarai, Miyoshi (JP)

(72) Inventors: Rentaro Mori, Kasugai (JP); Sumio Kamiya, Toyota (JP); Yukihiro Kato, Okazaki (JP); Susumu Sarai, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 123 days.

(21) Appl. No.: 14/417,875

(22) PCT Filed: Jul. 9, 2013

(86) PCT No.: PCT/JP2013/068702

§ 371 (c)(1),
(2) Date: Jan. 28, 2015

(87) PCT Pub. No.: WO2014/045681

PCT Pub. Date: Mar. 27, 2014

(65) Prior Publication Data

US 2015/0158016 A1    Jun. 11, 2015

(30) Foreign Application Priority Data

Sep. 20, 2012 (JP) ................................ 2012-207128

(51) Int. Cl.
*B01D 50/00* (2006.01)
*B01J 23/28* (2006.01)
(Continued)

(52) U.S. Cl.
CPC .......... *B01J 23/28* (2013.01); *B01D 46/2418* (2013.01); *B01D 53/94* (2013.01); *B01J 23/40* (2013.01);
(Continued)

(58) Field of Classification Search
CPC ........ F01N 3/3026; F01N 3/28; B01D 53/94; B01J 23/28; B01J 35/94; Y02T 10/26
(Continued)

(56) References Cited

U.S. PATENT DOCUMENTS 5,965,051 A     10/1999 Hirayama et al.
2002/0185485 A1*  12/2002 Radmacher ............. F23Q 7/001
                                                                 219/270

(Continued)

FOREIGN PATENT DOCUMENTS

JP     58-174217      10/1983
JP     8-198680       8/1996
(Continued)

*Primary Examiner* — Tom P Duong
(74) *Attorney, Agent, or Firm* — Finnegan, Henderson, Farabow, Garrett & Dunner, LLP

(57) ABSTRACT

Provided are a composite material that has lower volume resistivity in comparison with SiC, SiC—Si, and the like, which are materials for forming constituent elements of an EHC, has low temperature dependence of volume resistivity, and thus is able to form a constituent element of a high-performance EHC; an electrode film, an electrode terminal, and a honeycomb substrate that are constituent elements of an EHC formed with such composite material, and a method for producing them. The composite material contains $MoSi_2$ and at least one of Si or SiC, and is a material for forming (Continued)

a constituent element of an electrically heated catalytic converter. An electrode film 2, an electrode terminal 3, and a substrate 1 are produced from such composite material.

1 Claim, 43 Drawing Sheets

(51) Int. Cl.
*B01J 27/224* (2006.01)
*B01J 35/04* (2006.01)
*F01N 3/20* (2006.01)
*F01N 3/28* (2006.01)
*B01J 23/40* (2006.01)
*B01D 53/94* (2006.01)
*B01D 46/24* (2006.01)

(52) U.S. Cl.
CPC ............ *B01J 27/224* (2013.01); *B01J 35/04* (2013.01); *F01N 3/2026* (2013.01); *F01N 3/2828* (2013.01); *Y02T 10/26* (2013.01)

(58) Field of Classification Search
USPC ............................................ 422/174; 55/523
See application file for complete search history.

(56) References Cited

U.S. PATENT DOCUMENTS

| 2009/0155527 | A1 | 6/2009 | Kawai et al. |
| 2010/0308849 | A1* | 12/2010 | Bouteiller ............. F01N 3/0222 324/700 |
| 2012/0011834 | A1* | 1/2012 | Sobue ................... F01N 3/2013 60/300 |
| 2012/0076699 | A1 | 3/2012 | Ishihara |

FOREIGN PATENT DOCUMENTS

| JP | 10-152378 | 6/1998 |
| JP | 10-287937 | 10/1998 |
| JP | 2000-302573 | 10/2000 |
| JP | 2005-149973 | 6/2005 |
| JP | 2009-143762 | 7/2009 |
| JP | 2011-194323 | 10/2011 |
| JP | 2011-212577 | 10/2011 |
| JP | 2011-246340 | 12/2011 |
| JP | 2012-92821 | 5/2012 |
| JP | 2012-106223 | 6/2012 |
| JP | 2012-157803 | 8/2012 |

* cited by examiner (a)

(Before Oxidation Treatment)

(After Oxidation Treatment)

(b)

(Before Oxidation Treatment)

(After Oxidation Treatment)

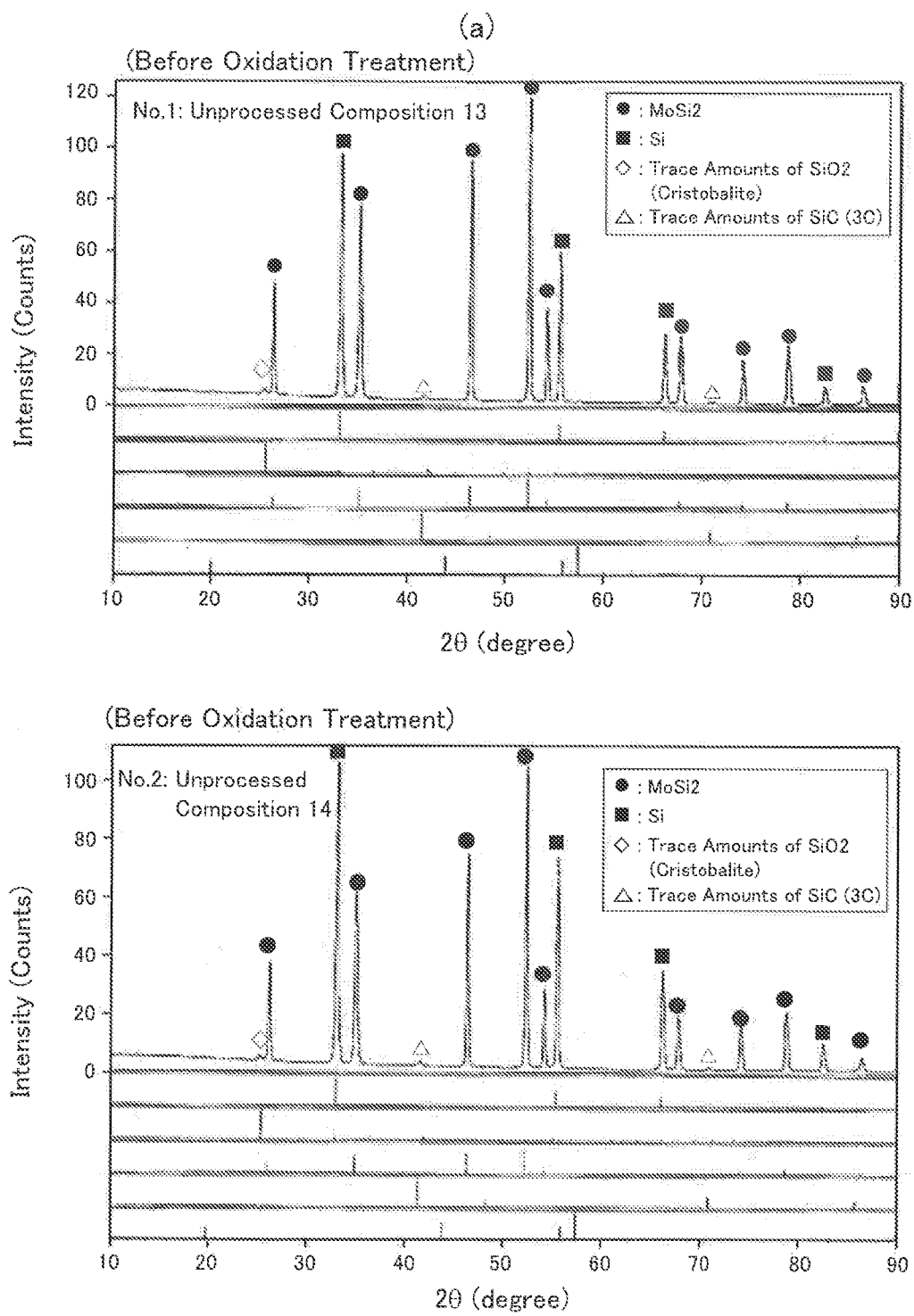

(a)

(Before Oxidation Treatment)

(Before Oxidation Treatment)

(a)

(b)

(a)

(b)

(a)

(b)

(a)

(b)

(a)

(b)

(a)

(b)

(c)

(d)

(e)

(f)

(g)

(h)

(a)

(b)

(a)

(b)

Pore Distribution Curve of Baked Body of Composition No. 2

(a)

(b)

(c)

(d)

(g)

(h)

COMPOSITE MATERIAL, ELECTRODE FILM AND METHOD FOR PRODUCING THE SAME, ELECTRODE TERMINAL AND METHOD FOR PRODUCING THE SAME, SUBSTRATE AND METHOD FOR PRODUCING THE SAME, AND BONDING MATERIAL AND METHOD FOR PRODUCING SUBSTRATE BY BONDING SPLIT PARTS TOGETHER WITH BONDING MATERIAL

CROSS-REFERENCE TO RELATED APPLICATIONS

This application is a national phase application of International Application No. PCT/JP2013/068702, filed Jul. 9, 2013, and claims the priority of Japanese Application No. 2012-207128, filed Sep. 20, 2012, the content of both of which is incorporated herein by reference.

TECHNICAL FIELD

The present invention relates to a composite material, which is a material for forming a constituent element of an electrically heated catalytic converter provided in an exhaust gas exhaust system; an electrode film, an electrode terminal, a substrate, and a bonding material that are formed with such composite material; and a method for producing them.

BACKGROUND ART

In a variety of industries, a variety of attempts has been made worldwide to reduce environmental impacts and burdens. In particular, in the automobile industry, development for promoting the spread of not only fuel-efficient gasoline engine vehicles, but also eco-cars, such as hybrid vehicles or electric vehicles, as well as for further increasing the performance of such vehicles has been advanced day by day.

By the way, an exhaust gas exhaust system, which connects an engine in the vehicle and a muffler, may sometimes have mounted thereon an electrically heated catalytic converter for, in addition to purifying exhaust gas at room temperature, purifying exhaust gas when the temperature is low by activating a catalyst as quickly as possible through electrical heating. Such an electrically heated catalytic converter has a configuration in which, for example, a pair of electrodes are attached to a honeycomb catalyst, which is arranged in the exhaust gas exhaust system, and the pair of electrodes are connected with an external circuit having a power supply, so that the honeycomb catalyst is heated when electricity is conducted through the electrodes, and thus, the activity of the honeycomb catalyst is increased and exhaust gas that passes through the honeycomb catalyst is detoxified (i.e., electrically heated catalytic converter: EHC).

A typical configuration of the aforementioned electrically heated catalytic converter will be described. The electrically heated catalytic converter may include an outer tube (i.e., metal casing), a heat-generating honeycomb substrate, which has a catalyst coating layer arranged in the hollow space, an insulating mat (i.e., holding material) interposed between the outer tube and the substrate, a pair of electrodes that are attached to a region, which has no mat, of the surface of the substrate, for example, and an external circuit that connects the pair of electrodes.

More specifically, the electrically heated catalytic converter includes an electrode film, which is adapted to diffuse an equal amount of current as soon as possible across the entire substrate, at a portion where each electrode is provided, and an electrode terminal that is attached to the surface of the substrate via an opening provided in the electrode film. An external electrode is attached to the electrode terminal, and an external circuit is formed with a cable connecting to a power supply. It should be noted that a configuration is also known in which an opening is not provided in an electrode film, but an electrode terminal is attached to the surface of the electrode film.

As described above, the EHC includes a honeycomb substrate on which a catalyst is supported, an electrode film formed on the surface of the substrate, an electrode terminal formed on the surface of the electrode film, and an external circuit. Among them, the types of the substrate can be largely divided into a metal substrate and a ceramic substrate. Of the two, it has been found that a metal substrate, which has too low resistance, is difficult to be applied to hybrid vehicles or plug-in hybrid vehicles. Thus, application of an EHC that has a substrate made of ceramics, such as SiC or a composite material of SiC and Si, which can be applied even to environmentally-friendly vehicles, has become the mainstream.

Herein, each of the aforementioned electrode film, electrode terminal, and honeycomb substrate that are the constituent elements of the EHC is required to have the following operation and function.

First, the electrode film is required to have a collector function, and to this end, the electrode film desirably has lower volume resistivity than the substrate. In addition, the electrode film is also required to have a function of diffusing current, and thus is desirably able to promote conduction of an equal amount of electricity across the entire substrate, and, to this end, the electrode film is desirably able to diffuse and rectify an equal amount of current across the entire substrate as soon as possible. In addition, as the electrode film is attached to the surface of the substrate, the interface of the electrode film with the substrate desirably has strength against thermal stress that is greater than or equal to the strength of the substrate. To this end, it is desirable that not only should the connection strength be high, but also the thermal expansion coefficients of the substrate and the electrode film be close to each other so as to reduce the amount of heat deformation as soon as possible. Further, considering the resistance against thermal shock, the thermal conductivity of the electrode film is desirably greater than or equal to that of the substrate, and from the perspective of ensuring the environmental resistance and reliability, a change in the volume resistance of the electrode film under a high-temperature oxidation atmosphere is desirably low.

The aforementioned operation and function that are required of the electrode film are also true of the electrode terminal.

Meanwhile, with respect to the honeycomb substrate that is a heat-generating body, the resistance value is desirably controllable to a value that is optimum for the intended use as well as the supplied current and voltage. In addition, the substrate desirably has low temperature dependence of resistance at −30 to 1000° C. that is the temperature range in which a catalyst is used, and desirably has little change in the resistance value. Further, the substrate desirably has high oxidation resistance, high resistance to thermal shock, and the ability to be easily bonded to the electrode film or the electrode terminal.

So far, it has been found that when each of the electrode film, the electrode terminal, and the honeycomb substrate, which are the constituent elements of the EHC, is molded using the aforementioned ceramics, such as SiC or a composite material of SiC and Si, it would be quite difficult to meet the aforementioned requests for each of the constituent elements. Thus, it is desired in the art to produce an EHC that can entirely satisfy the variety of the required performance by developing the technology of the material for forming each constituent element.

Herein, Patent Literature 1 discloses a honeycomb structure in which a cell wall of a substrate with a honeycomb structure made of SiC contains silicon, silicide, or a mixture of silicon and silicide with low electrical resistivity.

Patent Literature 2 discloses noble-metal-based composite powder containing 0.5 to 30 parts by weight of ceramic powder with respect to 100 parts by weight of metal powder, which includes 35 to 90 parts by weight of silver, 5 to 30 parts by weight of palladium, and 5 to 50 parts by weight of metallic silicon, and also describes producing an electrode, a noble metal-ceramic composite, a heater, a diesel particulate filter, or the like using such noble-metal-based composite powder. Further, an embodiment of Patent Literature 2 describes formulating silicon carbide powder (with a purity of greater than or equal to 99% and a grain size of less than or equal to 5 μm) or molybdenum disilicide (with a purity of greater than or equal to 99% and a grain size of less than or equal to 5 μm) as ceramic powder with respect to 100 parts by weight of metal powder.

Patent Literature 3 discloses a honeycomb structure having a cell formation part, a honeycomb body with an outer skin part of a cylindrical shape that covers the cell formation part, and a pair of electrodes that are arranged opposite to each other in the radial direction of the honeycomb body on the outer circumference of the outer skin of the honeycomb body, in which each electrode has formed thereon an electrode terminal at the central part in the circumferential direction of the electrode, and the thickness of each electrode is gradually decreased from its central part toward the outside along the circumferential direction of the honeycomb body. Patent Literature 3 describes that ceramics containing SiC or SiC—Si, which is obtained by impregnating SiC with Si (metallurgical silicon), is used as the material of each electrode. In addition, Patent Literature 3 describes that the honeycomb body (i.e., substrate) is made of porous ceramics containing SiC as a main component, and also describes that the electrode terminal is formed of the same material as the electrode.

Patent Literature 4 discloses a honeycomb structure including a porous partition wall, an outer wall located on the outmost circumference, a cylindrical honeycomb structure portion made of a ceramic material containing SiC particles that serve as an aggregate and Si that serves as a binder for binding the SiC particles, a pair of electrode portions arranged on the side face of the honeycomb structure portion, an electrode terminal protruding portion arranged on the surface of each of the pair of electrode portions, and a metal terminal portion made of a metal material electrically connected to each electrode terminal protruding portion, in which each of the pair of electrode portions and the electrode terminal protruding portions is made of a conductive ceramic material containing SiC or Si as a main component, and each electrode terminal protruding portion and each metal terminal portion are electrically connected via a brazing material.

Patent Literature 5 discloses a silicon carbide heat-generating body including a heat-generating member that contains SiC and generates heat when electricity is conducted therethrough, a SiC—$MoSi_2$ end portion member that contains a composite material of SiC and $MoSi_2$ and is produced as a separate member from the heat-generating member and is then coupled to the heat-generating member for conducting electricity through the heat-generating member, and a SiC—Si end portion member that contains a composite material of SiC and Si and is bonded to a further end portion side of the SiC—$MoSi_2$ end portion member, in which the content of $MoSi_2$ in the SiC—$MoSi_2$ end portion member is greater than or equal to 25 weight % and less than or equal to 35 weight %.

Herein, as a method for molding the SiC—$MoSi_2$ end portion member using an extrusion press, a mixture of SiC and an organic binder is molded into a pipe-shaped object using an extrusion press, and is then dried and baked to obtain a recrystallized SiC sintered body, and further, pores of the obtained SiC sintered body are melt-impregnated with $MoSi_2$.

In each of the techniques disclosed in Patent Literature 1 to 4 above, an electrode terminal, an electrode film, and the like are molded with ceramics such as SiC or SiC—Si. Thus, there still remains a problem that the aforementioned requests cannot be met.

In the technology disclosed in Patent Literature 5 above, the content of $MoSi_2$ that forms the SiC—$MoSi_2$ end portion member is greater than or equal to 25 weight % and less than or equal to 35 weight %. The grounds that the content of $MoSi_2$ is defined as above are estimated to be due to the fact that when the SiC—$MoSi_z$ end portion member is literally located at the end portion, and the content of $MoSi_2$ is set in a higher range than the upper limit of 35 weight %, the volume resistance of the end portion member would become too low, with the result that a heat-generating function as a heater will not be exerted.

However, the SiC—$MoSi_2$ member whose $MoSi_2$ content is defined in the range as low as less than or equal to 35 weight % is practically quite difficult to be applied as a constituent member of the EHC. This is because the constituent member of the EHC is required to have low volume resistivity and high oxidation resistance as described above.

CITATION LIST

Patent Literature

Patent Literature 1: JP 2012-106223 A
Patent Literature 2: JP H10-287937 A
Patent Literature 3: 2012-92821 A
Patent Literature 4: 2011-212577 A
Patent Literature 5: 2005-149973 A

SUMMARY OF INVENTION

Technical Problem

The present invention has been made in view of the foregoing problems. It is an object of the present invention to provide a composite material that has lower volume resistivity in comparison with SiC, SiC—Si, and the like, which are materials for forming constituent elements of an EHC, has low temperature dependence of volume resistivity, and thus is able form a constituent element of a high-performance EHC; an electrode film, an en electrode terminal, a honeycomb substrate, and a bonding material, which are constituent elements of an EHC formed with such composite material; and a method for producing the them.

Solution to Problem

In order to achieve the aforementioned object, the composite material in accordance with the present invention is a composite material that contains $MoSi_2$ and at least one of Si or SiC, and is a material for forming a constituent element of an electrically heated catalytic converter.

The composite material of the present invention is a composite material that further contains $MoSi_2$, replacing SiC or a composite material of SiC and Si, which is a conventional ceramic material for forming a variety of constituent elements of an EHC. More specifically, examples of the composite material of the present invention include a composite material of SiC and $MoSi_2$, a composite material of Si and $MoSi_2$, and a composite material of SiC, Si, and $MoSi_2$.

Such composite material basically contains a mixture of powder of each component. Such mixed powder is applied as slurry and is then baked, or a raw material of such mixed powder is molded and is then baked, or further alternatively, granulated powder is produced and is then baked, for example, to produce a constituent element of an EHC.

When a variety of constituent elements of an EHC is produced from the composite material of the present invention, it becomes possible to produce an electrode film and an electrode terminal with low volume resistivity, and produce a honeycomb substrate whose temperature dependence of volume resistivity is low. For example, as the collector functions of the electrode film and the electrode terminal improve, the amount of noble metal catalyst used can be reduced in comparison with that of the currently available EHC, resulting in a significant reduction of the production cost. Further, as the temperature dependence of the substrate is reduced, power to be applied can be controlled more simply and easily.

In the preferred embodiment of the composite material of the present invention, the content of $MoSi_2$ is greater than 35 mass %.

When a constituent element of an EHC is formed with a composite material in which the content of $MoSi_2$ is greater than 35 mass %, it is possible to suppress the volume resistance of the constituent element to a low level and improve the oxidation resistance. Thus, a high-performance EHC can be provided.

The present invention also relates to a variety of constituent elements of an EHC. One example thereof is an electrode film that is a constituent element formed with the aforementioned composite material and is provided on the surface of a honeycomb substrate with a catalyst coating layer.

Another example of a variety of constituent elements of an EHC in accordance with the present invention is an electrode terminal that is a constituent element formed with the aforementioned composite material and is provided on the surface of a honeycomb substrate with a catalyst coating layer.

Still another example of a variety of constituent elements of an EHC in accordance with the present invention is a honeycomb substrate with a catalyst coating layer, the honeycomb substrate being a constituent element formed with the aforementioned composite material.

Further another example of a variety of constituent elements of an EHC in accordance with the present invention is a bonding material used to form a honeycomb structure substrate with a catalyst coating layer, by bonding split parts of the honeycomb substrate together.

As described above, an EHC having a variety of constituent elements of the present invention includes a configuration that has an electrode film of the present invention and a conventional electrode terminal and substrate (each of which is molded with ceramics such as SiC or Si), a configuration that has an electrode terminal of the present invention and a conventional electrode film and substrate, a configuration that has an electrode film and electrode terminal of the present invention and a conventional substrate, and a configuration that has an electrode film, an electrode terminal, and a substrate of the present invention. Such an EHC can be applied not only to gasoline vehicles or diesel vehicles but also to hybrid vehicles or plug-in hybrid vehicles.

The substrate herein is a porous substrate that is electrically conductive, has a heat-generating property, and has a number of pores that are triangular, square, or hexagonal in shape. Such substrate is typically called a honeycomb structure. The surface of a number of cells of the substrate has formed thereon a catalyst coating layer in which a noble-metal catalyst, such as platinum or palladium, is supported on an oxide support, such as alumina. It should be noted that examples of such substrate include not only a substrate that is integrally molded but also a substrate that is obtained by bonding a plurality of split parts together with the aforementioned bonding material of the present invention.

As each of the electrode film and the electrode terminal of the present invention is formed with the aforementioned composite material of the present invention, a high collector function as well as excellent diffusivity of current is provided, and thus, uniform electrical conduction across the entire substrate can be promoted. Further, as the connection strength of the electrode film or the electrode terminal with the substrate is high, and the thermal expansion coefficient of the electrode film or the electrode terminal can be made close to that of the substrate, the amount of heat deformation with respect to the substrate can be reduced as soon as possible.

As the honeycomb substrate of the present invention is formed with the aforementioned composite material of the present invention, the temperature dependence of resistance is low at $-30$ to $1000°$ C. that is the temperature range in which a catalyst is used, and the amount of change in the resistance value is thus small. Further, the substrate has high oxidation resistance and high resistance to thermal shock, and can be easily bonded to an electrode film or an electrode terminal.

The present invention also relates to a method for producing a variety of constituent elements of the EHC of the present invention. One example thereof is a method for producing an electrode film that includes producing slurry from mixed powder, which contains a mixture of $MoSi_2$ powder and at least one of Si powder or SiC powder, an organic binder, and a solvent; coating a surface of a substrate with the slurry; degreasing the solvent; and baking the slurry to produce an electrode film.

Another example of the method for producing a variety of constituent elements of the EHC in accordance with the present invention is a method for producing an electrode terminal that includes producing slurry from mixed powder, which contains a mixture of $MoSi_2$ powder and at least one of Si powder or SiC powder, an organic binder, and a solvent; molding granulated powder obtained by spray-drying the slurry into the shape of an electrode terminal; degreasing the solvent; and baking the slurry to produce an electrode terminal.

Still another example of the method for producing a variety of constituent elements of the EHC in accordance with the present invention is a method for producing a honeycomb substrate that includes producing a raw material from mixed powder, that contains $MoSi_2$ powder and at least one of Si powder or SiC powder, an organic binder, and a solvent; molding the raw material into a honeycomb structure; degreasing the solvent; and baking the raw material to produce a honeycomb substrate.

Further another example of the method for producing a variety of constituent elements of the EHC in accordance with the present invention is a method for producing a substrate, the substrate having split parts bonded together with a bonding material, the method including producing slurry from mixed powder, which contains $MoSi_2$ powder and at least one of Si powder or SiC powder, an organic binder, and a solvent; applying the slurry to the surfaces of the end portions of a plurality of split parts of a substrate to be bonded and causing the split parts to abut each other at the end portions to be bonded and thus temporarily joining them; degreasing the solvent; and baking the slurry to produce a substrate with the bonding material and the split parts.

Advantageous Effects of Invention

As can be understood from the foregoing descriptions, according to the composite material of the present invention as well as an electrode film, an electrode terminal, and a honeycomb substrate, which are constituent elements of an EHC each formed with such composite material, a variety of constituent elements is formed with a composite material containing $MoSi_2$ and at least one of Si or SiC. Thus, it is possible to produce an electrode film and an electrode terminal with low volume resistivity and produce a honeycomb substrate with low temperature dependence of volume resistivity. As the volume resistivities of the electrode film and the electrode terminal are reduced, the collector functions improve, and thus, the amount of noble metal catalyst used can be reduced, resulting in a significant reduction of the production cost. In addition, as the temperature dependence of the substrate is reduced, power to be applied can be controlled more simply and easily. Further, in a configuration in which a substrate is made of split parts, it is possible to, by using a bonding material that is a constituent element of an EHC formed with the composite material of the present invention, provide high reliability of bonding with the substrate and form a substrate with high bonding strength.

DESCRIPTION OF EMBODIMENTS

Hereinafter, embodiments of an electrically heated catalytic converter (EHC) that has an electrode film, an electrode terminal, and a substrate each formed of a composite material, and a method for producing an electrode film and the like will be described with reference to the drawings. In addition, embodiments of an EHC with a substrate will also be described, the substrate having split parts, which are formed of composite materials, bonded together with a bonding material that is also formed of a composite material. Although the drawings illustrate examples in which each of an electrode film, an electrode terminal, and a substrate is formed of a composite material of the present invention, it is needless to mention that the EHC may also be the one in which one or two of such constituent elements is/are formed of a composite material of the present invention.

Embodiment 1 of Electrically Heated Catalytic Converter

Figure 1:
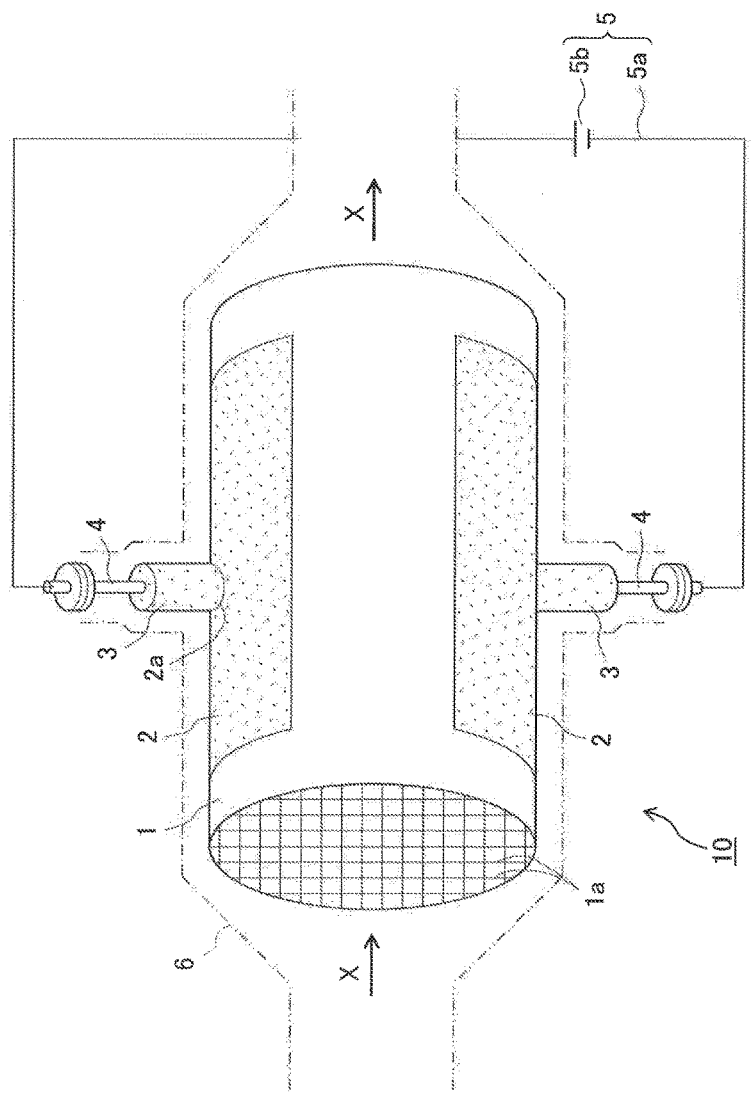
FIG. 1 is a schematic view illustrating Embodiment 1 of an electrically heated catalytic converter (EHC) having an electrode film, an electrode terminal, and a substrate each formed of a composite material of the present invention.

FIG. 1 is a schematic view illustrating Embodiment 1 of an electrically heated catalytic converter (EHC) having an electrode film, an electrode terminal, and a substrate each formed of a composite material of the present invention.

An electrically heated catalytic converter 10 shown in FIG. 1 is incorporated in an exhaust gas exhaust system, more specifically, in an exhaust system in which an engine (not shown), the electrically heated catalytic converter 10 (i.e., EHC), a three-way catalytic converter (not shown), and a sub-muffler and a main muffler (not shown) are sequentially arranged and mutually connected with system pipes. When the engine is started, a noble-metal catalyst that forms the electrically heated catalytic converter 10 is heated to a predetermined temperature as soon as possible, so that exhaust gas circulated from the engine is purified with the noble-metal catalyst, while exhaust gas that has not been fully purified with the electrically heated catalytic converter 10 is purified with a three-way catalytic purifier that is located downstream of the electrically heated catalytic converter 10.

The electrically heated catalytic converter 10 generally includes a metal outer tube 6 (i.e., metal casing), a honeycomb substrate 1 that is fixed to the hollow space of the outer tube 6 via a mat (a holding member; not shown) and has a catalyst coating layer (not shown) on the surface of a cell wall 1a, a pair of electrode films 2,2 that are arranged on the surface of the substrate 1 and form a pair of electrodes, external electrodes 4,4 mounted on the respective electrode terminals 3,3, and an external circuit 5 that includes a cable 51, which connects the external electrodes 4,4, and a power supply 5b provided on the cable 5a.

The outer tube 6 may have any shape as long as it is a cylindrical shape with a hollow space that can accommodate the substrate 1 with a heat-generating property therein. Thus, an outer tube with a cylindrical shape, a polygonal cylindrical shape, or the like can be applied in accordance with the shape of the substrate 1 accommodated therein.

The substrate 1 has formed therein an exhaust gas flow channel with a honeycomb structure that includes a number of cell walls 1a, and a catalyst coating layer (not shown) is formed on each cell wall 1a. The catalyst coating layer is obtained by causing a platinum-group element, such as palladium (Pd), rhodium (Rh), or platinum (Pt), a platinum-group element compound, noble metal, or a compound thereof to be supported on oxide such as alumina ($Al_2O_3$) or ceria-zirconia composite oxide ($CeO_2$—$ZrO_2$), and adjusting them with an alumina sol or water to obtain slurry, and then applying the slurry to the skeleton of the substrate using an impregnation method, an ion exchange method, a sol-gel method, a wash-coat method, or the like.

Exhaust gas that has flowed from the upstream side of the exhaust gas exhaust system (in the x-direction) is purified by an activated noble-metal catalyst during the process in which the exhaust gas circulates though the exhaust gas flow channel that includes a number of cell walls 1a. Then, the purified exhaust gas circulates toward the downstream side of the exhaust system from the electrically heated catalytic converter 10.

An electrode film 2 is formed at a portion of the surface of the substrate 1 where each of a pair of upper and lower electrodes is formed, and an electrode terminal 3 is fixed on the surface of the substrate 1 via an opening 2a that is provided in the electrode film 2.

An external electrode 4 is mounted on the electrode terminal 3, and the cable 5a with the power supply 5b provided thereon is connected to the two, upper and lower external electrodes 4,4, thereby forming the external circuit 5.

FIG. 2a is a perspective view illustrating a flow of applied current, and FIG. 2b is a cross-sectional view illustrating a flow of applied current. When the power supply 5b is turned on to start the engine, electricity is conducted through the electrode terminals 3,3 located at the center of the substrate 1 (in the Y1 direction), thereby forming, as shown in FIG. 2b, a path that allows current to flow through a channel across the diameter in the cross-section of the substrate 1 (in the Y5 direction), and a path that allows current to flow linearly in the cross-section of the substrate 1 (in the Y6 direction) via the electrode film 2 around the electrode terminal 3 (in the Y2 direction), and allows current to circulate through the opposite electrode terminal 3 (in the Y4 direction) via the opposite electrode film 2 (in the Y3 direction).

As described above, the electrode film 2 has a function of diffusing current, and is adapted to conduct an equal amount of electricity across the entire substrate 1 as soon as possible, and thus diffuse and rectify an equal amount of current.

It should be noted that an insulating mat (not shown) interposed between the outer tube 6 and the substrate 1 can be formed with a ceramic fiber sheet that contains alumina or the like that is excellent not only in the insulating property, but also in the heat resistance property and strength.

Embodiment 2 of Electrically Heated Catalytic Converter

Figure 3:
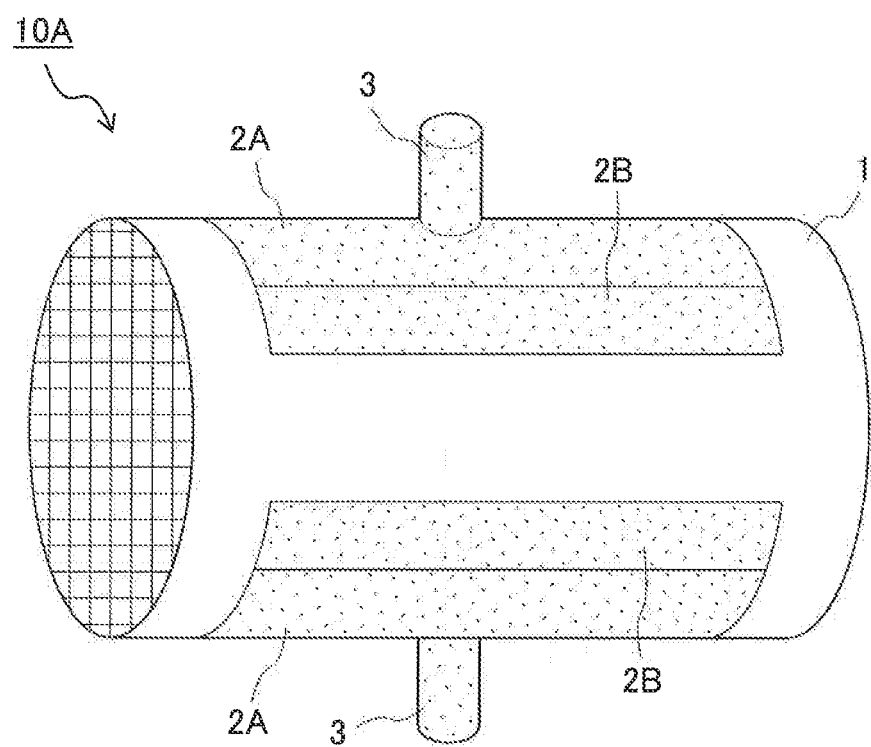
FIG. 3 is a schematic view illustrating Embodiment 2 of an electrically heated catalytic converter (EHC).

FIG. 3 is a schematic view illustrating Embodiment 2 of the electrically heated catalytic converter (EHC). An electrically heated catalytic converter 10A shown in FIG. 3 has formed thereon electrode films that include two types of electrode films 2A,2B with different resistance. An electrode film with relatively low resistance is used for the electrode film 2A on the center side on the electrode terminal side 3.

As the electrode film 2A on the electrode terminal 3 side into/from which current flows is adjusted to have relatively lower resistance than the electrode film 2B on the outer side, diffusion of current across a wide range can be promoted.

Embodiment 3 of Electrically Heated Catalytic Converter

Figure 4:
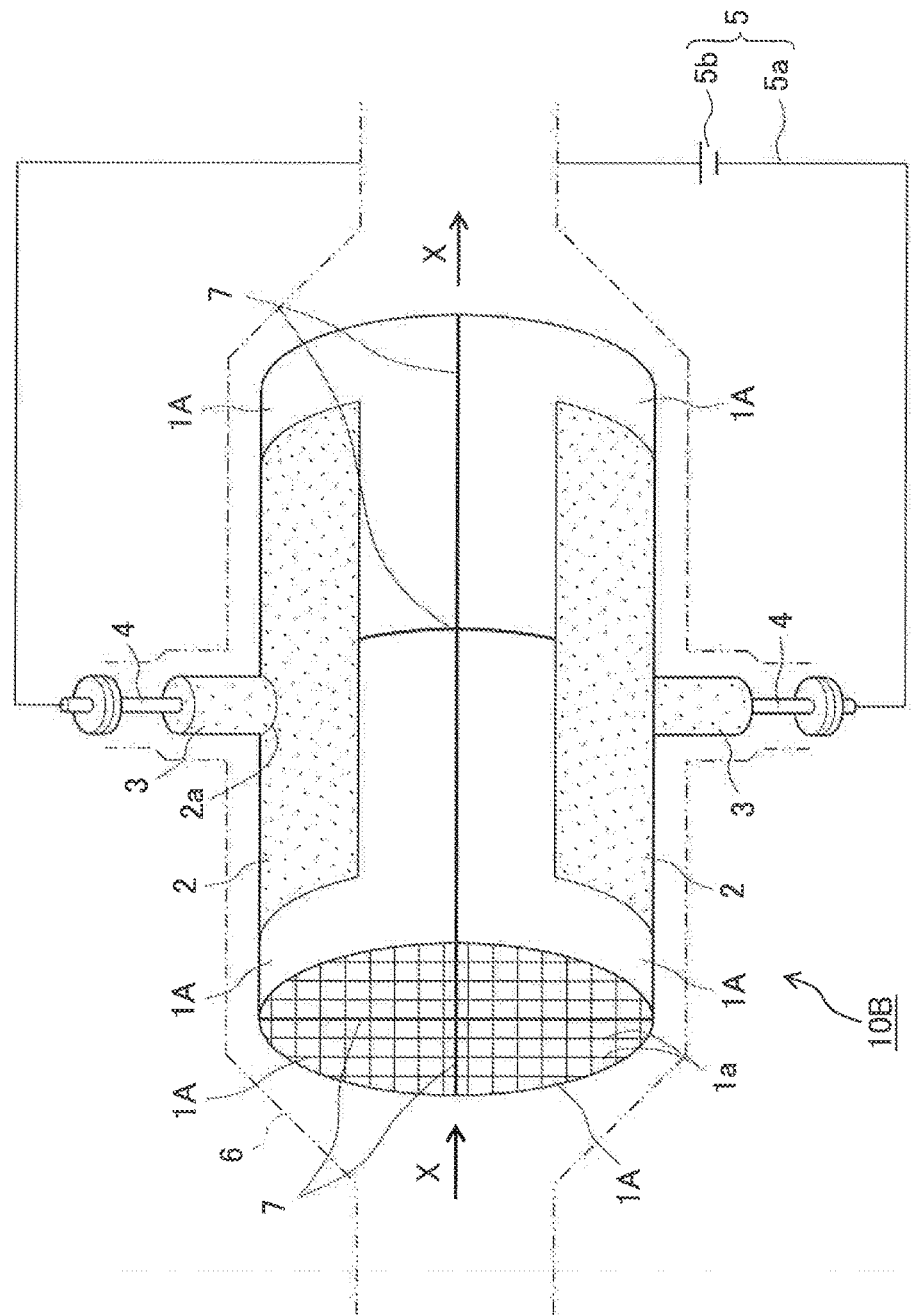
FIG. 4 is a schematic view illustrating Embodiment 3 of an electrically heated catalytic converter (EHC).

FIG. 4 is a schematic view illustrating Embodiment 3 of an electrically heated catalytic converter (EHC). An electrically heated catalytic converter 10B shown in FIG. 4 is obtained by bonding the end portions of eight split parts 1A to be bonded using a bonding material 7 formed of a composite material.

When the composite materials of both the bonding material 7 and the split parts 1A are adjusted so that the bonding material 7 and the split parts 1A have about the same volume resistivity, the entire substrate can be surely and uniformly heated. In addition, when the composite materials are adjusted so that the thermal expansion coefficient of the bonding material 7 becomes less than or equal to those of the split parts 1A, the amount of heat deformation of the split parts of the substrate against thermal stress can be reduced, whereby the reliability of bonding can be ensured.

(Composite Materials, and Electrode Film, Electrode Terminal, Substrate, and Bonding Material Produced with Such Composite Materials)

Next, composite materials that are materials for producing an electrode film, an electrode terminal, a substrate, and a bonding material, the performance of an electrode film, an electrode terminal, a substrate, and a bonding material produced with such composite materials, and a method for producing them will be described in detail.

[Regarding Composite Materials]

Each of materials for producing an electrode film, an electrode terminal, and a substrate, which are constituent elements of an EHC, is a composite material containing $MoSi_2$ and at least one of Si or SiC, and is a material for forming each constituent element of an electrically heated catalytic converter.

More specifically, examples of such composite materials include a composite material of SiC and $MoSi_2$, a composite material of Si and $MoSi_2$ (hereinafter referred to as a binary composite material), and a composite material of SiC, Si, and $MoSi_2$ (hereinafter referred to as a ternary composite material).

Each of such composite materials basically contains a mixture of powder of each component. Such mixed powder is applied as slurry and is then baked, or a raw material of such mixed powder is molded and is then baked, for example, to produce a constituent element of an EHC.

When a variety of constituent elements of an EHC is produced with such composite material, an electrode film and an electrode terminal with low volume resistivity can be produced, so that a honeycomb substrate with low temperature dependence of volume resistivity can be produced. For example, as the collector functions of the electrode film and the electrode terminal improve, the amount of noble metal catalyst used can be reduced in comparison with that of the currently available EHC, resulting in a significant reduction of the production cost. Further, as the temperature dependence of the substrate is reduced, power to be applied can be controlled more simply and easily.

The inventors produced a variety of binary composite materials, such as a composite material of SiC and $MoSi_2$ and a composite material of Si and $MoSi_2$, and ternary composite materials, such as a composite material of SiC, Si, and $MoSi_2$, and measured the physical properties of such composite materials. Table 1, Table 2, and Table 3 below show the measurement results of the composite materials.

It should be noted that the variety of physical property values greatly influence the conditions of the production process in which the composite materials are used. Thus, the measurement results herein are merely described as examples.

TABLE 1

Composite Material of Si and $MoSi_2$

| Composition No. | $MoSi_2$/Si Upper: Volume % Lower: Mass % | Baked Body Four-Point Flexural Strength (Room Temperature) (MPa) | Baked Body Thermal Expansion Coefficient ×10$^{-6}$ (cm/° C.) | Baked Body Volume Resistivity (Ω cm) (Room Temperature) | Baked Body Volume Density (g/cm$^3$) |
|---|---|---|---|---|---|
| — | 100/0 100/0 | | 8.3 | 2.2 × 10$^{-5}$ | |
| 3 | 90/10 96/4 | 58 | 6.7 | 8.4 × 10$^{-5}$ | 3.6 |
| 11 | 60/40 80/20 | 11 | 6.5 | 5.8 × 10$^{-3}$ | 2.3 |
| 12 | 50/50 73/27 | 17 | 6.1 | 2.4 × 10$^{-3}$ | 2.5 |
| 13 | 40/60 64/36 | 13 | 5.7 | 4.6 × 10$^{-2}$ | 2.2 |
| 14 | 30/70 54/46 | 10 | 5.2 | 4.0 × 10$^{-3}$ | 1.9 |
| 15 | 20/80 40/60 | 25 | 5.1 | 5.0 | 1.8 |
| 16 | 15/85 32/68 | 24 | 4.8 | 1.2 × 10 | 1.7 |
| 17 | 10/90 23/77 | 21 | 4.6 | 2.5 × 10 | 1.6 |
| — | 0/100 0/100 | | 3.9 | 1000 or less | |

TABLE 2

Composite Material of SiC, Si and $MoSi_2$

| Composition No. | $MoSi_2$/SiC/Si Upper: Volume % Lower: Mass % | Baked Body Four-Point Flexural Strength (Room Temperature) (MPa) | Baked Body Thermal Expansion Coefficient ×10$^{-6}$ (cm/° C.) | Baked Body Volume Resistivity (Ω cm) (Room Temperature) | Baked Body Volume Density (g/cm$^3$) |
|---|---|---|---|---|---|
| 2 | 40/30/30 60/23/17 | 23 | 7.3 | 2.2 × 10$^{-3}$ | 2.7 |
| 4 | 45/45/10 63/32/5 | 12 | 6.2 | 1.5 × 10$^{-2}$ | 2.4 |
| 5 | 50/40/10 67/28/5 | 16 | 5.7 | 5.7 × 10$^{-3}$ | 2.5 |
| 6 | 60/30/10 75/20/5 | 27 | 5.6 | 7.0 × 10$^{-4}$ | 2.7 |
| 7 | 70/20/10 83/12/5 | 34 | 5.4 | 3.6 × 10$^{-4}$ | 3.1 |
| 8 | 80/10/10 90/6/4 | 51 | 5.3 | 1.0 × 10$^{-4}$ | 3.3 |

TABLE 3

Composite Material of SiC, and $MoSi_2$

| Composition No. | $MoSi_2$/SiC Upper: Volume % Lower: Mass % | Baked Body Four-Point Flexural Strength (Room Temperature) (MPa) | Baked Body Thermal Expansion Coefficient ×10$^{-6}$ (cm/° C.) | Baked Body Volume Resistivity (Ω cm) (Room Temperature) | Baked Body Volume Density (g/cm$^3$) |
|---|---|---|---|---|---|
| — | 100/0 100/0 | | 8.3 | 2.2 × 10$^{-5}$ | |
| 21 | 70/30 82/18 | 32 | 7.6 | 1.0 × 10$^{-3}$ | 2.3 |
| 22 | 60/40 74/26 | 25 | 7.3 | 6.0 × 10$^{-3}$ | 2.7 |

TABLE 3-continued

Composite Material of SiC, and MoSi$_2$

| Composition No. | MoSi$_2$/ SiC Upper: Volume % Lower: Mass % | Baked Body Four-Point Flexural Strength (Room Temperature) (MPa) | Baked Body Thermal Expansion Coefficient ×10$^{-6}$ (cm/° C.) | Baked Body Volume Resistivity (Ω cm) (Room Temperature) | Baked Body Volume Density (g/cm$^3$) |
|---|---|---|---|---|---|
| 1 | 50/50 66/34 | 14 | 7.8 | $1.1 \times 10^{-3}$ | 2.5 |
| 23 | 40/60 56/44 | 12 | 6.5 | $2.0 \times 10^{-1}$ | 3.1 |
| 24 | 30/70 45/55 | 15 | 6.1 | 1.0 | 2.9 |
| 25 | 25/75 34/66 | 21 | 5.9 | 2.5 | 3.1 |
| — | 0/100 0/100 | | 4.5 | 10000 or less | |

[Regarding Electrode Film]

First, a method for producing an electrode film will be described. To be brief, this production method includes preparing the aforementioned binary or ternary composite material, making the composite material into slurry, applying the slurry to the surface of a substrate, drying the slurry and degreasing a solvent that forms the slurry, and baking the slurry to produce an electrode film on the surface of the substrate. The method will be hereinafter described in detail.

Each of MoSi raw material powder with an average grain size D of a divisor of 50 (μm) (e.g., about 2 μm), SiC raw material powder with an average grain size D of a divisor of 50 (μm) (e.g., about 2 μm), and Si raw material powder with an average grain size D of a divisor of 50 (μm) (e.g., about 1 μm) is weighed by a predetermined amount to produce a composite material that is uniformly mixed powder. It should be noted that the average grain size of each powder is not limited to several μm, and may be greater than or less than such value.

Next, an organic binder (i.e., PVA) is added into the mixed powder, and water is used as a solvent to produce slurry.

In order to mold an electrode film with a predetermined shape on a substrate, the substrate is coated with the slurry after it is masked. As the coating method herein, screen printing, bat-printing, brushing, or the like can be used. The viscosity and the like of the slurry are adjusted to adjust the film state such as the film thickness. It should be noted that when an electrode with a combined structure of an electrode film and an electrode terminal is molded as an electrode structure, the slurry may be applied and stuck such that it is interposed at the interface between the electrode terminal and the substrate so as to bond them together. Herein, in regard to the adjustment of the film thickness, an electrode film formed from a composite material containing MoSi$_2$ has an advantage in that the thickness of the film can be reduced. This is due to the fact that the volume resistivity is at an extremely low level of 8.4×10$^{-5}$ (Ωcm) (Composition No. 3) to 5.7×10$^{-3}$ (Ωcm) (Composition No. 5). Such volume resistivity allows formation of an electrode film as thin as about 10 to 150 μm. When the thickness of the electrode film is reduced as described above, a reduction in the thermal stress can be expected. Further, as an electrode film formed from a composite material containing MoSi$_2$ has a passivation formed on the surface thereof, oxidation resistance can also be expected, though it is not related to a reduction in the film thickness.

After the electrode film produced with the aforementioned method is applied to the surface of the substrate, water is evaporated at 100° C. for drying purposes to temporarily join the electrode film to the substrate.

Using the substrate with the produced electrode film thereon, degreasing is performed to remove the organic binder contained in the electrode. The degreasing conditions herein depend on the properties of the organic binder used, but degreasing is performed in a reduced-pressure atmosphere in the range of about 300 to 600° C.

Next, baking is performed on the substrate with the degreased electrode film, so that the electrode film is baked onto and bonded to the substrate. As the baking conditions herein, baking is performed under an inert atmosphere (e.g., under an Ar gas atmosphere) and, in a system that uses Si, at a temperature that is less than the melting point of Si (1414° C.) so that the electrode film is bonded to the substrate through welding of Si (e.g., in the range of 1000 to 1400 (° C.), or desirably in the range of 1200 to 1300 (° C.)). Meanwhile, in a system that does not use Si, baking is performed at a temperature that promotes sintering, for example, at 1200 to 1500° C.

Next, functions and performance that are required of the electrode film will be described. As the requirements for the electrode film, it is necessary to ensure (1) the function of a collector, (2) a function of diffusing current across the entire substrate, (3) reliability of the bonding strength between the electrode film and the substrate, and (4) environmental resistance and reliability.

(1) Regarding the function of a collector, the volume resistivity of the electrode film is desirably adjusted to be lower than that of the substrate. Specifically, the volume resistivity of the electrode film is adjusted to be lower than that of the substrate (several ten to several 10$^{-1}$ (Ωcm)) so that the electrode film will not generate heat.

Figure 2:
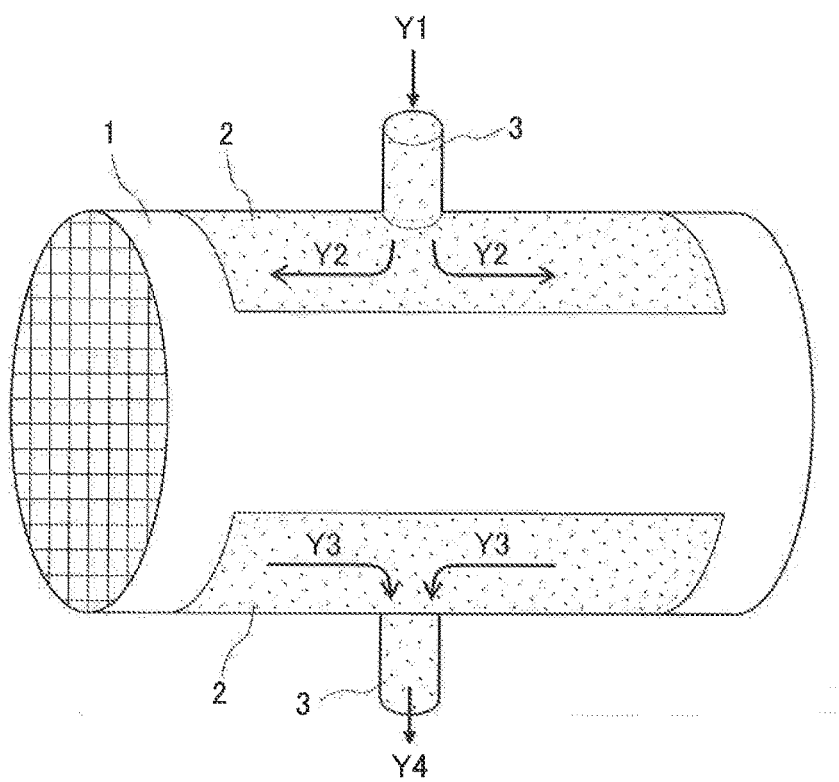
FIG. 2(a) is a perspective view illustrating a flow of applied current.
FIG. 2(b) is a cross-sectional view illustrating a flow of applied current.
Figure 2:
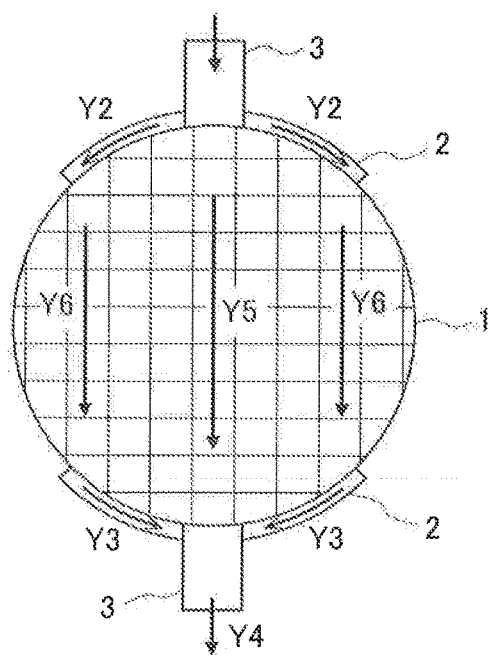

(2) Regarding the function of diffusing current across the entire substrate, when a converter is supposed in which electrode terminals (i.e., cylindrical terminals) are bonded to the side faces of a cylindrical honeycomb substrate on the opposite sides thereof, for example, to diffuse and rectify an equal amount of current across the entire substrate, it is possible to, as shown in FIG. 2, diffuse current through the terminals on the opposite sides as well as the side faces and form a path that allows current to flow through the channel across the diameter in the cross-section of the substrate, and a path that allows current to flow linearly in the cross-section of the substrate through the electrode films around the substrate. When the combined resistance of each of such paths is adjusted to an equal level, current can be rectified in the cross-section.

(3) Regarding the reliability of the bonding strength between the electrode film and the substrate, in order to ensure that the strength of the electrode film is at a level greater than or equal to that of the substrate, the four-point flexural strength of the electrode film is adjusted to be greater than or equal to that of the substrate (several 10 (MPa)), for example. When the strength is evaluated using component parts, a peel strength test is performed on the electrode film to check if a breakdown of the base material starts from the substrate.

In addition, in order to ensure the bonding strength against thermal stress, the thermal expansion coefficient of the electrode film is preferably set equal to that of the substrate. For example, when the substrate has a thermal expansion coefficient of 4.5×10$^{-6}$ (cm/° C.), film materials are adjusted so that the thermal expansion coefficient of the electrode film is in the range of 4.5 to 8.0×10$^{-6}$ (cm/° C.).

(4) Regarding the requirement of ensuring the environmental resistance and reliability, a material whose change in the volume resistance, when continuously exposed to the maximum temperature (about 950° C.) at which the electrode film is used as an EHC for a predetermined time, can be suppressed is applied to suppress a change in the volume resistance under a high-temperature oxidation atmosphere. In practice, it is desirable to select an applicable material in consideration of the volume resistivity of the electrode film that is required from the applied substrate.

Next, examples of the application of the electrode film will be described.

<Application to EHC of HV or PHV>

An EHC for HV or PHV is driven with a power supply voltage of a divisor of 100 (V) (e.g., 400 (V)) and an applied power of several (KW) (e.g., 7 (KW)). Therefore, the substrate is required to have a resistance of several 10 ($\Omega$) (e.g., 40 ($\Omega$)).

For example, when the resistance of the ceramic substrate is adjusted to 40 ($\Omega$) using a material with a volume resistivity of about 5 ($\Omega \cdot cm$), the volume resistance of each of the electrode terminal and the electrode film is preferably set lower than that of the substrate.

Specifically, when the electrode film is expected to have a current diffusion effect, provided that the resistance value of the electrode film 2A at the center is lower by 1 digit or more in Embodiment 2 shown in FIG. 3, and the resistance value of the electrode film is adjusted by taking the paths in the substrate into consideration, the volume resistivity of the electrode film 2B on the outer side is preferably less than or equal to that of the substrate.

As the composite materials that satisfy the aforementioned conditions among the composite materials shown in Tables 1 to 3 above, No. 1 to 8, No. 11 to 14, and No. 21 to 23 are preferable as the electrode film 2A at the center, while No. 15, 16, and 17 are preferable as the electrode film 2B on the outer side (for adjusting the paths).

<Application to EHC of Gasoline Vehicles or Diesel Vehicles>

In gasoline vehicles or diesel vehicles, an electrode film is driven with a power supply voltage of a divisor of 10 (V) (e.g., 48 (V)) and an applied power of several (KW) (e.g., 4 (KW)). Therefore, the substrate is required to have a resistance of less than or equal to 1 ($\Omega$) (e.g., 0.5 ($\Omega$)).

For example, when the resistance of the ceramic substrate is adjusted to 0.5 ($\Omega$) using a material with a volume resistivity of about 0.05 to 0.005 ($\Omega \cdot cm$), the volume resistance of each of the electrode terminal and the electrode film is preferably set lower than that of the substrate.

Specifically, when the electrode film is expected to have a current diffusion effect, provided that the resistance value of the electrode film 2A at the center is lower by 1 digit or more in Embodiment 2 shown in FIG. 3, and the resistance value of the electrode film is adjusted by taking the paths in the substrate into consideration, the volume resistivity of the electrode film 2B on the outer side is preferably less than or equal to that of the substrate.

As the composite materials that satisfy the aforementioned conditions among the composite materials shown in Tables 1 to 3 above, No. 3 and 6 to 8 are preferable as the electrode film 2A at the center, while No. 1, 2, 5, 11-13, 21, and 22 are preferable as the electrode film 2B on the outer side.

[Electrode Terminal]

First, a method for producing an electrode terminal will be described. To be brief, this production method includes preparing a composite material, making the composite material into slurry, spray-drying the slurry, granulating the slurry into the shape of an electrode terminal, drying the slurry and degreasing a solvent that forms the slurry, and baking the slurry to produce an electrode terminal. The method will be hereinafter described in detail.

Each of MoSi raw material powder with an average grain size D of a divisor of 50 ($\mu m$) (e.g., 6 $\mu m$), SiC raw material powder with an average grain size D of a divisor of 50 ($\mu m$) (e.g., 11 $\mu m$), and Si raw material powder with an average grain size D of a divisor of 50 ($\mu m$) (e.g., 8 $\mu m$) is weighed by a predetermined amount, and then, the powder is uniformly mixed through a wet-process. It should be noted that the average grain size of each powder is not limited to several $\mu m$, and may be greater than or less than such value.

Next, an organic binder (i.e., PVA) is added into the obtained mixed powder, and water is used as a solvent to produce slurry. Using the slurry, spherical granulated powder with an average grain size D50 of about 50 ($\mu m$) is produced with a spray dryer under predetermined conditions. It should be noted that the average grain size of the granulated powder is not limited to about 50 $\mu m$, and it is acceptable as long as particles with excellent moldability are used.

Next, the obtained granulated powder is molded into an electrode terminal with a predetermined shape. Such molding is performed through a die-press method, an extrusion molding method, or the like. The shape of the electrode terminal may be a cylindrical shape, a prismatic shape, an elliptic cylindrical shape, or the like, and may be any shape as long as it can exhibit a current collection function with respect to the shape of the honeycomb substrate.

Degreasing is performed to remove the organic binder in the obtained molded body. The degreasing conditions depend on the properties of the organic binder used, but degreasing is performed in a reduced-pressure atmosphere in the range of about 300 to 600 (° C.), for example.

The degreased molded body is baked to produce a sintered body of an electrode terminal with a desired shape. As the baking conditions herein, baking is performed under, after the pressure is reduced, an Ar gas atmosphere and, in a system that uses Si, at a temperature of 1350 to 1400° C., which is less than the melting point of Si (1414° C.), for 4 hours. Meanwhile, in a system that does not use Si, baking is performed at a temperature of 1200 to 1500° C. that promotes sintering, for example.

Next, functions and performance that are required of the electrode terminal will be described. As the requirements for the electrode terminal, it is necessary to ensure (1) the function of a collector, (2) the strength of the terminal, (3) reliability of the bonding strength between the electrode terminal and the substrate, and (4) environmental resistance and reliability.

(1) Regarding the function of a collector, the volume resistivity of the electrode terminal is desirably adjusted to be lower than that of the substrate. Specifically, the volume resistivity of the electrode terminal is adjusted to be less than that of the substrate (several ten to several $10^{-1}$ ($\Omega cm$)) so that the electrode film will not generate heat.

(2) Regarding the requirement of ensuring the terminal strength, the electrode terminal should have sufficient strength against a variety of stress that may occur when the electrode terminal is used under the actual environment, assembled, or fastened to a cable via an external electrode. A baked body is used for the electrode terminal. It is acceptable as long as the strength of the material of the electrode terminal is maintained at a level greater than or equal to that of a porous honeycomb substrate. For example, it is acceptable as long as the four-point flexural strength of the electrode terminal is greater than or equal to 10 (Mpa) that is the four-point flexural strength of the honeycomb substrate.

(3) Regarding the requirement of ensuring the bonding strength between the electrode terminal and the honeycomb substrate, it is necessary to reduce thermal stress that may be generated due to a difference in the thermal expansion coefficients of the substrate and the electrode terminal. For example, when a substrate with a thermal expansion coefficient of $4.5 \times 10^{-6}$ (cm/° C.) is used, the material of the electrode terminal is preferably adjusted so that the thermal expansion coefficient thereof is in the range of about $4.5 \times 10^{-6}$ to $8.0 \times 10^{-6}$ (cm/° C.).

(4) Regarding the requirement of ensuring the function under the actual environment, it is desired that a change in the volume resistivity that would occur due to oxidation at high temperature be small. For example, when the maximum temperature at which the EHC is used is about 950° C., it is preferable to select an electrode terminal material whose volume resistivity will hardly change even after it is subjected to heat treatment in the atmosphere at 950° C. for a predetermined time.

<Application to EHC of HV or PHV>

The electrode terminal is driven under the same conditions as the electrode film. In such a case, the honeycomb substrate is required to have a resistance of several 10Ω, for example, 40Ω. Thus, the resistance of the electrode terminal is desirably lower than that of the substrate by 1 digit or more.

As the composite materials that satisfy the aforementioned conditions among the composite materials shown in Tables 1 to 3 above, No. 1 to 8, No. 11 to 14, and No. 21 to 23 are preferable.

<Application to EHC of Gasoline Vehicles or Diesel Vehicles>

The electrode terminal is driven under the same conditions as the electrode film. In such a case, the honeycomb substrate is required to have a resistance of about $10^{-1}$ (Ω), for example, 0.5Ω. Thus, the resistance of the electrode terminal is desirably lower than that of the substrate by 1 digit or more.

As the composite materials that satisfy the aforementioned conditions among the composite materials shown in Tables 1 to 3 above, No. 3 and No. 6 to 8 are preferable.

[Regarding Substrate]

First, a method for producing a substrate will be described. To be brief, this production method includes preparing a composite material, mixing the composite material with water, a binder, and a lubricant to form a raw material, molding the raw material into a honeycomb structure, degreasing the solvent, and baking the slurry to produce a honeycomb substrate. The method will be hereinafter described in detail.

Each of MoSi raw material powder with an average grain size D of a divisor of 50 (μm) (e.g., 6 μm), SiC raw material powder with an average grain size D of a divisor of 50 (μm) (e.g., 11 μm), and Si raw material powder with an average grain size D of a divisor of 50 (μm) (e.g., 8 μm) is weighed by a predetermined amount, and then, the powder is uniformly mixed through a wet-process. It should be noted that the average grain size of each powder is not limited to several μm, and it is acceptable as long as the grain size that allows the desired performance of the substrate to be obtained is selected.

The obtained mixed powder is mixed with pure water added thereto using water-soluble cellulose derivative hydroxypropyl methylcellulose as an organic binder and polyalkylene polyol as a lubricant, for example, with shearing force applied thereto with a kneader, so that a raw material with predetermined hardness and fluidity is obtained.

Next, the obtained raw material is introduced into an extruder, so that a honeycomb molded body is formed via a honeycomb molding cap at an extrusion rate of several (cm/sec) and an extrusion pressure of several (MPa).

Next, after the obtained honeycomb molded body is dried, degreasing is performed to remove the organic binder. Degreasing was performed using a method of increasing the temperature from the room temperature up to 600° C. in a reduced-pressure atmosphere and then cooling the furnace. The degreased body was then baked to obtain a honeycomb baked body. The baking conditions herein were set to, after the pressure was reduced, 1200 to 1500° C. for 4 hours in an Ar atmosphere.

Next, functions and performance that are required of the substrate will be described. As the requirements for the substrate, it is necessary to ensure that (1) the substrate should have a resistance value that is suitable for the intended use, (2) the substrate should have low temperature dependence of volume resistivity, and (3) the substrate should have excellent oxidation resistance and excellent resistance to thermal shock under the actual environment.

(1) Regarding the requirement that the substrate should have a resistance value that is suitable for the intended use, a honeycomb substrate that has a resistance value of 0.1 to 1000Ω is preferably used as an example of the resistance value that is suitable for the intended use.

(2) Regarding the requirement that the substrate should have low temperature dependence of volume resistivity, it is desirable that, as the honeycomb substrate generates heat, the temperature dependence of the resistance value of the honeycomb be low in the temperature range in which the electrically heated catalytic converter is used, that is, in the temperature range of −30 to 950° C., and a change in the resistance value is desirably within one digit. When the temperature dependence of the resistance value is low, power to be applied can be controlled more simply and easily.

(3) Under the actual environment, it is indispensable to suppress oxidation of the substrate in a high-temperature oxidation atmosphere and reduce a change in the volume resistivity of the substrate. For example, when the maximum temperature in which the EHC is used is about 950° C., it is preferable to select a material whose volume resistivity will hardly change even after it is subjected to heat treatment in the atmosphere at 950° C. for a predetermined time. In addition, as the honeycomb substrate is subjected to a temperature change due to cooling/heating cycles of high temperature and low temperature under the actual environment, the honeycomb substrate is desirably formed of a material with excellent resistance to thermal shock.

<Application to EHC of HV or PHV>

The substrate is driven under the same conditions as the electrode film. In such a case, the honeycomb substrate is required to have a resistance of several 10Ω, for example, 40Ω. Thus, a material with a volume resistivity of 5 Ω·cm is preferably used to adjust the resistance of the honeycomb substrate to 40Ω.

As the composite materials that satisfy the aforementioned conditions among the composite materials shown in Tables 1 to 3 above, No. 14 to 17 and No. 23 to 25 are preferable.

<Application to EHC of Gasoline Vehicles or Diesel Vehicles>

The substrate is driven under the same conditions as the electrode film. In such a case, the honeycomb substrate is required to have a resistance of about $10^{-1}$ ($\Omega$), for example, 0.5$\Omega$. Thus, the volume resistivity of the material of the honeycomb substrate is desirably about 0.05 to 0.005 ($\Omega \cdot$cm).

As the composite materials that satisfy the aforementioned conditions among the composite materials shown in Tables 1 to 3 above, No. 1, 2, 4, 5, 11 to 13, 21, and 22 are preferable.

Table 4 below shows the physical properties of SiC/Si-based materials that contain no additives as comparative examples.

TABLE 4

| Composition No. | SiC/Si (Volume %) | Baked Body Thermal Expansion Coefficient $\times 10^{-6}$ (cm/° C.) | Baked Body Volume Resistivity ($\Omega$ cm) (Room Temperature) |
| --- | --- | --- | --- |
| A | 100/0 | 4.5 | 10000 or less |
| B | 75/25 | 4.4 | 10000 or less |
| C | 0/100 | 3.9 | 1000 or less |

Table 4 can confirm that each of substrates made of the materials of the comparative examples has high volume resistivity, and thus is difficult to be applied to a honeycomb substrate.

[Bonding Material and Substrate Obtained by Bonding Split Parts Together with Bonding Material]

First, a bonding material and a method for producing a substrate, which has split parts bonded together with the bonding material, will be described. To be brief, this production method includes preparing the aforementioned binary or ternary composite material, making the composite material into slurry, applying the slurry to the surfaces of the end portions of the split parts of the substrate to be bonded, causing the plurality of split parts to abut to each other at the end portions to be bonded and thus temporarily joining them, drying the slurry and degreasing a solvent that forms the slurry, and baking the slurry to produce a substrate made of the bonding material and the split parts. The method will be hereinafter described in detail.

Each of MoSi raw material powder with an average grain size D of a divisor of 50 (μm) (e.g., 2 μm), SiC raw material powder with an average grain size D of a divisor of 50 (μm) (e.g., 2 μm), and Si raw material powder with an average grain size D of a divisor of 50 (μm) (e.g., 1 μm) is weighed by a predetermined amount to produce a composite material that is uniformly mixed powder. It should be noted that the average grain size of each powder is not limited to several μm, and may be greater than or less than such value.

Next, an organic binder (i.e., PVA) is added into the mixed powder, and water is used as a solvent to produce slurry.

The surfaces of the end portions of the split parts to be bonded are coated with the slurry. As the coating method herein, screen printing, bat-printing, brushing, or the like can be used. The viscosity and the like of the slurry are adjusted to adjust the thickness and the like of the bonding material. It should be noted that when bonding is performed with a wide bonding layer, it is also possible to prepare in advance a green sheet with the same composition as the bonding material using a doctor blade method, an extrusion molding method, or the like, and coat the surface of the green sheet with the slurry to form a substrate.

In order to coat the surfaces of the end portions of the split parts to be bonded with the slurry produced with the aforementioned method, and bond the split parts together to temporarily join them, water is evaporated at 100° C. for drying purposes.

Using the substrate made of the split parts, degreasing is performed to remove the organic binder contained in the bonding material. The degreasing conditions herein depend on the organic binder used, but degreasing is performed in a reduced-pressure atmosphere in the range of about 300 to 600° C.

Next, baking is performed on the substrate that has the split parts temporarily joined together with the degreased bonding material, so that the bonding material is baked to bond the split parts together. As the baking conditions herein, baking is performed under an inert atmosphere at a temperature that is less than the melting point of Si (1414° C.), and the split parts are bonded together through welding of Si (for example, in the range of 1000 to 1400 (° C.), or desirably in the range of 1200 to 1300 (° C.)). It should be noted that the materials of the split parts may be any materials that are used for common EHCs. However, the materials of the split parts are preferably the same materials as the bonding material in order to further increase the bonding strength.

Next, functions and performance that are required of the bonding material will be described. As the requirements for the bonding material, it is necessary to ensure (1) the function of a resistor, (2) reliability of the bonding strength between the bonding material and the substrate, and (3) environmental resistance and reliability.

(1) Regarding the function of a resistor, the volume resistivity of the bonding material is preferably adjusted to about the same level as that of the substrate. Thus, the volume resistivity of the bonding material is adjusted to be about equal to the volume resistivity of the substrate (several ten to several $10^{-1}$ ($\Omega$cm)). When the resistance of the bonding material is too higher than that of the substrate, the bonding layer will generate heat, and the substrate will not be heated, while when the resistance of the bonding material is lower than that of the substrate, the temperature at the portion of the bonding layer will not increase. Thus, it would be impossible to uniformly heat the entire substrate in any case.

(2) Regarding the reliability of the bonding strength between the bonding material and the substrate, in order to ensure that the strength of the bonding material is at a level greater than or equal to that of the substrate, the four-point flexural strength of the bonding material is adjusted to be greater than or equal to that of the substrate (several 10 (MPa)), for example. When the strength is evaluated using component parts, a peel strength test is performed on the bonding material to check if a breakdown of the base material starts from the substrate.

In addition, in order to ensure the bonding strength against thermal stress and also reduce the amount of heat deformation of the split parts of the substrate, the thermal expansion coefficient of the bonding material is preferably less than or equal to that of the substrate. For example, when a substrate with a thermal expansion coefficient of $4.5 \times 10^{-6}$ (cm/° C.) is used, the bonding material is adjusted so that the thermal expansion coefficient thereof is in the range of less than $4.5 \times 10^{-6}$ (cm/° C.).

(3) Regarding the requirement of ensuring the environmental resistance and reliability, a material whose change in the volume resistance, when continuously exposed to the maximum temperature (about 950° C.) at which the bonding material is used as an EHC for a predetermined time, can be suppressed is applied to suppress a change in the volume resistance under a high-temperature oxidation atmosphere. In practice, it is desirable to select an applicable material in consideration of the volume resistivity of the bonding material that is required from the applied substrate. It should be noted that as $MoSi_2$ forms a passivation film, a bonding material containing $MoSi_2$ can have improved oxidation resistance.

Next, examples of the application of the bonding material will be described.

<Application to EHC of HV or PHV>

The bonding material is driven under the same conditions as the electrode film. Therefore, the substrate is required to have a resistance of several 10 (Ω) (e.g., 40 (Ω)).

For example, when the resistance of the ceramic substrate is adjusted to 40 (Ω) using a material with a volume resistivity of about 5 (Ω·cm), the volume resistance of the bonding material is preferably set at about the same level as that of the substrate.

As the composite materials that satisfy the aforementioned conditions among the composite materials shown in Tables 1 to 3 above, No. 15, 16, 24, and 25 are preferable.

<Application to EHC of Gasoline Vehicles or Diesel Vehicles>

The bonding material is driven under the same conditions as the electrode film. Therefore, the substrate is required to have a resistance of less than or equal to 1 (Ω) (e.g., 0.5 (Ω)).

For example, when the resistance of the ceramic substrate is adjusted to 0.5 (Ω) using a material with a volume resistivity of about 0.05 to 0.005 (Ω·cm), the volume resistance of the bonding material is preferably set at about the same level as that of the substrate.

As the composite materials that satisfy the aforementioned conditions among the composite materials shown in Tables 1 to 3 above, No. 1, 2, 4, 5, 11 to 13, 21, and 22 are preferable.

Next, with respect to constituent elements of an EHC that are formed with the aforementioned composite materials, a variety of analyses and experiments conducted by the inventors, as well as the results thereof will be described.

[XRD Analysis and Results Thereof]

In developing $MoSi_2$/SiC/Si-based, $MoSi_2$/SiC-based, and $MoSi_2$/Si-based composite materials as the novel materials to be applied to an electrode terminal or an electrode film for a HV-EHC system, it is indispensable to select an optimum composition in terms of volume resistivity, thermal expansion coefficient, flexural strength, and oxidation resistance. It is also necessary to improve sinterability that utilizes solid-phase diffusion as well as bonding strength. To this end, it is ultimately necessary to perform measurement using a baked body of a composite material with each composition. The inventors have already succeeded in obtaining baked bodies of the eight types of compositions that contain two or three elements of $MoSi_2$/SiC/Si, and evaluated the linear contraction coefficient, volume density, and relative density (see Tables 1 to 3 above). The constituent phases of the baked bodies of the eight types of compositions shown in Table 5 below are identified through XRD analysis.

TABLE 5

(Represented in Volume %)

| Composition No. | Composition (Volume %) | Number of Components |
|---|---|---|
| 1 | $MoSi_2$: 50 vol. %-SiC: 50 vol. % | 2 |
| 2 | $MoSi_2$: 40 vol. %-SiC: 30 vol. %-Si: 30 vol. % | 3 |
| 3 | $MoSi_2$: 90 vol. %-Si: 10 vol. % | 2 |
| 4 | $MoSi_2$: 45 vol. %-SiC: 45 vol. %-Si: 10 vol. % | 3 |
| 5 | $MoSi_2$: 50 vol. %-SiC: 40 vol. %-Si: 10 vol. % | 3 |
| 6 | $MoSi_2$: 60 vol. %-SiC: 30 vol. %-Si: 10 vol. % | 3 |
| 7 | $MoSi_2$: 70 vol. %-SiC: 20 vol. %-Si: 10 vol. % | 3 |
| 8 | $MoSi_2$: 80 vol. %-SiC: 10 vol. %-Si: 10 vol. % | 3 |

(Represented in Mass %)

| Composition No. | Composition (Mass %) | Number of Components |
|---|---|---|
| 1 | $MoSi_2$: 66 mass. %-SiC: 34 mass. % | 2 |
| 2 | $MoSi_2$: 60 mass. %-SiC: 23 mass. %-Si: 17 mass. % | 3 |
| 3 | $MoSi_2$: 96 mass. %-Si: 4 mass. % | 2 |
| 4 | $MoSi_2$: 63 mass. %-SiC: 32 mass. %-Si: 5 mass. % | 3 |
| 5 | $MoSi_2$: 67 mass. %-SiC: 28 mass. %-Si: 5 mass. % | 3 |
| 6 | $MoSi_2$: 75 mass. %-SiC: 20 mass. %-Si: 5 mass. % | 3 |
| 7 | $MoSi_2$: 83 mass. %-SiC: 12 mass. %-Si: 5 mass. % | 3 |
| 8 | $MoSi_2$: 90 mass. %-SiC: 6 mass. %-Si: 4 mass. % | 3 |

(Regarding XRD Analysis of Baked Bodies of $MoSi_2$/SiC/Si Composite Materials)

Two compositions are selected as representative examples out of the aforementioned eight types of compositions, and then, the constituent phases of the compositions baked at 1500° C. for 4 hours are identified through XRD analysis.

Figure 5:
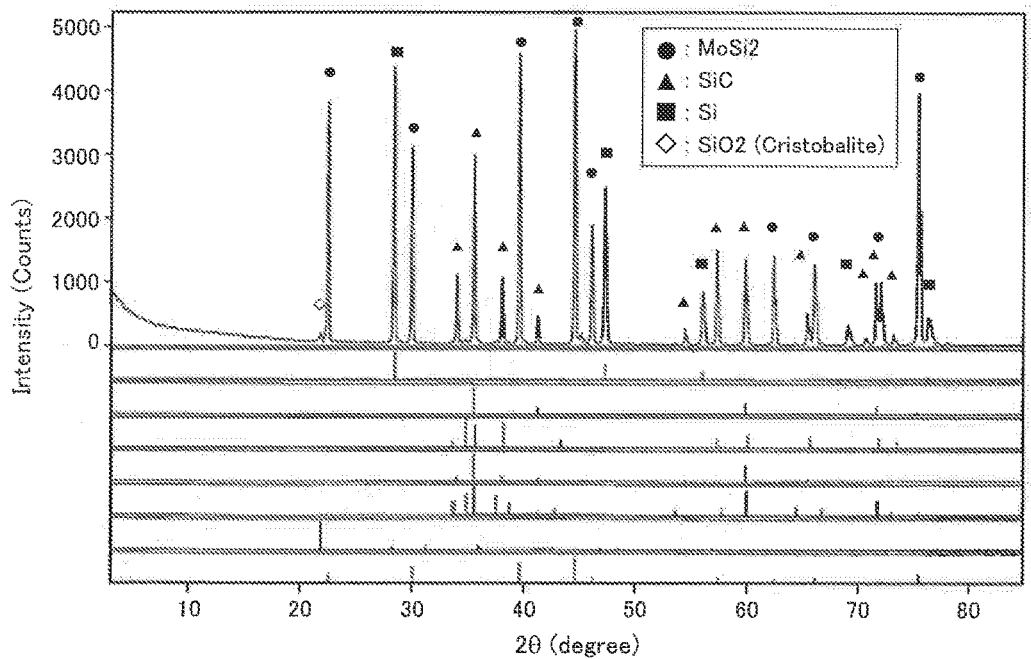
FIG. 5: the upper diagram is an XRD diagram of Composition No. 2 (i.e., $MoSi_2/SiC/Si$ composite material) baked at 1500° C., and the lower diagram is an XRD diagram of Composition No. 5 (i.e., $MoSi_2/SiC/Si$ composite material) baked at 1500° C.
Figure 5:
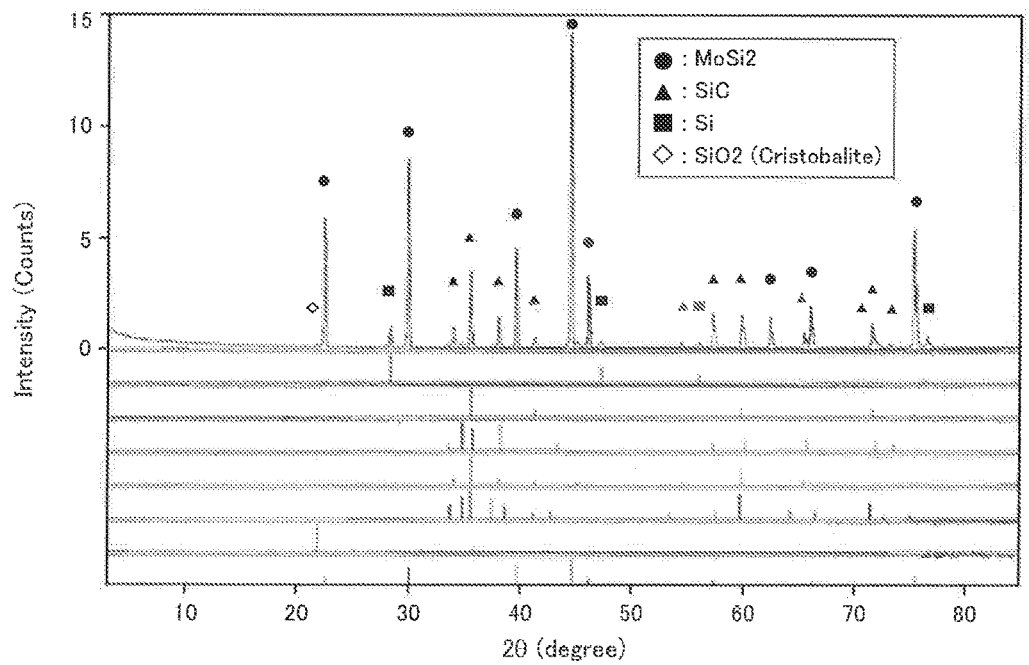

With respect to the experimental method, preparation of raw materials, molding, degreasing, and baking conditions are the same as those described above. Baked bodies obtained under such conditions were ground in a tungsten carbide mortar through a dry-process to prepare samples for XRD analysis. The present analysis was performed on Compositions 2 and 5 in Table 5 as representative examples. Table 6 below shows the XRD analysis conditions, and FIG. 5 show the analysis results. It should be noted that the upper diagram of FIG. 5 is an XRD diagram of Composition No. 2 (i.e., $MoSi_2$/SiC/Si composite material) baked at 1500° C., and the lower diagram is an XRD diagram of Composition No. 5 (i.e., $MoSi_2$/SiC/Si composite material) baked at 1500° C.

TABLE 6

| | Analysis Conditions | | | | | | | | |
|---|---|---|---|---|---|---|---|---|---|
| Analysis Method | Measurement Angles | kV | mA | Measurement Method | Step | Rate | DS | SS | RS |
| Wide-Angle Method | 3 to 85 | 50 | 300 | Continuous Method | 0.02 | 5°/Minute | 1 | 1 | 0.15 |

From each of the upper and lower diagrams of FIG. 5, $MoSi_2$, SiC, Si, and trace amounts of $SiO_2$ (cristobalite) are identified, and a difference in the diffraction peak intensity of each constituent phase, which results from the difference in composition, is recognized. However, no difference in the constituent phase is found. That is, with respect to the currently analyzed compositions baked at 1500° C., it is found that no change occurred in the phase due to reactions between starting materials. It is considered that the trace amounts of $SiO_2$ (cristobalite) were generated due to surface oxidation of metal Si or SiC and the use of water in preparation of raw materials, and further, due to trace amounts of oxygen in the baking atmosphere. However, the amount of $SiO_2$ generated is estimated to be very small, which is not at a level that will influence the properties.
(Regarding XRD Analysis of Baked Bodies of $MoSi_2$/SiC/Si Composite Materials Subjected to High-Temperature Oxidation Treatment)

Figure 6:
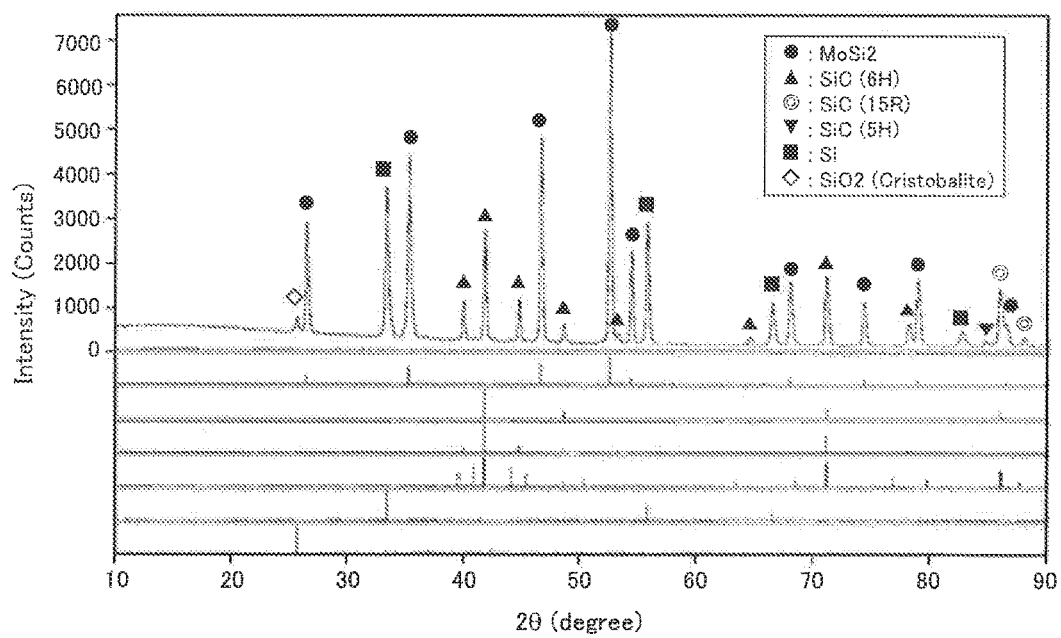
FIG. 6(a) is an XRD diagram of the surface of a baked body of Composition No. 2.
FIG. 6(b) is an XRD diagram of the surface of a baked body of Composition No. 5.
Figure 6:
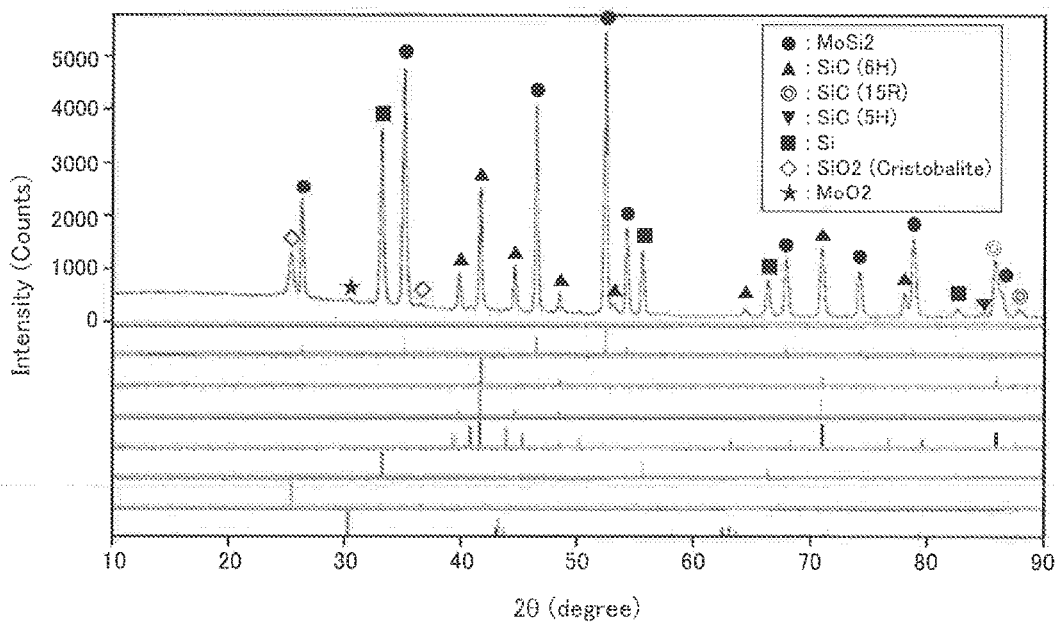
Figure 6:
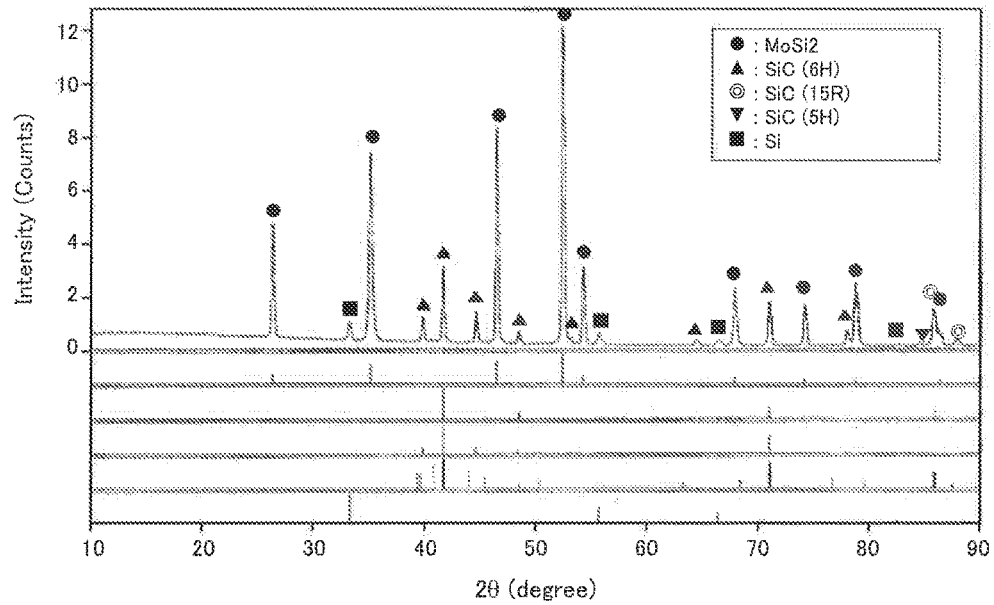
Figure 6:
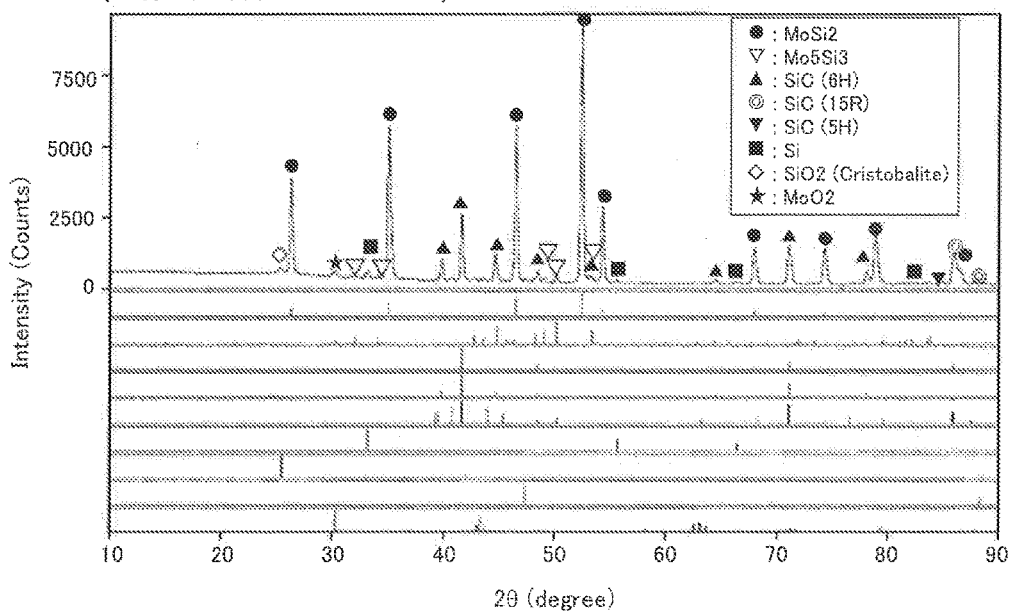
Figure 7:
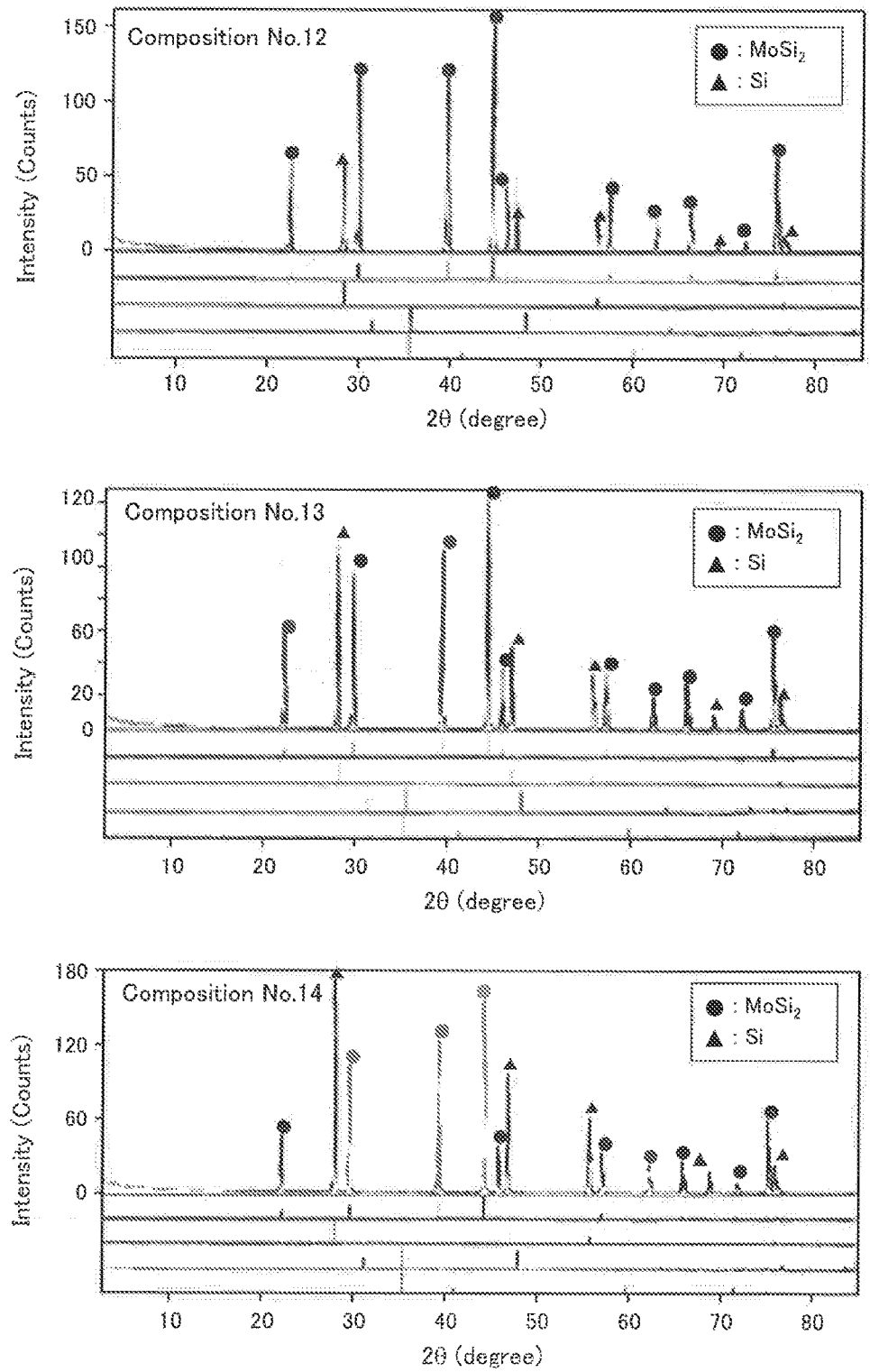
FIG. 7 are XRD diagrams of baked bodies of Compositions No. 12, No. 13, and No. 14 (i.e., $MoSi_2/Si$ composite materials) in this order.

Herein, the constituent phases of products oxidized in the atmosphere are identified through XRD analysis. XRD analysis was performed on test pieces of baked bodies of Composition 2 and Composition 5, as representative examples of the eight types of compositions shown in Table 5, as well as test pieces of such baked bodies subjected to oxidation treatment in the atmosphere at 1000° C. for 192 hours. As the analysis method, baked bodies of prismatic test pieces and baked bodies subjected to oxidation treatment were fixed on holders, and the surfaces of the test pieces were irradiated with an X-ray beam with a diameter narrowed to 800 μm. On the low-angle side of 2θ=20°, the irradiated surface is an ellipse with a minor axis of 800 μm and a major axis of 3 mm. Table 7 below shows the measurement conditions of the XRD analysis, and FIGS. 6 and 7 show the analysis results. It should be noted that FIG. 6a are XRD diagrams of the surface of the baked body of Composition No. 2, and FIG. 6b are XRD diagrams of the surface of the baked body of Composition No. 5. Further, Table 8 below shows the constituent phase of each baked body identified through XRD analysis.

TABLE 7

| Vessel | kV | mA | Diameter of Collimator | Detector Position | Measurement Time | Detector 2θ | Integration Range | Scan |
|---|---|---|---|---|---|---|---|---|
| Co | 38 | 80 | 800 μm | 20 cm | 600 Seconds | 24° | 10°-90° | ω |

TABLE 8

| Composition No. | Composition | Baking and Oxidation Test Conditions | Constituent Phase |
|---|---|---|---|
| 2 | $MoSi_2$: 40 vol. %- SiC: 30 vol. %- Si: 30 vol. % | Baked at 1500° C. for 4 hours | $MoSi_2$, SiC, Si, $SiO_2$ (Cristobalite) |
| | | Baked at 1500° C. for 4 hours => Oxidation Treatment at 1000° C. for 192 hours | $MoSi_2$, SiC, Si, $SiO_2$ (Cristobalite), $MoO_2$ |
| 5 | $MoSi_2$: 50 vol. %- SiC: 40 vol. %- Si: 10 vol. % | Baked at 1500° C. for 4 hours | $MoSi_2$, SiC, Si |
| | | Baked at 1500° C. for 4 hours => Oxidation Treatment at 1000° C. for 192 hours | $MoSi_2$, SiC, Si, $SiO_2$ (Cristobalite), $MoO_2$, $Mo_5Si_3$ |

FIG. 6a clarified the presence of trace amounts of $SiO_2$ (cristobalite) in addition to $MoSi_2$, SiC, and Si on the surface of the baked body. It is considered that the trace amounts of $SiO_2$ (cristobalite) were generated due to surface oxidation of metal Si or SiC and the use of water in preparation of raw materials, and further, due to trace amounts of oxygen in the baking atmosphere. Meanwhile, in the oxidized product, trace amounts of $MoO_2$ are detected in addition to $MoSi_2$, SiC, Si, and trace amounts of $SiO_2$ (cristobalite) as shown in the lower diagram of FIG. 6a. In addition, it is seen that the peak of $SiO_2$ (cristobalite) is slightly increased in the oxidized product. It is considered that $SiO_2$ (cristobalite) was generated due to oxidation of SiC or Si during high-temperature oxidation treatment of the baked body, and $MoO_2$ was generated due to oxidation of $MoSi_2$, but with respect to the oxidation treatment at 1000° C. for 192 hours, the amount of oxide generated is found to be smaller.

Meanwhile, from FIG. 6b, $MoSi_2$, SiC, and Si are detected on the surface of the baked body of Composition No. 5, while generation of $SiO_2$ (cristobalite) is not recognized. Further, the lower diagram of FIG. 6b can confirm that although trace amounts of $Mo_5Si_3$, $SiO_2$ (cristobalite), and $MoO_2$ are generated in addition to $MoSi_2$, SiC, and Si on the surface layer of the oxidized product, the diffraction peaks of the oxides are smaller than those of Composition No. 2. This is considered to be due to the fact that Composition No. 5 was less easily oxidized than Composition No. 2 as Composition No. 5 contains a larger amount of $MoSi_2$ and a smaller amount of Si than Composition No. 2. In addition, the reason that $Mo_5Si_3$ is detected after the oxidation treatment is considered to be due to a reaction between $MoSi_2$ and Si.

(Regarding XRD Analysis of Baked Bodies of $MoSi_2$/Si Composite Materials)

With respect to an electrode terminal, an electrode film, and a bonding material, which are made of $MoSi_2$/Si-based composite materials, to be applied to an EHC made of SiC/Si, the constituent phases of baked bodies obtained at 1250° C. for 1 hour, which are the bonding conditions for the electrode terminal and the electrode film, are identified through XRD analysis.

As the experimental method, baked bodies of three compositions shown in Table 9 below were ground in a tungsten carbide mortar through a dry-process to prepare samples for XRD analysis. Analysis was performed under the standard conditions. FIG. 7 show the analysis results.

TABLE 9

| Composition No. | $MoSi_2$ | Si |
|---|---|---|
| 12 | 50 | 50 |
| 13 | 40 | 60 |
| 14 | 30 | 70 |

| Composition No. | $MoSi_2$ | Si |
|---|---|---|
| 12 | 73 | 27 |
| 13 | 64 | 36 |
| 14 | 54 | 46 |

FIG. 7 are XRD diagrams of baked bodies of Compositions No. 12, No. 13, and No. 14 (i.e., $MoSi_2$/Si composite materials in this order. From FIG. 7, it is found that the constituent phase of each composition contains only $MoSi_2$ and Si that are starting materials, and it is found from the state diagram of the two-component-based material of Mo—

Si that the compositions of the currently analyzed baked bodies all correspond to the two-phase coexistence region of $MoSi_2$ and Si. Meanwhile, trace amounts of $SiO_2$ (cristobalite), which has been detected from the sintered body of the three-component-based material of $MoSi_2$/SiC/Si, is not recognized.

(Regarding XRD Analysis of Baked Bodies of $MoSi_2$/Si Composite Materials Subjected to Oxidation Treatment)

Figure 8:
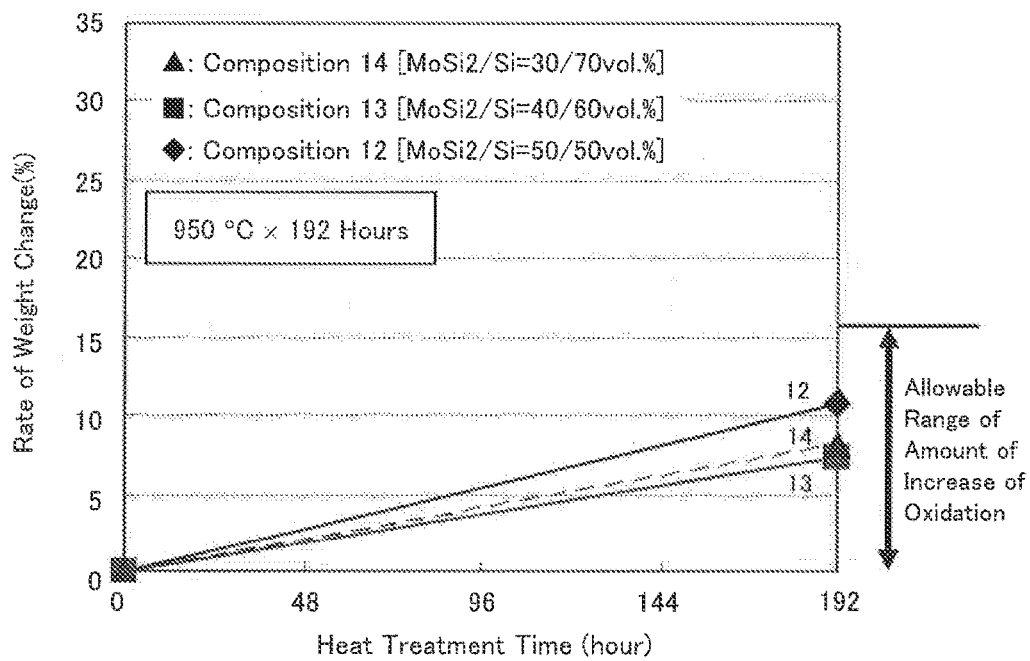
FIG. 8 are diagrams showing the relationship between the heat treatment time and a change in weight of each of Compositions No. 12, 13, and 14; specifically, the upper diagram shows a case where the heat treatment temperature is 950° C. and the lower diagram shows a case where the heat treatment temperature is 1000° C.
Figure 8:
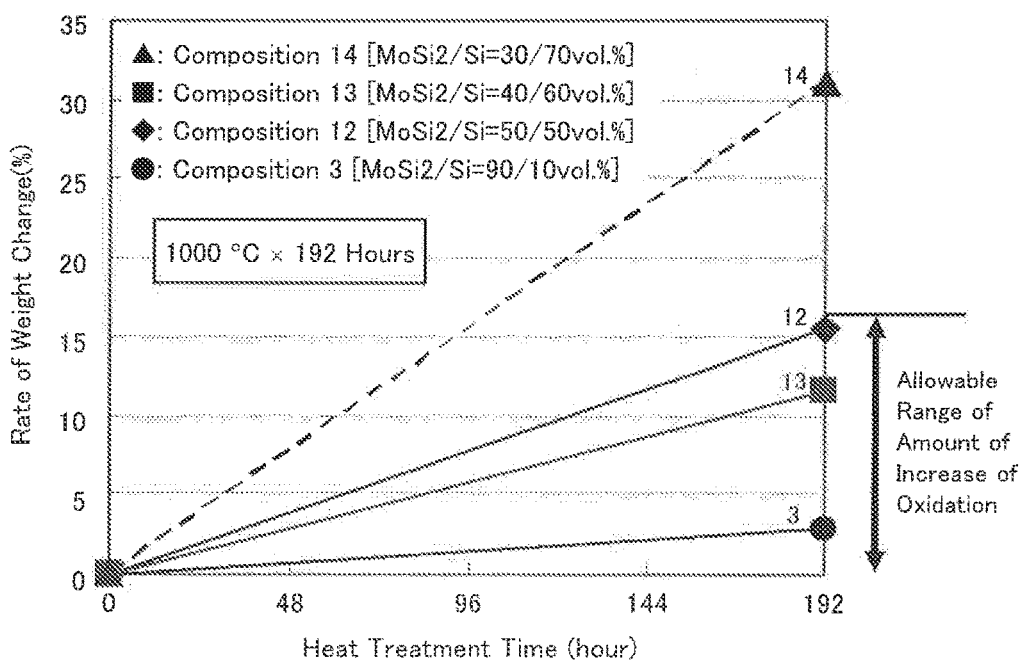

$MoSi_2$/Si-based composite materials, which have been developed as materials of an electrode terminal and an electrode film for an EHC, have oxidation resistance as a main property that should be noted. The upper and lower diagrams of FIG. 8 show the rate of weight increase after oxidation treatment at 950° C. for 192 hours and at 1000° C. for 192 hours, respectively. Further, it was found from the results of the volume resistivity and the rate of weight increase that a silicide baked body made of the composite material of the present invention is a conductor if the rate of weight increase after oxidation treatment is less than or equal to about 15%.

That is, a change in the weight of Composition No. 14 (see Table 1) due to oxidation has increased to about 30% after the composition is subjected to oxidation treatment at 1000° C. for 192 hours, and consequently, the volume resistivity thereof has rapidly increased to 108 Ωcm, resulting in an insulator. In order to analyze such a phenomenon, the constituent phases of the surface of and the inside of silicides, which have been subjected to oxidation treatment and not subjected to oxidation treatment, are identified through XRD.

As the experimental method, the phases were identified through XRD analysis by irradiating predetermined positions with X-rays. It should be noted that in order to analyze the inside of a test piece, the test piece was cut at the center, and the cut surface was polished with water to form a surface to be analyzed. Meanwhile, in order to analyze the surface of a test piece, a baked surface and an oxidized surface of the test piece were analyzed. The measurement conditions are the same as those in Table 7. Table 10 shows the specifications of the analyzed test pieces.

TABLE 10

| Composition No. | $MoSi_2$ (vol %) | Si (vol %) | Analyzed Portion | Oxidation Treatment |
|---|---|---|---|---|
| 13 | 40 | 60 | Surface | None |
| 14 | 30 | 70 | Surface | None |
| 13 | 40 | 60 | Surface | 1000° C. × 192 Hr |
| 14 | 30 | 70 | Surface | 1000° C. × 192 Hr |
| 13 | 40 | 60 | Inside | None |
| 14 | 30 | 70 | Inside | None |
| 13 | 40 | 60 | Inside | 1000° C. × 192 Hr |
| 14 | 30 | 70 | Inside | 1000° C. × 192 Hr |

Figure 9:
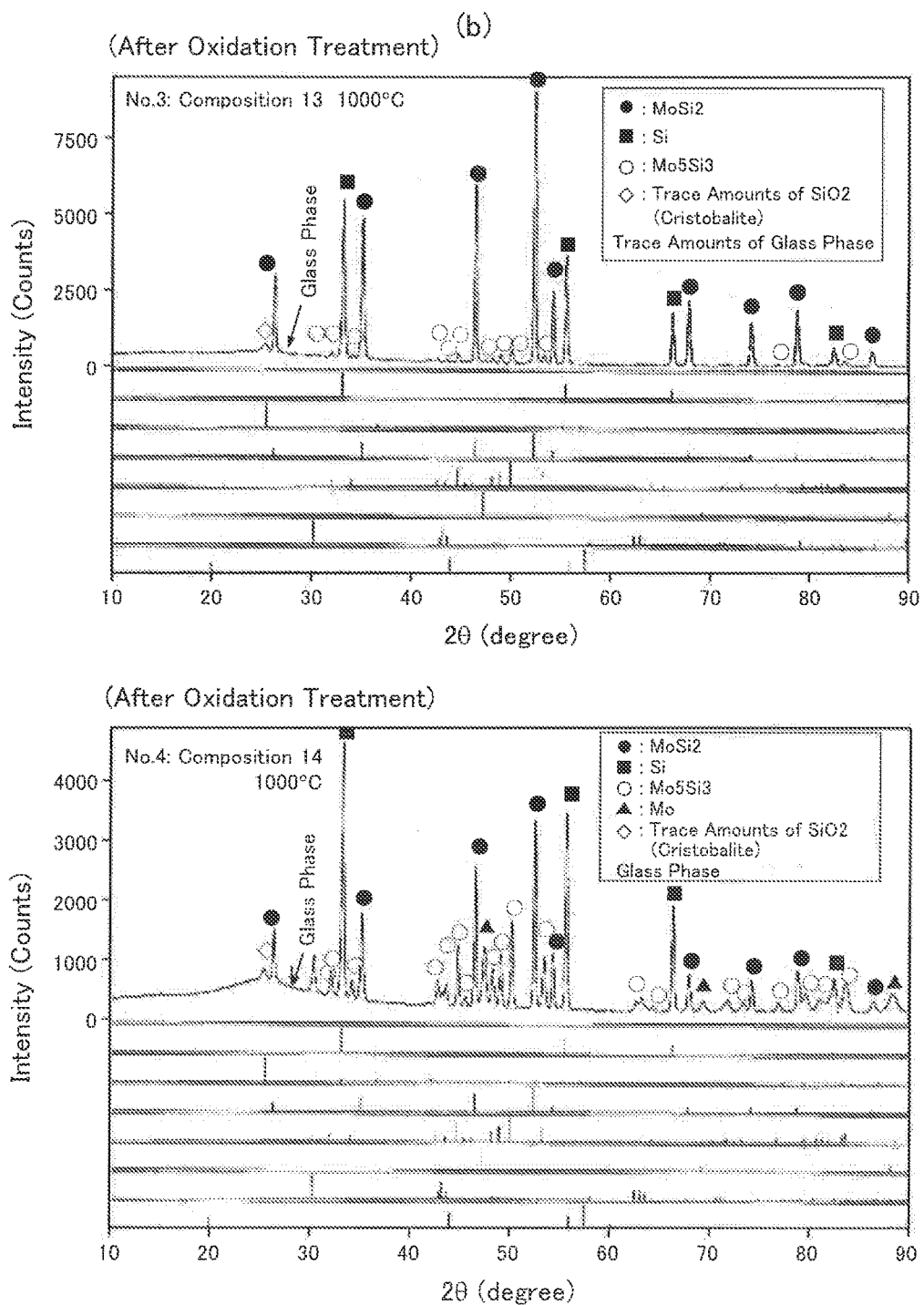
FIG. 9(a) are XRD diagrams of the surfaces of Composition No. 13 and Composition No. 14.
FIG. 9(b) are XRD diagrams of the surfaces of Composition No. 13 and Composition No. 14.

FIGS. 9a and 9b are XRD diagrams of the surfaces of Composition No. 13 and Composition No. 14.

From the upper and lower diagrams of FIG. 9a, it is seen that the constituent phases of the compositions are the same, and $MoSi_2$, Si, trace amounts of $SiO_2$ (cristobalite), and trace amounts of SiC (3 C: low-temperature 3-period cubic crystals) are detected. It is speculated that $SiO_2$ (cristobalite) has been generated due to a reaction between trace amounts of oxygen and Si during baking, and SiC has been generated due to a reaction between trace amounts of carbon and Si in the atmosphere in the furnace.

Meanwhile, with respect to Composition No. 14 in FIG. 9b, $MoSi_2$, Si, $Mo_5Si_3$, trace amounts of $SiO_2$ (cristobalite), and trace amounts of glass phase are detected. Meanwhile, with respect to Composition No. 14 after subjected to oxidation treatment, Mo and a glass phase are detected in addition to $MoSi_2$, Si, $Mo_5Si_3$, and trace amounts of $SiO_2$ (cristobalite). With respect to Composition No. 14 that contains a large amount of Si, the amount of the glass phase after oxidation treatment is larger than that of Composition No. 13, and metal Mo is also detected.

Figure 10:
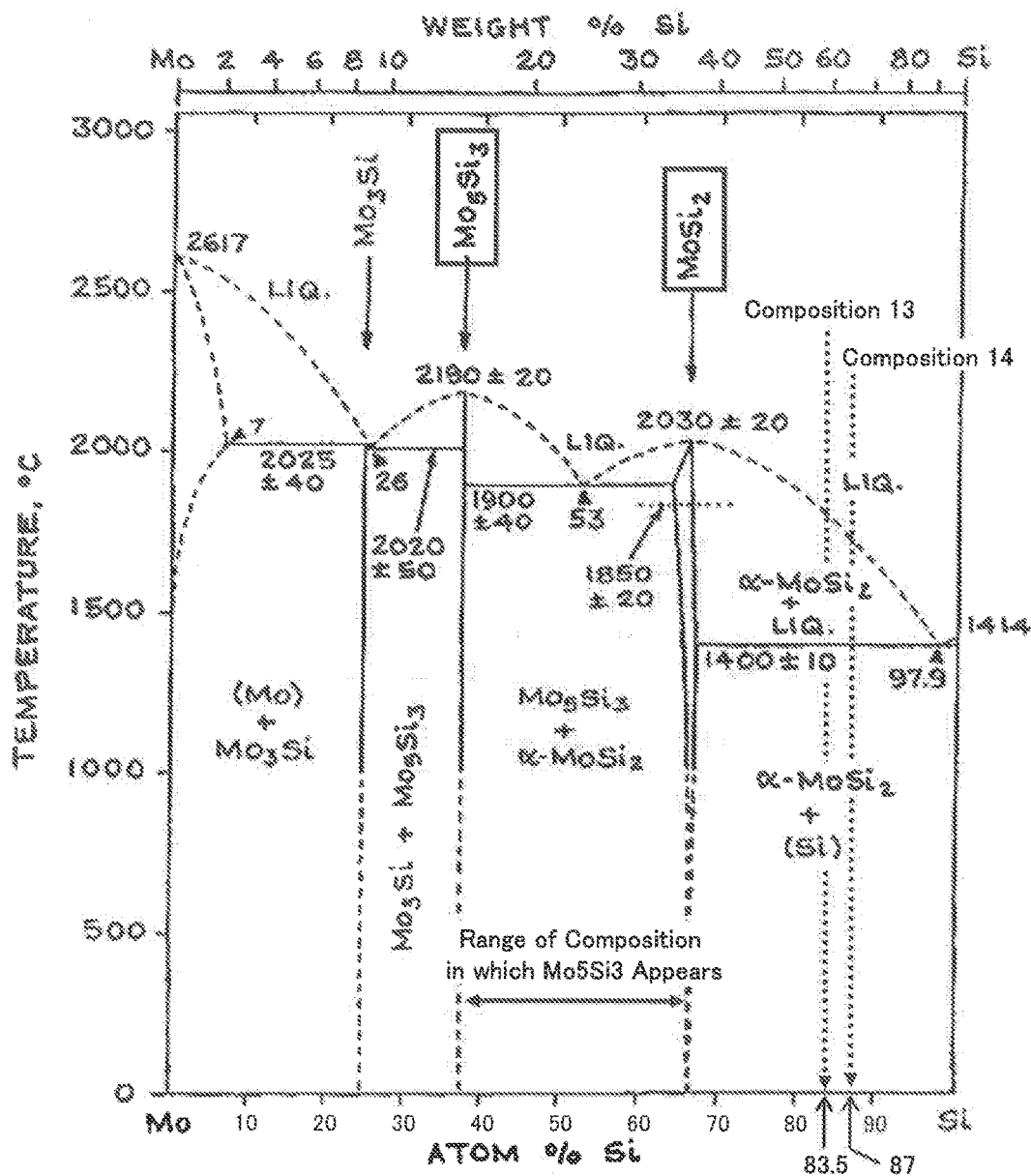
FIG. 10 is a diagram showing the states of Mo—Si-based materials.

FIG. 10 is a diagram showing the states of Mo—Si-based materials. In the oxidation treatment at 1000° C., Si is usually preferentially oxidized than $MoSi_2$. Thus, it is considered that Si was locally oxidized on the surface of the test piece to generate a glass phase of $SiO_x$, and consequently, the local "apparent composition" has shifted to the Mo-rich side, and changed to the coexistence region of $MoSi_2$ and $Mo_5Si_3$. It should be noted that the reason that metal Mo was generated in the oxidized product of Composition No. 14 is unknown. In addition, a change in the weight of Composition No. 14 due to oxidation is about 30%, and this is considered to be due to the generation of a glass phase upon oxidation of Si.

Figure 11:
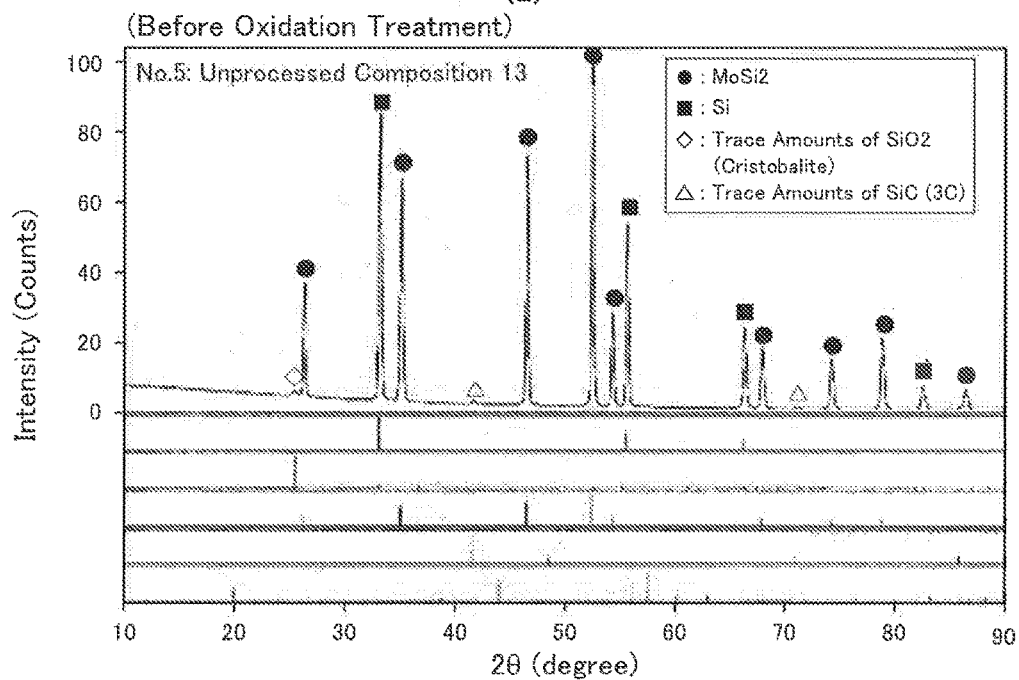
FIG. 11(a) are XRD diagrams of the polished surfaces of the cross-sections of Composition No. 13 and Composition No. 14.
FIG. 11(b) are XRD diagrams of the polished surfaces of the cross-sections of Composition No. 13 and Composition No. 14.
Figure 11:
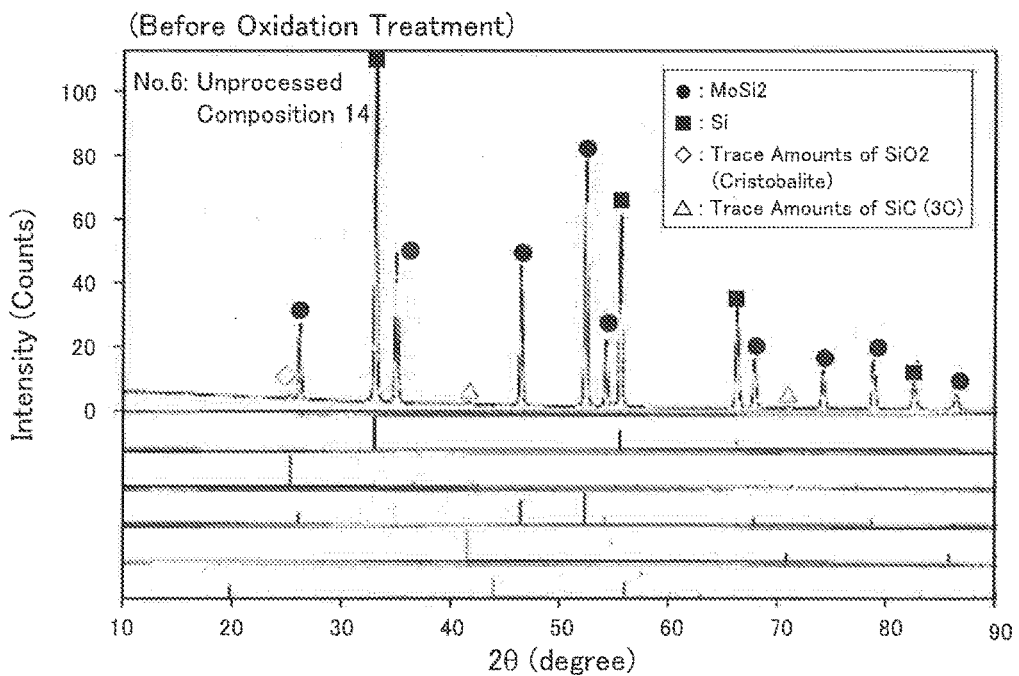
Figure 11:
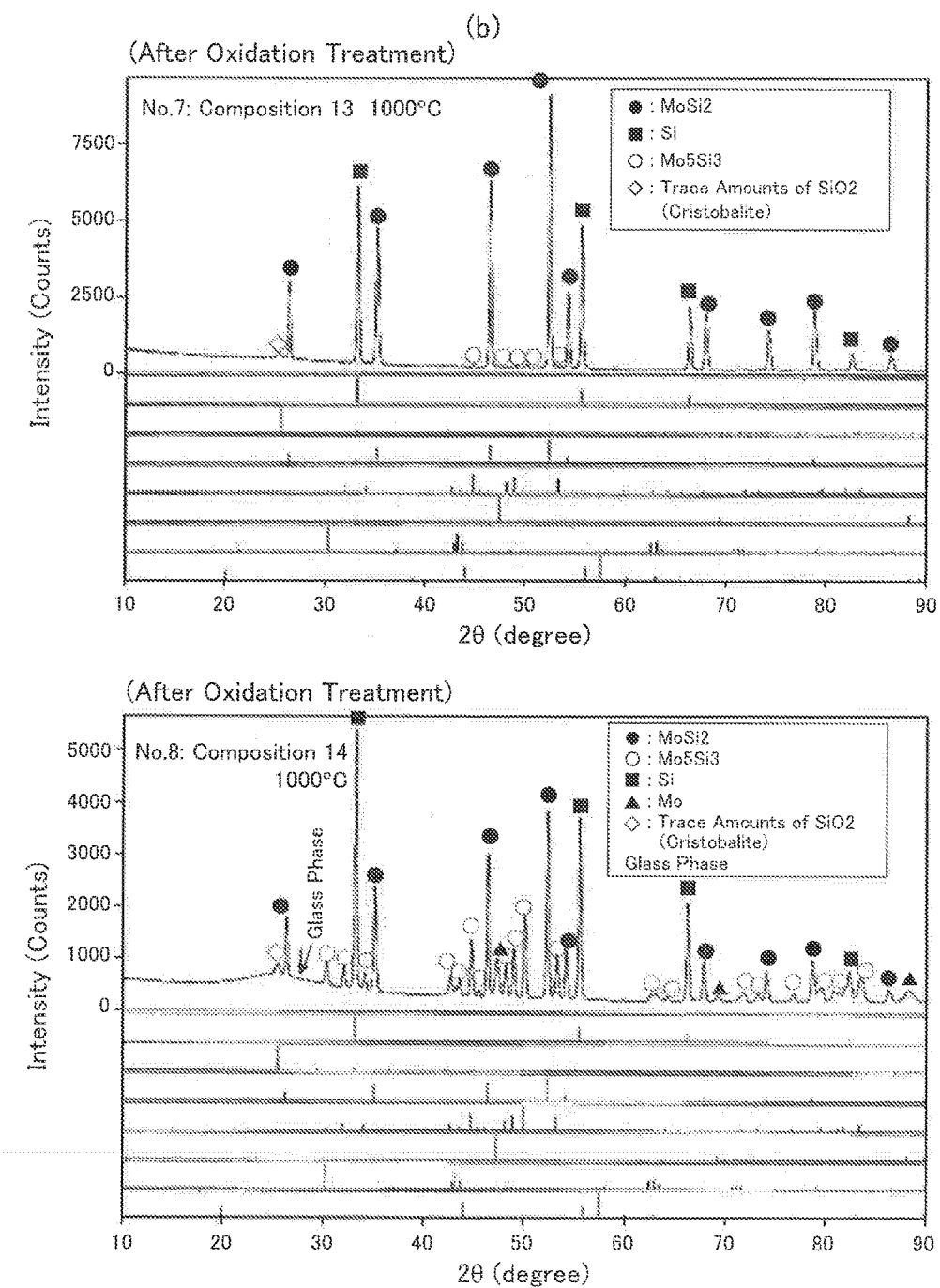

FIGS. 11a and 11b show XRD diagrams of the polished surfaces of the cross-sections of Composition No. 13 and Composition No. 14.

From the upper and lower diagrams of FIG. 11a, it is seen that the constituent phases of the compositions are the same, and $MoSi_2$, Si, trace amounts of $SiO_2$ (cristobalite), and trace amounts of SiC (3 C: low-temperature 3-period cubic crystals) are detected.

Meanwhile, with respect to Composition No. 14 in FIG. 11b, $MoSi_2$, Si, $Mo_5Si_3$, and trace amounts of $SiO_2$ (cristobalite) are detected. Meanwhile, with respect to Composition No. 14 after subjected to oxidation treatment, Mo and a glass phase are detected in addition to $MoSi_2$, Si, $Mo_5Si_3$, and trace amounts of $SiO_2$ (cristobalite). With respect to Composition No. 14 that contains a large amount of Si, the amount of the glass phase after oxidation treatment is larger than that of Composition No. 13, and metal Mo is also detected.

Figure 12:
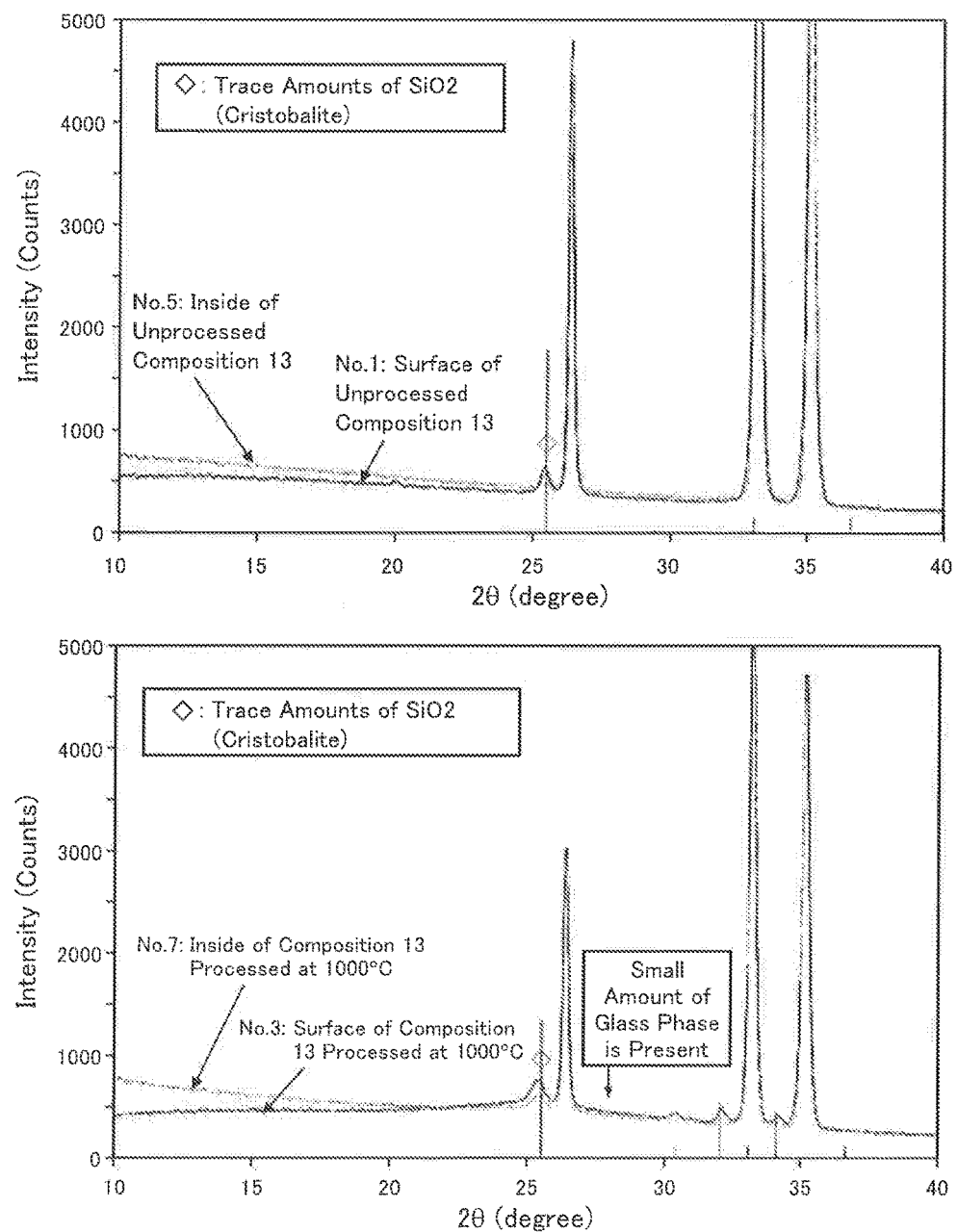
FIG. 12(a): the upper diagram is an XRD diagram obtained by enlarging the intensity scale at the ordinate axis of diffraction rays on the low-angle side of Composition No. 13 before subjected to oxidation treatment, and the lower diagram is an XRD diagram obtained by enlarging the intensity scale at the ordinate axis of diffraction rays on the low-angle side of Composition No. 13 after subjected to oxidation treatment.
FIG. 12(b): the upper diagram is an XRD diagram obtained by enlarging the intensity scale at the ordinate axis of diffraction rays on the low-angle side of Composition No. 14 before subjected to oxidation treatment, and the lower diagram is an XRD diagram obtained by enlarging the intensity scale at the ordinate axis of diffraction rays on the low-angle side of Composition No. 14 after subjected to oxidation treatment.
Figure 12:
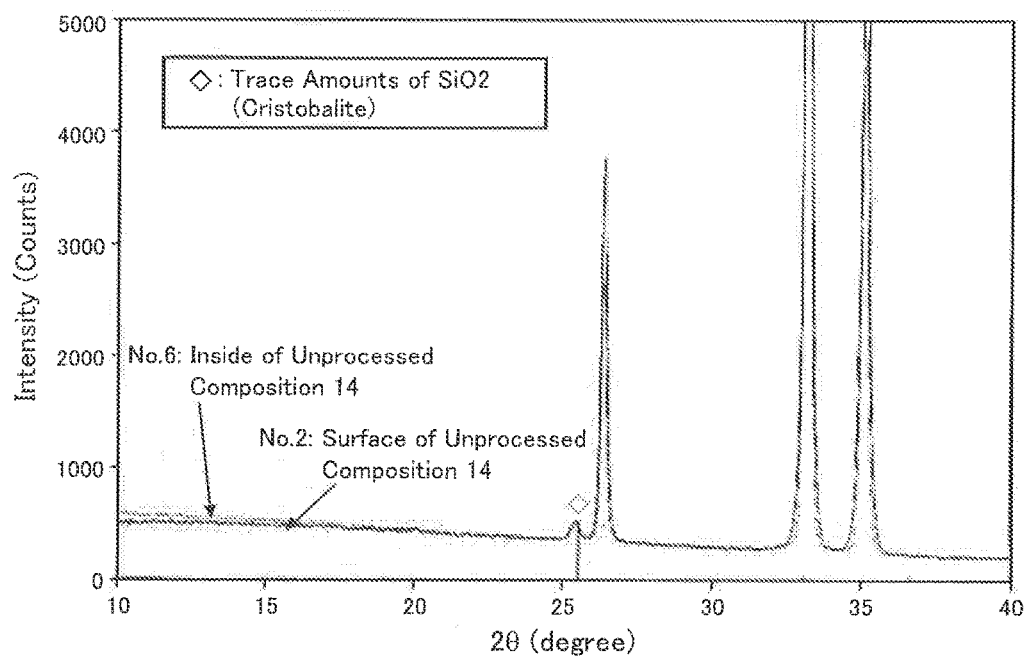
Figure 12:
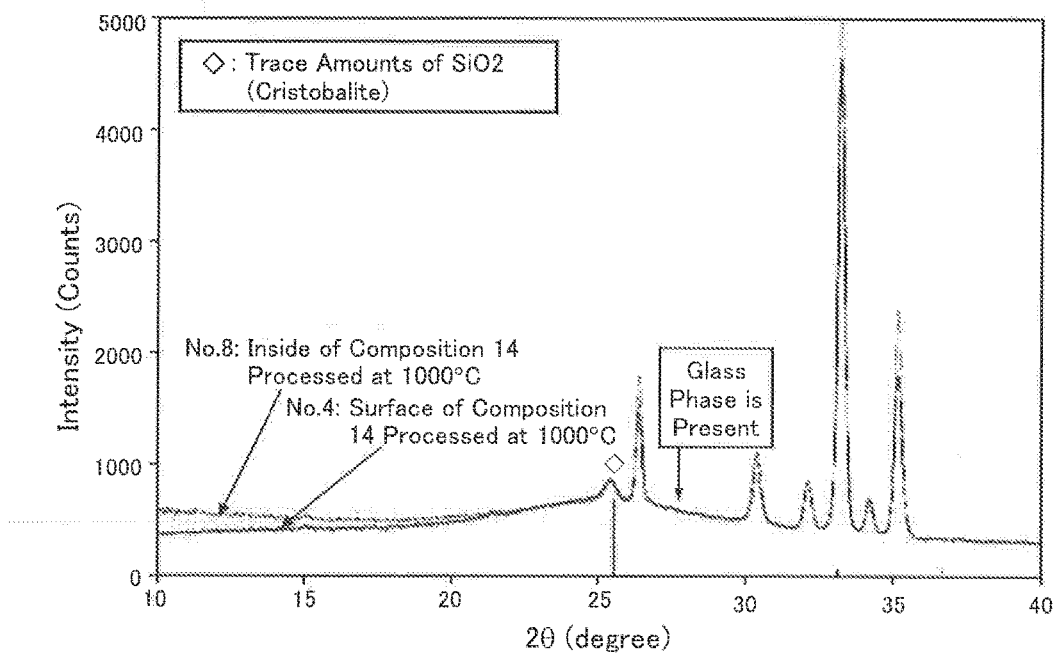

The upper diagrams of FIGS. 12a and 12b show XRD diagrams obtained by enlarging the intensity scale at the ordinate axis of diffraction rays on the low-angle side of Composition No. 13 and Composition No. 14 before subjected to oxidation treatment, respectively, and the lower diagrams FIGS. 12a and 12b show XRD diagrams obtained by enlarging the intensity scale at the ordinate axis of diffraction rays on the low-angle side of Composition No. 13 and Composition No. 14 after subjected to oxidation treatment, respectively.

From FIG. 12a, it is seen that diffraction patterns of the inside and the surface of unprocessed Composition No. 13 are almost the same, and a peak of $SiO_2$ (cristobalite) is detected but a glass phase is not recognized. However, in the oxidized product, a small amount of glass phase is detected.

Meanwhile, from FIG. 12b, it is seen that diffraction patterns of the inside and the surface of unprocessed Composition No. 14 are almost the same, and a peak of $SiO_2$ (cristobalite) is detected but a glass phase is not recognized. However, the oxidized product is found to contain an increased amount of glass phase than Composition No. 13.

Table 11 below shows the variety of XRD analysis results described above.

TABLE 11

| Sample No. | Composition No. | MoSi$_2$ (vol %) | Si (vol %) | Analyzed Portion | Oxidation Treatment | Constituent Phase |
|---|---|---|---|---|---|---|
| 1 | 13 | 40 | 60 | Surface | None | MoSi$_2$, Si, Trace Amounts of SiC Trace Amounts of SiO$_2$ (Cristobalite) |
| 2 | 14 | 30 | 70 | Surface | None | MoSi$_2$, Si, Trace Amounts of SiC Trace Amounts of SiO$_2$ (Cristobalite) |
| 3 | 13 | 40 | 60 | Surface | 1000° C. × 192 Hr | MoSi$_2$, Si, Mo$_5$Si$_3$, Trace Amounts of Glass Phase Trace Amounts of SiO$_2$ (Cristobalite) |
| 4 | 14 | 30 | 70 | Surface | 1000° C. × 192 Hr | MoSi$_2$, Si, Mo$_5$Si$_3$, Mo, Glass Phase Trace Amounts of SiO$_2$ (Cristobalite) |
| 5 | 13 | 40 | 60 | Inside | None | MoSi$_2$, Si, Trace Amounts of SiC Trace Amounts of SiO$_2$ (Cristobalite) |
| 6 | 14 | 30 | 70 | Inside | None | MoSi$_2$, Si, Trace Amounts of SiC Trace Amounts of SiO$_2$ (Cristobalite) |
| 7 | 13 | 40 | 60 | Inside | 1000° C. × 192 Hr | MoSi$_2$, Si, Mo$_5$Si$_3$, Trace Amounts of SiO$_2$ (Cristobalite) |
| 8 | 14 | 30 | 70 | Inside | 1000° C. × 192 Hr | MoSi$_2$, Si, Mo$_5$Si$_3$, Mo, Glass Phase Trace Amounts of SiO$_2$ (Cristobalite) |

This analysis has clarified the following.

(1) All of the constituent phases of the surfaces and the insides of Composition No. 13 and Composition No. 14 not subjected to oxidation treatment are the same.

(2) Trace amounts of glass phase are detected from the surface of Composition No. 13 subjected to oxidation treatment, but the glass phase is not detected from the inside thereof.

(3) The constituent phases of the surface and the inside of Composition No. 14 subjected to oxidation treatment are the same, and a glass phase co-exists in addition to the crystal phase.

(4) An increase in the amount of oxidation at 1000° C. is considered to be due to the generation of the SiO glass phase upon oxidation of Si.

[Measurement of Volume Resistivity and Results Thereof]

Next, volume resistivity that is an electrical characteristic of each of baked bodies made of MoSi$_2$/SiC/Si-based, MoSi$_2$/SiC-based, and MoSi$_2$/Si-based composite materials is evaluated.

As the experimental method, baked bodies each having a width of 5 mm×a thickness of 5 mm×a length of 48 mm were produced using composite materials of the eight types of compositions shown in Table 5, and the baked bodies were machined into test pieces each having a width of 5 mm×a thickness of 5 mm×a length of 30 mm.

Four silver wires (0.2 mmφ) were wound around each test piece, and silver paste was applied thereto and the test piece was dried at 100° C. for 24 hours, and then, baking treatment was performed in nitrogen under the conditions of 450° C. for two hours (a rate of temperature increase: 200° C./hour), whereby current terminals and voltage terminals were formed. The dimensions of each test piece were measured with a micrometer and a microscope.

In addition, the volume resistivity was measured with a potentio/galvanostat. Before the measurement, the atmosphere was replaced with N$_2$ (a purity of greater than or equal to 99.9995%) gas, and the temperature was increased up to 600° C. at a rate of temperature increase of 300° C./hour, and then, the test piece was held therein for about 30 minutes. After that, current (I) was supplied across terminals on the outer side of the sample for 30 seconds, and voltage (V) across terminals on the inner side was measured. Next, the temperature was reduced down to 500° C. at a temperature decreasing rate of (300° C./hour), and the test piece was held therein for about 30 minutes, and then, current and voltage were measured in the same way. Hereinafter, the measurement temperature was set to 400° C., 300° C., 100° C., and room temperature. The volume resistivity (ρv) was calculated from Formula 1 below using the aforementioned data.

$$\rho v = V/I \times S/L \quad \text{(Formula 1)}$$

Herein, ρv: volume resistivity (Ωcm), V: voltage (V) across terminals, I: current (A), S: cross-sectional area of the sample where w×t (cm$^2$) (W indicates the width (cm) of the sample and t indicates the thickness (cm) of the sample), and L: the distance between voltage terminals (cm).

Table 12 below shows the measurement results of the dimensions of the samples.

TABLE 12

Measurement Results of Dimensions

| Composition No. | Composition (Vol %) | Width w(cm) | Thickness t(cm) | Distance between Voltage Terminals L(cm) | S/L |
|---|---|---|---|---|---|
| 1 | MoSi2:50—SiC:50 | 0.5022 | 0.5035 | 0.9919 | 0.255 |
| 2 | MoSi2:40—SiC:30—Si:30 | 0.5024 | 0.5028 | 0.9912 | 0.255 |
| 3 | MoSi2:90—Si:10 | 0.3632 | 0.5019 | 0.9916 | 0.184 |
| 4 | MoSi2:45—SiC:45—Si:10 | 0.5032 | 0.5042 | 0.9916 | 0.256 |
| 5 | MoSi2:50—SiC:40—Si:10 | 0.4995 | 0.5010 | 0.9939 | 0.252 |
| 6 | MoSi2:60—SiC:30—Si:10 | 0.5010 | 0.4984 | 0.9916 | 0.252 |
| 7 | MoSi2:70—SiC:20—Si:10 | 0.4995 | 0.5008 | 0.9900 | 0.253 |
| 8 | MoSi2:80—SiC:10—Si:10 | 0.5010 | 0.4523 | 0.9883 | 0.229 |

As shown in Table 12, each composition was almost accurately machined to have a width and a thickness of 0.50 cm excluding the baked body of Composition No. 3 for which a width of 0.5 cm was not able to be secured during the machining. When Composition No. 3 with insufficient dimensions was machined until a parallel plane appeared, a width of 0.36 cm was obtained. The distance between terminals across which voltage is to be applied is found to be all 0.99 mm, and thus is constant.

Next, voltage values of when a constant amount of current was applied under temperature conditions of every 100° C. from the room temperature to 600° C. were measured to determine the volume resistivities of Compositions No. 1 to No. 8. Tables 13 to 20 below show the results thereof.

TABLE 13

Volume Resistivity of Composition No. 1
($MoSi_2$:50 vol. %-SiC:50 vol. %) at Each Temperature

| Temperature (° C.) | Current (A) | Voltage (V) | Resistance (Ω) | Volume Resistivity (Ω·cm) |
|---|---|---|---|---|
| 21 (Room Temp) | 1.000 | $4.130 \times 10^{-3}$ | $4.13 \times 10^{-3}$ | $1.05 \times 10^{-3}$ |
| 100 | 1.000 | $5.375 \times 10^{-3}$ | $5.38 \times 10^{-3}$ | $1.37 \times 10^{-3}$ |
| 200 | 1.000 | $6.960 \times 10^{-3}$ | $6.96 \times 10^{-3}$ | $1.77 \times 10^{-3}$ |
| 300 | 1.000 | $8.620 \times 10^{-3}$ | $8.62 \times 10^{-3}$ | $2.20 \times 10^{-3}$ |
| 400 | 1.000 | $1.060 \times 10^{-2}$ | $1.06 \times 10^{-2}$ | $2.70 \times 10^{-3}$ |
| 500 | 1.000 | $1.283 \times 10^{-2}$ | $1.28 \times 10^{-2}$ | $3.27 \times 10^{-3}$ |
| 600 | 1.000 | $1.529 \times 10^{-2}$ | $1.53 \times 10^{-2}$ | $3.90 \times 10^{-3}$ |

From Table 13, it is seen that the volume resistivity increases with an increase in temperature from the room temperature, and the volume resistivity at 600° C. is nearly four times that at room temperature. However, the volume resistivity is found to be at a level of ($\times 10^{-3}$) at each temperature. Considering the fact that the volume resistivity of SUS304 is ($1 \times 10^{-4}$), Composition No. 1 is found to be a conductor.

TABLE 14

Volume Resistivity of Composition No. 2
($MoSi_2$:40 vol. %-SiC:30 vol. %-Si:30 vol. %) at Each Temperature

| Temperature (° C.) | Current (A) | Voltage (V) | Resistance (Ω) | Volume Resistivity (Ω·cm) |
|---|---|---|---|---|
| 21 | 1.000 | $9.830 \times 10^{-3}$ | $9.83 \times 10^{-3}$ | $2.51 \times 10^{-3}$ |
| 100 | 1.000 | $1.070 \times 10^{-2}$ | $1.07 \times 10^{-2}$ | $2.73 \times 10^{-3}$ |
| 200 | 1.000 | $1.210 \times 10^{-2}$ | $1.21 \times 10^{-2}$ | $3.08 \times 10^{-3}$ |
| 300 | 1.000 | $1.380 \times 10^{-2}$ | $1.38 \times 10^{-2}$ | $3.52 \times 10^{-3}$ |
| 400 | 1.000 | $1.654 \times 10^{-2}$ | $1.65 \times 10^{-2}$ | $4.22 \times 10^{-3}$ |
| 500 | 1.000 | $1.777 \times 10^{-2}$ | $1.78 \times 10^{-2}$ | $4.53 \times 10^{-3}$ |
| 600 | 1.000 | $2.023 \times 10^{-2}$ | $2.02 \times 10^{-2}$ | $5.16 \times 10^{-3}$ |

From Table 14, it is seen that the volume resistivity increases with an increase in temperature as with Composition 1, and the volume resistivity at 600° C. is double that at room temperature. However, the volume resistivity is found to be at a level of ($\times 10^{-3}$) at each temperature, and Composition No. 2 is also found to be a conductor.

TABLE 15

Volume Resistivity of Composition No. 3
($MoSi_2$:90 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 22 | 1.000 | $4.560 \times 10^{-4}$ | $4.56 \times 10^{-4}$ | $8.36 \times 10^{-5}$ |
| 100 | 1.000 | $6.840 \times 10^{-4}$ | $6.84 \times 10^{-4}$ | $1.25 \times 10^{-4}$ |
| 200 | 1.000 | $9.970 \times 10^{-4}$ | $9.97 \times 10^{-4}$ | $1.83 \times 10^{-4}$ |
| 300 | 1.000 | $1.080 \times 10^{-3}$ | $1.08 \times 10^{-3}$ | $1.98 \times 10^{-4}$ |
| 400 | 1.000 | $1.193 \times 10^{-3}$ | $1.19 \times 10^{-3}$ | $2.19 \times 10^{-4}$ |
| 500 | 1.000 | $1.433 \times 10^{-3}$ | $1.43 \times 10^{-3}$ | $2.63 \times 10^{-4}$ |
| 600 | 1.000 | $1.679 \times 10^{-3}$ | $1.68 \times 10^{-3}$ | $3.08 \times 10^{-4}$ |

From Table 15, it is seen that the volume resistivity increases with an increase in temperature, and the volume resistivity at 600° C. is nearly four times that at room temperature. However, as the volume resistivity is at a level as low as ($\times 10^{-5}$ to $10^{-4}$), Composition No. 3 is found to be a conductor. A decrease in the volume resistivity of Composition No. 3 is considered to be due to the fact that the content of $MoSi_2$ is 90 Vol %, which is the highest.

TABLE 16

Volume Resistivity of Composition No. 4
($MoSi_2$:45 vol. %.-SiC:45 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 22 | 1.000 | $5.980 \times 10^{-2}$ | $5.98 \times 10^{-2}$ | $1.53 \times 10^{-2}$ |
| 100 | 1.000 | $6.238 \times 10^{-2}$ | $6.24 \times 10^{-2}$ | $1.60 \times 10^{-2}$ |
| 200 | 1.000 | $7.060 \times 10^{-2}$ | $7.06 \times 10^{-2}$ | $1.81 \times 10^{-2}$ |
| 300 | 1.000 | $8.850 \times 10^{-2}$ | $8.85 \times 10^{-2}$ | $2.26 \times 10^{-2}$ |
| 400 | 1.000 | $9.597 \times 10^{-2}$ | $9.60 \times 10^{-2}$ | $2.46 \times 10^{-2}$ |
| 500 | 1.000 | $1.024 \times 10^{-1}$ | $1.02 \times 10^{-1}$ | $2.62 \times 10^{-2}$ |
| 600 | 1.000 | $1.112 \times 10^{-1}$ | $1.11 \times 10^{-1}$ | $2.85 \times 10^{-2}$ |

From Table 16, it is seen that the volume resistivity increases with an increase in temperature, and the volume resistivity is at a level of ($\times 10^{-2}$), which is higher than those of the other compositions. This is due to the fact that the content of $MoSi_2$ is low.

TABLE 17

Volume Resistivity of Composition No. 5
($MoSi_2$:50 vol. %-SiC:40 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 26 | $1.00 \times 10^{-1}$ | $2.28 \times 10^{-3}$ | $2.28 \times 10^{-2}$ | $5.74 \times 10^{-3}$ |
| 100 | $1.00 \times 10^{-1}$ | $2.77 \times 10^{-3}$ | $2.77 \times 10^{-2}$ | $6.97 \times 10^{-3}$ |
| 200 | $1.00 \times 10^{-1}$ | $3.46 \times 10^{-3}$ | $3.46 \times 10^{-2}$ | $8.71 \times 10^{-3}$ |
| 300 | $1.00 \times 10^{-1}$ | $3.95 \times 10^{-3}$ | $3.95 \times 10^{-2}$ | $9.95 \times 10^{-3}$ |
| 400 | $1.00 \times 10^{-1}$ | $4.62 \times 10^{-3}$ | $4.62 \times 10^{-2}$ | $1.16 \times 10^{-2}$ |
| 500 | $1.00 \times 10^{-1}$ | $5.32 \times 10^{-3}$ | $5.32 \times 10^{-2}$ | $1.34 \times 10^{-2}$ |
| 600 | $1.00 \times 10^{-1}$ | $5.99 \times 10^{-3}$ | $5.99 \times 10^{-2}$ | $1.51 \times 10^{-2}$ |

TABLE 18

Volume Resistivity of Composition No. 6
($MoSi_2$:60 vol. %-SiC:30 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 26 | $1.00 \times 10^{-1}$ | $2.79 \times 10^{-4}$ | $2.79 \times 10^{-3}$ | $7.03 \times 10^{-4}$ |
| 100 | $1.00 \times 10^{-1}$ | $4.32 \times 10^{-4}$ | $4.32 \times 10^{-3}$ | $1.09 \times 10^{-3}$ |
| 200 | $1.00 \times 10^{-1}$ | $6.65 \times 10^{-4}$ | $6.65 \times 10^{-3}$ | $1.67 \times 10^{-3}$ |
| 300 | $1.00 \times 10^{-1}$ | $7.02 \times 10^{-4}$ | $7.02 \times 10^{-3}$ | $1.77 \times 10^{-3}$ |
| 400 | $1.00 \times 10^{-1}$ | $8.56 \times 10^{-4}$ | $8.56 \times 10^{-3}$ | $2.16 \times 10^{-3}$ |
| 500 | $1.00 \times 10^{-1}$ | $1.05 \times 10^{-3}$ | $1.05 \times 10^{-2}$ | $2.64 \times 10^{-3}$ |
| 600 | $1.00 \times 10^{-1}$ | $1.20 \times 10^{-3}$ | $1.20 \times 10^{-2}$ | $3.02 \times 10^{-3}$ |

TABLE 19

Volume Resistivity of Composition No .7
($MoSi_2$:70 vol. %-SiC:20 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 20 | $1.00 \times 10^{-1}$ | $1.44 \times 10^{-4}$ | $1.44 \times 10^{-3}$ | $3.64 \times 10^{-4}$ |
| 100 | $1.00 \times 10^{-1}$ | $1.86 \times 10^{-4}$ | $1.86 \times 10^{-3}$ | $4.70 \times 10^{-4}$ |
| 200 | $1.00 \times 10^{-1}$ | $2.48 \times 10^{-4}$ | $2.48 \times 10^{-3}$ | $6.27 \times 10^{-4}$ |

TABLE 19-continued

Volume Resistivity of Composition No .7
(MoSi$_2$:70 vol. %-SiC:20 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 300 | $1.00 \times 10^{-1}$ | $2.90 \times 10^{-4}$ | $2.90 \times 10^{-3}$ | $7.33 \times 10^{-4}$ |
| 400 | $1.00 \times 10^{-1}$ | $3.58 \times 10^{-4}$ | $3.58 \times 10^{-3}$ | $9.05 \times 10^{-4}$ |
| 500 | $1.00 \times 10^{-1}$ | $4.32 \times 10^{-4}$ | $4.32 \times 10^{-3}$ | $1.09 \times 10^{-3}$ |
| 600 | $1.00 \times 10^{-1}$ | $4.87 \times 10^{-4}$ | $4.87 \times 10^{-3}$ | $1.23 \times 10^{-3}$ |

TABLE 20

Volume Resistivity of Composition No. 8
(MoSi$_2$:80 vol. %-SiC:10 vol. %-Si:10 vol. %) at Each Temperature

| Temperature (° C.) | Current (A) | Voltage (V) | Resistance (Ω) | Volume Resistivity (Ω·cm) |
|---|---|---|---|---|
| 20 | $1.00 \times 10^{-1}$ | $4.53 \times 10^{-5}$ | $4.53 \times 10^{-4}$ | $1.04 \times 10^{-4}$ |
| 100 | $1.00 \times 10^{-1}$ | $6.37 \times 10^{-5}$ | $8.37 \times 10^{-4}$ | $1.46 \times 10^{-4}$ |
| 200 | $1.00 \times 10^{-1}$ | $8.21 \times 10^{-5}$ | $8.21 \times 10^{-4}$ | $1.88 \times 10^{-4}$ |
| 300 | $1.00 \times 10^{-1}$ | $1.00 \times 10^{-4}$ | $1.00 \times 10^{-3}$ | $2.29 \times 10^{-4}$ |
| 400 | $1.00 \times 10^{-1}$ | $1.19 \times 10^{-4}$ | $1.19 \times 10^{-3}$ | $2.73 \times 10^{-4}$ |
| 500 | $1.00 \times 10^{-1}$ | $1.43 \times 10^{-4}$ | $1.43 \times 10^{-3}$ | $3.28 \times 10^{-4}$ |
| 600 | $1.00 \times 10^{-1}$ | $1.80 \times 10^{-4}$ | $1.80 \times 10^{-3}$ | $4.13 \times 10^{-4}$ |

From Tables 17-20, it is seen that the volume resistivity of each composition is at a level of ($\times 10^{-2} \times 10^{-4}$) and exhibits similar characteristics, and each composition is thus found to be a conductor.

From the above results, the compositions of baked bodies of the eight types of compositions and the volume resistivities thereof at room temperature to 600° C. are shown in Table 21 below. Further, the high-temperature volume resistivities of Compositions No. 1 to 4 and Compositions No. 5 to 8 are shown in FIGS. 13a and 13b, respectively.

TABLE 21

| Composition No. | (Vol %) MoSi2 | SiC | Si | Measurement Temperature (° C.) 20 | 100 | 200 | 300 | 400 | 500 | 600 |
|---|---|---|---|---|---|---|---|---|---|---|
| 1 | 50 | 50 | 0 | $1.05 \times 10^{-3}$ | $1.37 \times 10^{-3}$ | $1.77 \times 10^{-3}$ | $2.20 \times 10^{-3}$ | $2.70 \times 10^{-3}$ | $3.27 \times 10^{-3}$ | $3.90 \times 10^{-3}$ |
| 2 | 40 | 30 | 30 | $2.51 \times 10^{-3}$ | $2.73 \times 10^{-3}$ | $3.08 \times 10^{-3}$ | $3.52 \times 10^{-3}$ | $4.22 \times 10^{-3}$ | $4.53 \times 10^{-3}$ | $5.16 \times 10^{-3}$ |
| 3 | 90 | 10 | 10 | $8.36 \times 10^{-5}$ | $1.25 \times 10^{-4}$ | $1.83 \times 10^{-4}$ | $1.98 \times 10^{-4}$ | $2.19 \times 10^{-4}$ | $2.63 \times 10^{-4}$ | $3.09 \times 10^{-4}$ |
| 4 | 45 | 45 | 10 | $1.53 \times 10^{-2}$ | $1.60 \times 10^{-2}$ | $1.81 \times 10^{-2}$ | $2.26 \times 10^{-2}$ | $2.46 \times 10^{-2}$ | $2.62 \times 10^{-2}$ | $2.85 \times 10^{-2}$ |
| 5 | 50 | 40 | 10 | $5.7 \times 10^{-3}$ | $6.97 \times 10^{-3}$ | $8.71 \times 10^{-3}$ | $9.95 \times 10^{-3}$ | $1.16 \times 10^{-2}$ | $1.34 \times 10^{-2}$ | $1.51 \times 10^{-2}$ |
| 6 | 60 | 30 | 10 | $7.03 \times 10^{-4}$ | $1.09 \times 10^{-3}$ | $1.67 \times 10^{-3}$ | $1.77 \times 10^{-3}$ | $2.16 \times 10^{-3}$ | $2.64 \times 10^{-3}$ | $3.02 \times 10^{-3}$ |
| 7 | 70 | 20 | 10 | $3.64 \times 10^{-4}$ | $4.70 \times 10^{-4}$ | $6.27 \times 10^{-4}$ | $7.33 \times 10^{-4}$ | $9.05 \times 10^{-4}$ | $1.09 \times 10^{-3}$ | $1.23 \times 10^{-3}$ |
| 8 | 80 | 10 | 10 | $1.04 \times 10^{-4}$ | $1.46 \times 10^{-4}$ | $1.88 \times 10^{-4}$ | $2.29 \times 10^{-4}$ | $2.73 \times 10^{-4}$ | $3.28 \times 10^{-4}$ | $4.13 \times 10^{-4}$ |

Figure 13:
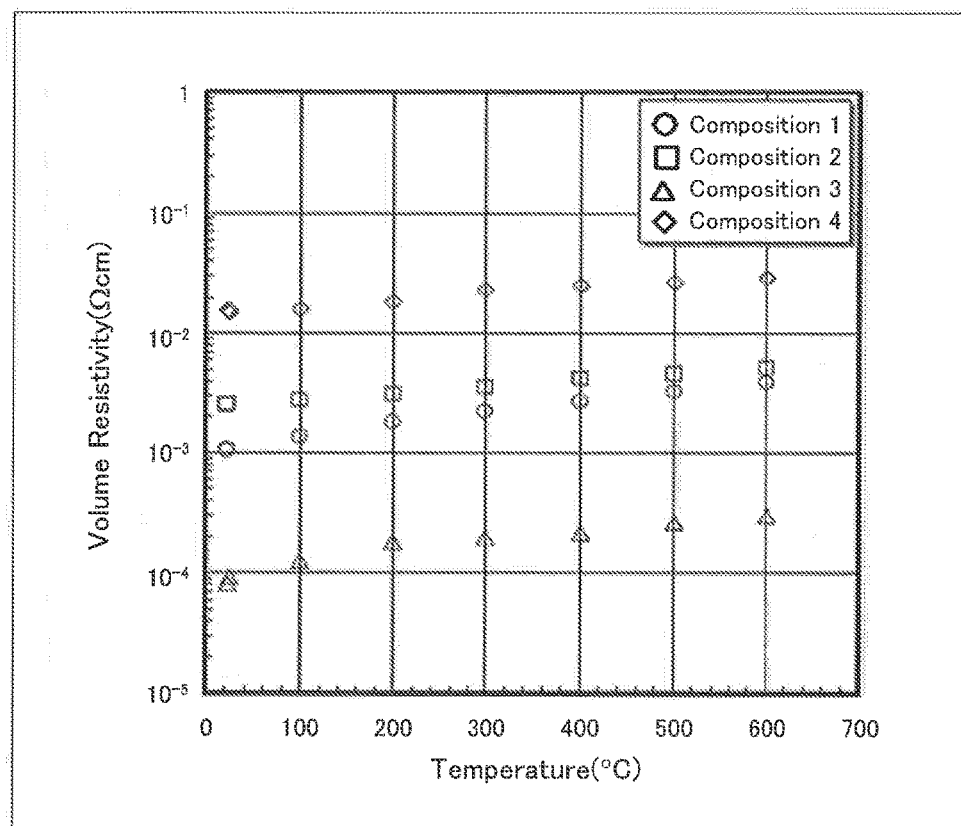
FIG. 13(a) is a diagram showing the relationship between the temperature and the volume resistivity of each of Compositions No. 1 to No. 4.
FIG. 13(b) is a diagram showing the relationship between the temperature and the volume resistivity of Compositions No. 5 to No. 8.
Figure 13:
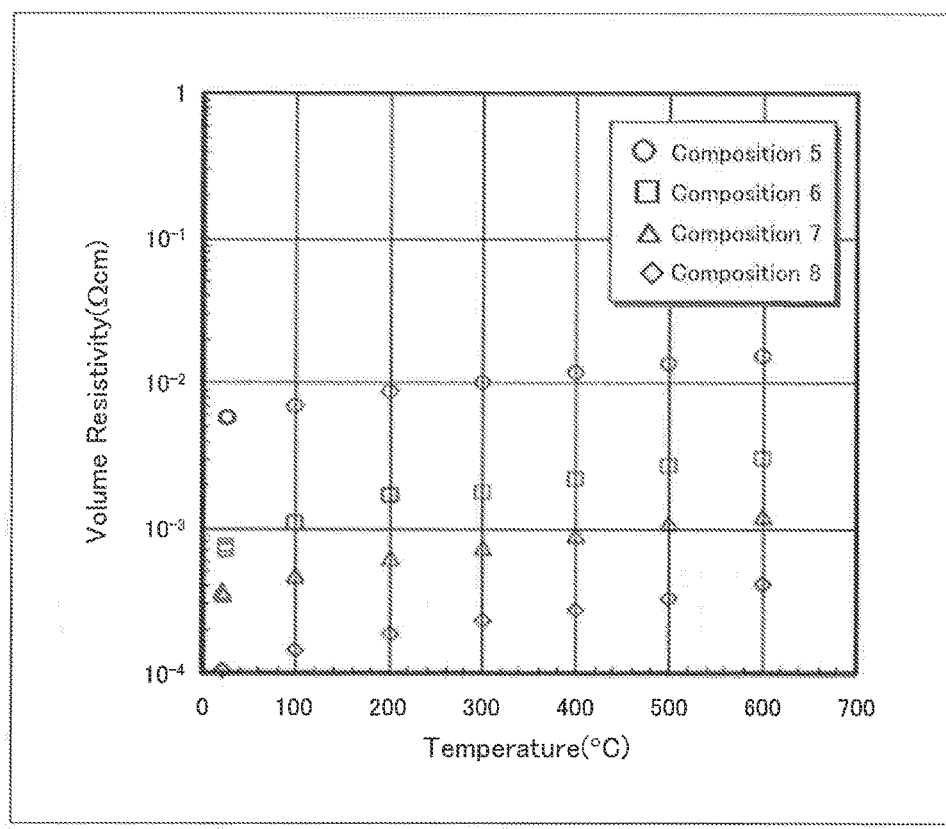

From FIGS. 13a and 13b, it is seen that the volume resistivities of the baked bodies of the eight types of compositions slightly exhibit positive temperature dependence, but the dependence is low and the volume resistivities are stable. In addition, as the volume resistivities are at a level as low as ($\times 10^{-2} \times 10^{-5}$), such materials are found to be conductors.

The volume resistivities of the eight compositions are rearranged in order of decreasing content of MoSi$_2$, as shown in Table 22 below.

TABLE 22

| Composition No. | (Vol %) MoSi2 | SiC | Si | Measurement Temperature (° C.) 20 | 100 | 200 | 300 | 400 | 500 | 600 |
|---|---|---|---|---|---|---|---|---|---|---|
| 3 | 90 | 0 | 10 | $8.36 \times 10^{-2}$ | $1.25 \times 10^{-4}$ | $1.83 \times 10^{-4}$ | $1.98 \times 10^{-4}$ | $2.19 \times 10^{-4}$ | $2.63 \times 10^{-4}$ | $3.09 \times 10^{-4}$ |
| 8 | 80 | 10 | 10 | $1.04 \times 10^{-4}$ | $1.46 \times 10^{-4}$ | $1.88 \times 10^{-4}$ | $2.29 \times 10^{-4}$ | $2.73 \times 10^{-4}$ | $3.28 \times 10^{-4}$ | $4.13 \times 10^{-4}$ |
| 7 | 70 | 20 | 10 | $3.64 \times 10^{-4}$ | $4.70 \times 10^{-4}$ | $6.27 \times 10^{-4}$ | $7.33 \times 10^{-4}$ | $9.05 \times 10^{-4}$ | $1.09 \times 10^{-3}$ | $1.23 \times 10^{-3}$ |
| 6 | 60 | 30 | 10 | $7.03 \times 10^{-4}$ | $1.09 \times 10^{-3}$ | $1.67 \times 10^{-3}$ | $1.77 \times 10^{-3}$ | $2.16 \times 10^{-3}$ | $2.64 \times 10^{-3}$ | $3.02 \times 10^{-3}$ |
| 5 | 50 | 40 | 10 | $5.7 \times 10^{-3}$ | $6.97 \times 10^{-3}$ | $8.71 \times 10^{-3}$ | $9.95 \times 10^{-3}$ | $1.16 \times 10^{-2}$ | $1.34 \times 10^{-2}$ | $1.51 \times 10^{-2}$ |
| 1 | 50 | 50 | 0 | $1.05 \times 10^{-3}$ | $1.37 \times 10^{-3}$ | $1.77 \times 10^{-3}$ | $2.20 \times 10^{-3}$ | $2.70 \times 10^{-3}$ | $3.27 \times 10^{-3}$ | $3.90 \times 10^{-3}$ |
| 4 | 45 | 45 | 10 | $1.53 \times 10^{-2}$ | $1.60 \times 10^{-2}$ | $1.81 \times 10^{-2}$ | $2.26 \times 10^{-2}$ | $2.46 \times 10^{-2}$ | $2.62 \times 10^{-2}$ | $2.85 \times 10^{-2}$ |
| 2 | 40 | 30 | 30 | $2.51 \times 10^{-3}$ | $2.73 \times 10^{-3}$ | $3.08 \times 10^{-3}$ | $3.52 \times 10^{-3}$ | $4.22 \times 10^{-3}$ | $4.53 \times 10^{-3}$ | $5.16 \times 10^{-3}$ |

Figure 14:
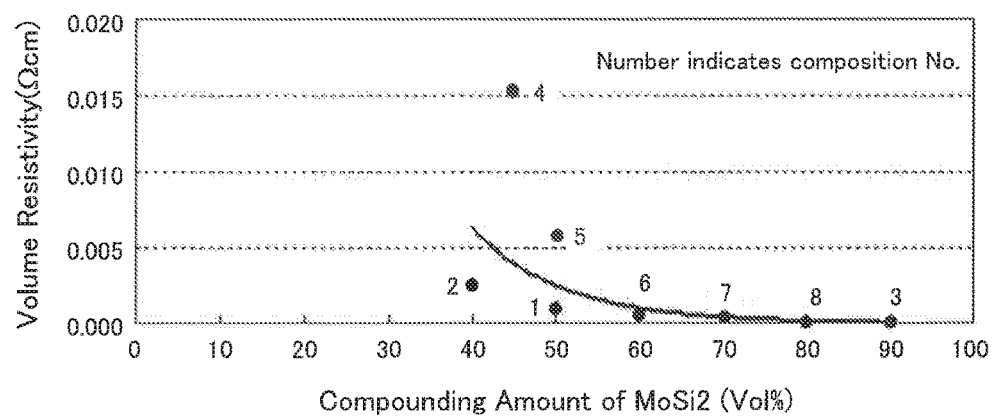
FIG. 14(a) is a diagram showing the relationship between the content of $MoSi_2$ and the volume resistivity of each of Compositions No. 1 to No. 8 at room temperature.
FIG. 14(b) is a diagram showing the relationship between the content of $MoSi_2$ and the volume resistivity of each of Compositions No. 1 to No. 8 at 600° C.
Figure 14:
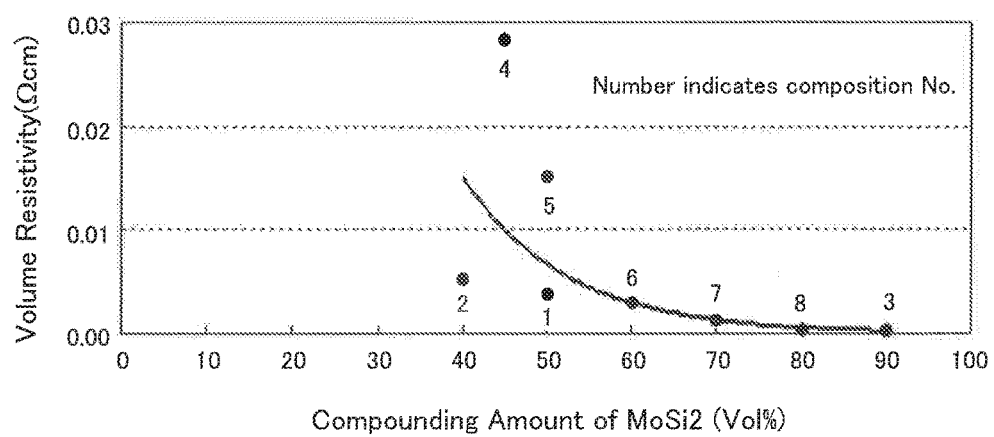

FIGS. 14a and 14b are diagrams obtained by plotting the volume resistivity at room temperature and at 600° C., as representative examples, relative to the content of $MoSi_2$, respectively, on the basis of the data in Table 22. It is found that the volume resistivity tends to decrease with an increase in the content of $MoSi_2$ at each of the room temperature and 600° C.

Accordingly, it is found that the volume resistivities of the eight types of baked bodies are at a level as low as ($\times 10^{-2}$ to $10^{-5}$) at room temperature to 600° C., and thus the baked bodies are found to be conductors with further lower temperature dependence and stable volume resistivity. Thus, such materials can be concluded as composite materials that are promising as the materials for an electrode terminal and an electrode film of an EV-EHC.

(Evaluation of High-Temperature Volume Resistivities of $MoSi_2$/SiC/Si-Based Baked Bodies Subjected to Oxidation Treatment and not Subjected to Oxidation Treatment)

Herein, the volume resistivities at room temperature to 600° C. of baked bodies of $MoSi_2$/SiC/Si-based composite materials, which have been subjected to oxidation treatment and not subjected to oxidation treatment, are measured.

As the experimental method, first, square bar-shaped molded bodies were produced from materials of Compositions No. 1 to 8, and the molded bodies were then baked at 1500 CC for 4 hours. Then, the resulting baked bodies were machined into test pieces for oxidation test each having dimensions of 5×5×30 mm. Each test piece was mounted on an $Al_2O_3$ baked body and was loaded into an electric furnace, and then, the temperature was increased from the room temperature up to 1000° C. at a rate of 10° C./minute. The test piece was held therein for a predetermined time of 24 hours, 48 hours, 96 hours, or 192 hours, and was then cooled in the furnace. Electrode terminals were formed from test pieces, which have been subjected to oxidation treatment and not subjected to oxidation treatment, and the volume resistivity in nitrogen at room temperature to 600° C. was measured using a four-terminal method. Measurement of the volume resistivity with the four-terminal method was performed based on the conventional method.

Table 23 below shows the measurement results of the volume resistivity. It should be noted that with respect to Compositions 1, 2, 3, and 4, there is no data on the compositions at 200° C. that have not been subjected to oxidation treatment and the compositions that have been subjected to oxidation treatment for 24 hours and 96 hours.

TABLE 23

Volume Resistivities at Room Temperature to 900° C. after Subjected to Heat Treatment at 1000° C. for 192 Hours

| No. | Composition (vol %) | Time (Hr) | Measurement Temperature | | | | | | |
|---|---|---|---|---|---|---|---|---|---|
| | | | 600° C. | 500° C. | 400° C. | 300° C. | 200° C. | 100° C. | 20° C. (Room Temp) |
| 1 | MoSi2:50 —SiC:50 | 0 | $3.90 \times 10^{-3}$ | $3.27 \times 10^{-3}$ | $2.70 \times 10^{-3}$ | $2.20 \times 10^{-3}$ | | $1.37 \times 10^{-3}$ | $1.05 \times 10^{-3}$ |
| | | 192 | $1.15 \times 10^{-2}$ | $1.04 \times 10^{-2}$ | $8.73 \times 10^{-3}$ | $7.31 \times 10^{-3}$ | | $4.92 \times 10^{-3}$ | $3.93 \times 10^{-3}$ |
| 2 | MoSi2:40 —SiC:30 —Si:30 | 0 | $5.16 \times 10^{-3}$ | $4.53 \times 10^{-3}$ | $4.22 \times 10^{-3}$ | $3.52 \times 10^{-3}$ | | $2.73 \times 10^{-3}$ | $2.53 \times 10^{-3}$ |
| | | 192 | $5.60 \times 10^{-2}$ | $9.26 \times 10^{-2}$ | $1.18 \times 10^{-1}$ | $1.28 \times 10^{-1}$ | | $1.45 \times 10^{-1}$ | $1.51 \times 10^{-1}$ |
| 3 | MoSi2:90 —Si:10 | 0 | $3.08 \times 10^{-4}$ | $2.53 \times 10^{-4}$ | $2.19 \times 10^{-4}$ | $1.98 \times 10^{-4}$ | | $1.25 \times 10^{-4}$ | $9.28 \times 10^{-5}$ |
| | | 192 | $3.40 \times 10^{-4}$ | $2.80 \times 10^{-4}$ | $2.39 \times 10^{-4}$ | $1.95 \times 10^{-4}$ | | $1.14 \times 10^{-4}$ | $8.38 \times 10^{-5}$ |
| 4 | MoSi2:45 —SiC:45 —Si:10 | 0 | $2.85 \times 10^{-2}$ | $2.62 \times 10^{-2}$ | $2.46 \times 10^{-2}$ | $2.26 \times 10^{-2}$ | | $1.60 \times 10^{-2}$ | $1.50 \times 10^{-2}$ |
| | | 192 | $4.80 \times 10^{-1}$ | $4.84 \times 10^{-1}$ | $4.60 \times 10^{-1}$ | $4.39 \times 10^{-1}$ | | $4.58 \times 10^{-1}$ | $5.19 \times 10^{-1}$ |
| 5 | MoSi2:50 —SiC:40 —Si:10 | 0 | $1.51 \times 10^{-2}$ | $1.34 \times 10^{-2}$ | $1.16 \times 10^{-2}$ | $9.95 \times 10^{-3}$ | $8.71 \times 10^{-3}$ | $6.97 \times 10^{-3}$ | $5.74 \times 10^{-3}$ |
| | | 24 | $1.09 \times 10^{-2}$ | $8.70 \times 10^{-3}$ | $7.69 \times 10^{-3}$ | $6.52 \times 10^{-3}$ | $5.70 \times 10^{-3}$ | $4.59 \times 10^{-3}$ | $3.11 \times 10^{-3}$ |
| | | 96 | $1.85 \times 10^{-2}$ | $1.61 \times 10^{-2}$ | $1.44 \times 10^{-2}$ | $1.28 \times 10^{-2}$ | $1.14 \times 10^{-2}$ | $9.44 \times 10^{-3}$ | $8.19 \times 10^{-3}$ |
| | | 192 | $5.29 \times 10^{-2}$ | $5.01 \times 10^{-2}$ | $4.30 \times 10^{-2}$ | $4.09 \times 10^{-2}$ | $4.00 \times 10^{-2}$ | $4.11 \times 10^{-2}$ | $4.93 \times 10^{-2}$ |
| 6 | MoSi2:60 —SiC:30 —Si:10 | 0 | $3.02 \times 10^{-3}$ | $2.64 \times 10^{-3}$ | $2.16 \times 10^{-3}$ | $1.77 \times 10^{-3}$ | $1.67 \times 10^{-3}$ | $1.09 \times 10^{-3}$ | $7.48 \times 10^{-4}$ |
| | | 24 | $2.46 \times 10^{-3}$ | $1.96 \times 10^{-3}$ | $1.70 \times 10^{-3}$ | $1.39 \times 10^{-3}$ | $1.17 \times 10^{-3}$ | $8.46 \times 10^{-4}$ | $7.04 \times 10^{-4}$ |
| | | 96 | $3.10 \times 10^{-3}$ | $2.68 \times 10^{-3}$ | $2.34 \times 10^{-3}$ | $1.99 \times 10^{-3}$ | $1.58 \times 10^{-3}$ | $1.23 \times 10^{-3}$ | $8.66 \times 10^{-4}$ |
| | | 192 | $8.40 \times 10^{-3}$ | $7.22 \times 10^{-3}$ | $6.35 \times 10^{-3}$ | $5.45 \times 10^{-3}$ | $4.61 \times 10^{-3}$ | $3.26 \times 10^{-3}$ | $2.43 \times 10^{-3}$ |
| 7 | MoSi2:70 —SC:20 —Si10 | 0 | $1.23 \times 10^{-3}$ | $1.09 \times 10^{-3}$ | $9.05 \times 10^{-4}$ | $7.33 \times 10^{-4}$ | $5.27 \times 10^{-4}$ | $4.70 \times 10^{-4}$ | $3.46 \times 10^{-4}$ |
| | | 24 | $8.92 \times 10^{-4}$ | $3.31 \times 10^{-4}$ | $3.35 \times 10^{-4}$ | $5.21 \times 10^{-4}$ | $6.12 \times 10^{-4}$ | $4.55 \times 10^{-4}$ | $2.71 \times 10^{-4}$ |
| | | 96 | $1.77 \times 10^{-3}$ | $1.48 \times 10^{-3}$ | $9.18 \times 10^{-4}$ | $6.08 \times 10^{-4}$ | $5.44 \times 10^{-4}$ | $4.49 \times 10^{-4}$ | $2.94 \times 10^{-4}$ |
| | | 192 | $1.16 \times 10^{-3}$ | $1.03 \times 10^{-3}$ | $5.45 \times 10^{-4}$ | $7.04 \times 10^{-4}$ | $5.97 \times 10^{-4}$ | $4.85 \times 10^{-4}$ | $3.57 \times 10^{-4}$ |
| 8 | MoSi2:80 —SiC:10 —Si-10 | 0 | $4.13 \times 10^{-4}$ | $3.28 \times 10^{-4}$ | $2.73 \times 10^{-4}$ | $2.29 \times 10^{-4}$ | $1.88 \times 10^{-4}$ | $1.46 \times 10^{-4}$ | $1.04 \times 10^{-4}$ |
| | | 24 | $8.14 \times 10^{-4}$ | $2.49 \times 10^{-4}$ | $2.61 \times 10^{-4}$ | $1.38 \times 10^{-4}$ | $2.32 \times 10^{-4}$ | $2.12 \times 10^{-4}$ | $1.25 \times 10^{-4}$ |
| | | 96 | $5.50 \times 10^{-4}$ | $3.25 \times 10^{-4}$ | $2.48 \times 10^{-4}$ | $2.95 \times 10^{-4}$ | $3.05 \times 10^{-4}$ | $2.50 \times 10^{-4}$ | $2.00 \times 10^{-4}$ |
| | | 192 | $6.38 \times 10^{-4}$ | $4.49 \times 10^{-4}$ | $3.99 \times 10^{-4}$ | $3.25 \times 10^{-4}$ | $2.61 \times 10^{-4}$ | $1.87 \times 10^{-4}$ | $1.33 \times 10^{-4}$ |

From the series of data in Table 23, the volume resistivity (Ωcm) at room temperature of each of the baked bodies of the eight types of compositions, which have been subjected to oxidation treatment at 1000° C. for 24 to 192 hours, is shown in Table 24 below.

TABLE 24

Volume Resistivities (Ωm) at Room Temperature of Baked Bodies Subjected to Oxidation Treatment at 1000° C. for Predetermined Time

| Composition No. | Composition (vol %) | Oxidation Treatment Time (Hr) | | | |
|---|---|---|---|---|---|
| | | 0 | 24 | 96 | 192 |
| 1 | MoSi$_2$:50 | $1.05 \times 10^{-3}$ | | | $3.93 \times 10^{-3}$ |
| 2 | MoSi$_2$:40—SiC:30 | $2.53 \times 10^{-3}$ | | | $1.51 \times 10^{-1}$ |
| 3 | MoSi$_2$:90 | $9.28 \times 10^{-5}$ | | | $8.38 \times 10^{-5}$ |
| 4 | MoSi$_2$:45—SiC:45 | $1.50 \times 10^{-2}$ | | | $5.19 \times 10^{-1}$ |
| 5 | MoSi$_2$:50—SiC:40 | $5.74 \times 10^{-3}$ | $3.11 \times 10^{-3}$ | $8.19 \times 10^{-3}$ | $4.93 \times 10^{-2}$ |
| 6 | MoSi$_2$:60—SiC:30 | $7.48 \times 10^{-4}$ | $7.04 \times 10^{-4}$ | $8.66 \times 10^{-4}$ | $2.43 \times 10^{-3}$ |
| 7 | MoSi$_2$:70—SiC:20 | $3.46 \times 10^{-4}$ | $2.71 \times 10^{-4}$ | $2.94 \times 10^{-4}$ | $3.57 \times 10^{-4}$ |
| 8 | MoSi$_2$:80—SiC:10 | $1.04 \times 10^{-4}$ | $1.25 \times 10^{-4}$ | $2.00 \times 10^{-4}$ | $1.33 \times 10^{-4}$ |

Figure 15:
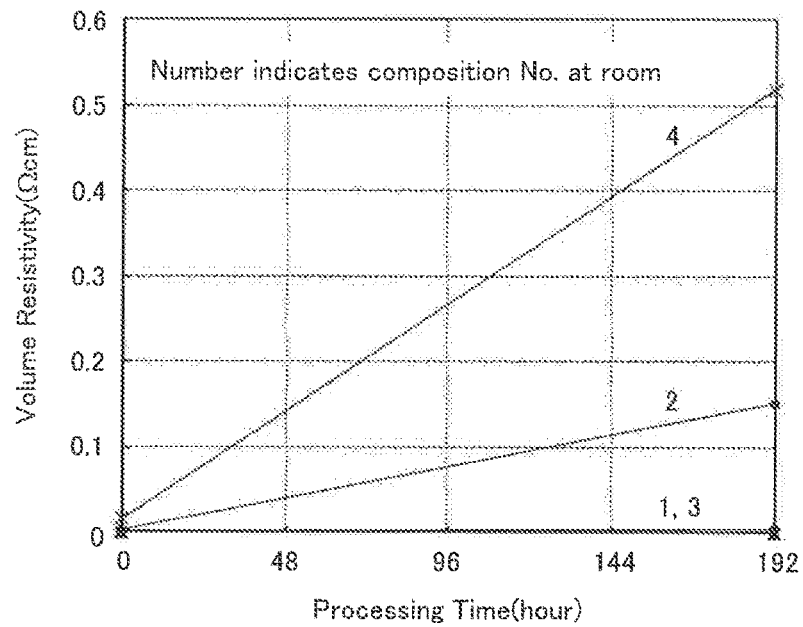
FIG. 15(a) is a diagram showing the relationship between the heat treatment time and the volume resistivity of each of Compositions No. 1 to No. 4 subjected to heat treatment at 1000° C. (a case at room temperature).
FIG. 15(b) is a diagram showing the relationship between the heat treatment time and the volume resistivity of each of Compositions No. 5 to No. 8 subjected to heat treatment at 1000° C. (a case at room temperature).
Figure 15:
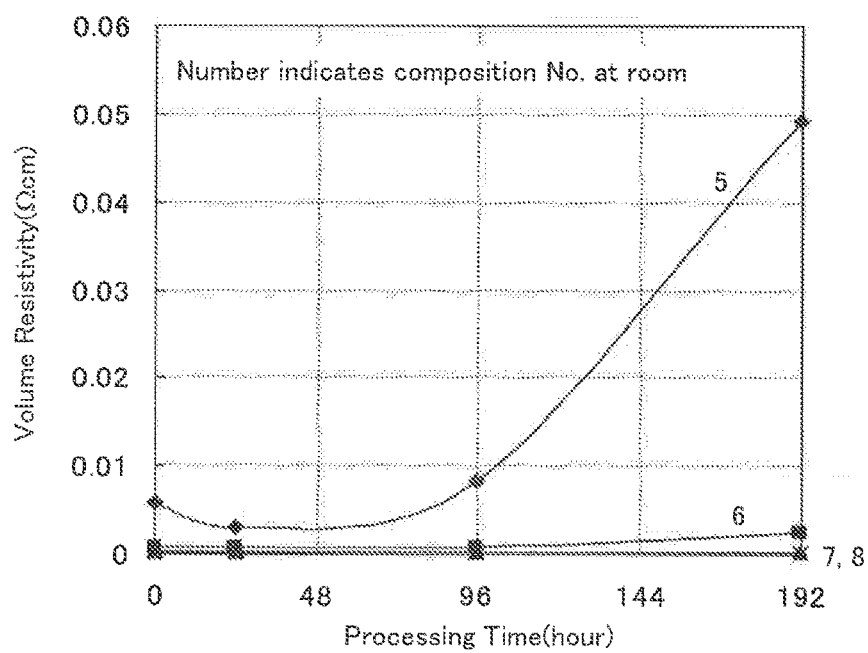

FIGS. 15a and 15b show the volume resistivities at room temperature of the baked bodies of Compositions No. 1 to 4 and the volume resistivities at room temperature of the baked bodies of Compositions No. 5 to 8 that have been subjected to oxidation treatment at 1000° C. for a predetermine time, respectively.

From Table 24 and FIGS. 15a and 15b, it is seen that the volume resistivities of Compositions No. 4, 2, and 5 increase with an increase in the treatment time, and the values satisfy No. 4>No. 2>No. 5. However, the volume resistivity after oxidation treatment for 192 hours is $5.19 \times 10^{-1}$ (Ωcm) at the highest. Meanwhile, with respect to Compositions No. 1, 3, 6, 7, and 8, no dependence of the volume resistivity on the treatment time is recognized, and the volume resistivity is at a level as low as $10^{-3}$ to $10^{-5}$ (Ωcm), and such compositions are thus found to be conductors. That is, as the volume resistivities at room temperature of the baked bodies of the eight types of compositions, which have been subjected to oxidation treatment at 1000° C. for 192 hours, are low, such compositions are found to be materials with excellent oxidation resistance even in terms of electrical characteristics.

Next, from the series of data in Table 23, the volume resistivities (Ωm) at 600° C. of the baked bodies of the eight types of compositions, which have been subjected to oxidation treatment at 1000° C. for 24 to 192 hours, are shown in Table 25.

TABLE 25

Volume Resistivities (Ωm) at Room Temperature of Baked Bodies Subjected to Oxidation Treatment at 1000° C. for Predetermined Time

| Number No. | Composition (Vol %) | Oxidation Treatment Time (Hr) | | | |
|---|---|---|---|---|---|
| | | 0 | 24 | 96 | 192 |
| 1 | MoSi$_2$:50 | $3.90 \times 10^{-3}$ | | | $1.15 \times 10^{-2}$ |
| 2 | MoSi$_2$:40—SiC:30 | $5.16 \times 10^{-3}$ | | | $5.60 \times 10^{-2}$ |
| 3 | MoSi$_2$:90 | $3.08 \times 10^{-4}$ | | | $3.40 \times 10^{-4}$ |
| 4 | MoSi$_2$:45—SiC:45 | $2.85 \times 10^{-2}$ | | | $4.80 \times 10^{-1}$ |
| 5 | MoSi$_2$:50—SiC:40 | $1.51 \times 10^{-2}$ | $1.09 \times 10^{-2}$ | $1.85 \times 10^{-2}$ | $5.29 \times 10^{-2}$ |
| 6 | MoSi$_2$:60—SiC:30 | $3.02 \times 10^{-3}$ | $2.46 \times 10^{-3}$ | $3.10 \times 10^{-3}$ | $8.40 \times 10^{-3}$ |
| 7 | MoSi$_2$:70—SiC:20 | $1.23 \times 10^{-3}$ | $8.92 \times 10^{-4}$ | $1.77 \times 10^{-3}$ | $1.16 \times 10^{-3}$ |
| 8 | MoSi$_2$:80—SiC:10 | $4.13 \times 10^{-4}$ | $8.14 \times 10^{-4}$ | $5.50 \times 10^{-4}$ | $6.38 \times 10^{-4}$ |

Figure 16:
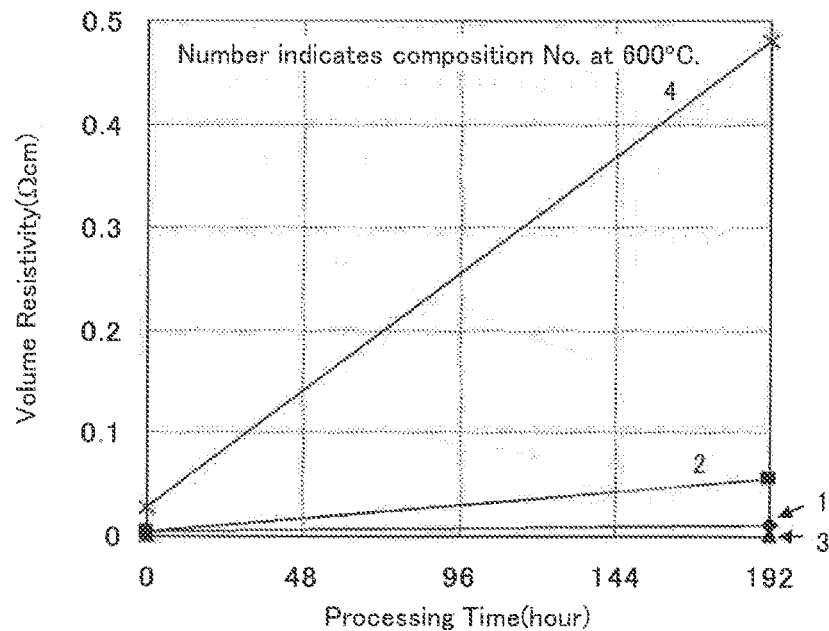
FIG. 16(a) is a diagram showing the relationship between the heat treatment time and the volume resistivity of each of Compositions No. 1 to No. 4 subjected to heat treatment at 1000° C. (a case at 600° C.).
FIG. 16(b) is a diagram showing the relationship between the heat treatment time and the volume resistivity of each of Compositions No. 5 to No. 8 subjected to heat treatment at 1000° C. (a case at 600° C.).
Figure 16:
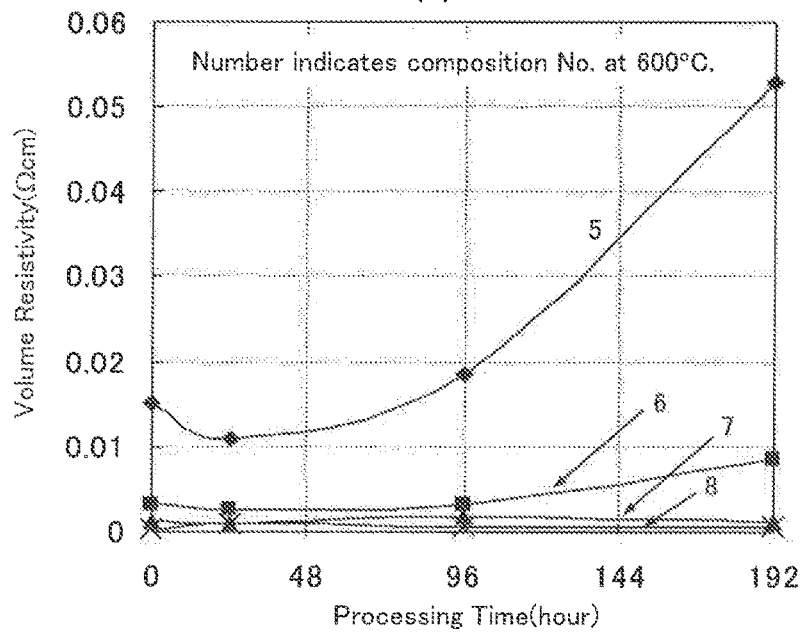

FIGS. 16a and 16b show the volume resistivities at 600° C. of the baked bodies of Compositions No. 1 to 4 and the baked bodies of Compositions No. 5 to 8 that have been subjected to oxidation treatment at 1000° C. for a predetermined time, respectively.

From Table 25 and FIGS. 16a and 16b, it is seen that the volume resistivities of Compositions No. 4, 2, and 5 increase with an increase in the treatment time at 600° C. as at room temperature, and the values satisfy No. 4>No. 2>No. 5. However, the volume resistivity after oxidation treatment for 192 hours is $4.80 \times 10^{-1}$ (Ωcm) at the highest. Meanwhile, with respect to Compositions No. 1, 3, 6, 7, and 8, no dependence of the volume resistivity on the treatment time is recognized, and the volume resistivity is at a level as low as $10^{-2}$ to $10^{-4}$ (Ωcm), and such compositions are thus found to be conductors. That is, as the volume resistivities at 600° C. of the baked bodies of the eight types of compositions, which have been subjected to oxidation treatment at 1000° C. for 192 hours, are low, such compositions are found to be materials with excellent oxidation resistance even in terms of electrical characteristics.

Next, FIGS. 17a to 17h show the high-temperature volume resistivities at 20 to 600° C. of the baked bodies of the eight types of compositions that have been subjected to high-temperature oxidation treatment and not subjected to such treatment.

Figure 17:
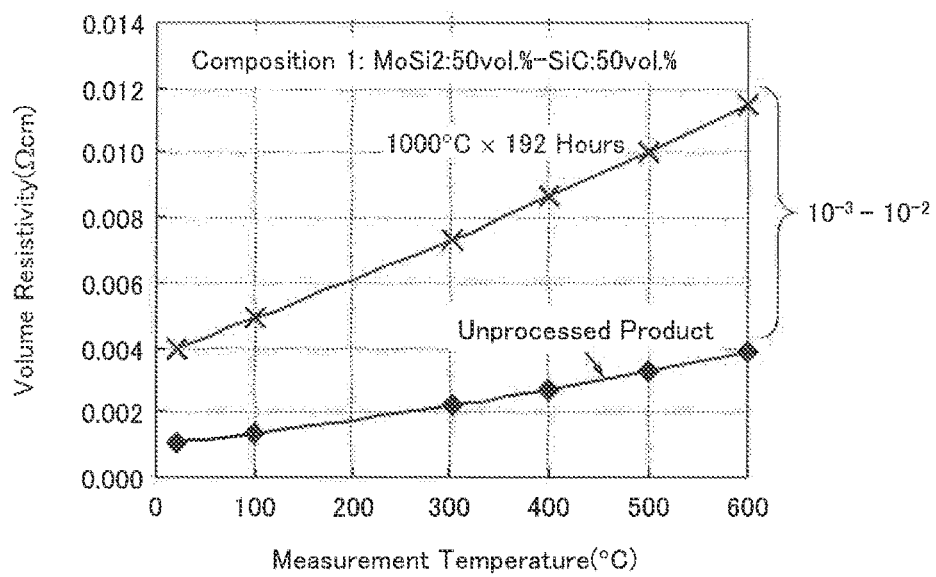
FIG. 17(a) is a diagram showing the relationship between the temperature and the volume resistivity of Composition No. 1 subjected to heat treatment at 1000° C. and of Composition No. 1 not subjected to heat treatment.
FIG. 17(b) is a diagram showing the relationship between the temperature and the volume resistivity of Composition No. 2 subjected to heat treatment at 1000° C. and of Composition No. 2 not subjected to heat treatment.
FIG. 17(c) is a diagram showing the relationship between the temperature and the volume resistivity of Composition No. 3 subjected to heat treatment at 1000° C. and of Composition No. 3 not subjected to heat treatment.
FIG. 17(d) is a diagram showing the relationship between the temperature and the volume resistivity of Composition No. 4 subjected to heat treatment at 1000° C. and of Composition No. 4 not subjected to heat treatment.
FIG. 17(e) is a diagram showing the relationship between the temperature and the volume resistivity of Composition No. 5 subjected to heat treatment at 1000° C. and of Composition No. 5 not subjected to heat treatment.
FIG. 17(f) is a diagram showing the relationship between the temperature and the volume resistivity of Composition No. 6 subjected to heat treatment at 1000° C. and of Composition No. 6 not subjected to heat treatment.
FIG. 17(g) is a diagram showing the relationship between the temperature and the volume resistivity of Composition No. 7 subjected to heat treatment at 1000° C. and of Composition No. 7 not subjected to heat treatment.
FIG. 17(h) is a diagram showing the relationship between the temperature and the volume resistivity of Composition No. 8 subjected to heat treatment at 1000° C. and of Composition No. 8 not subjected to heat treatment.
Figure 17:
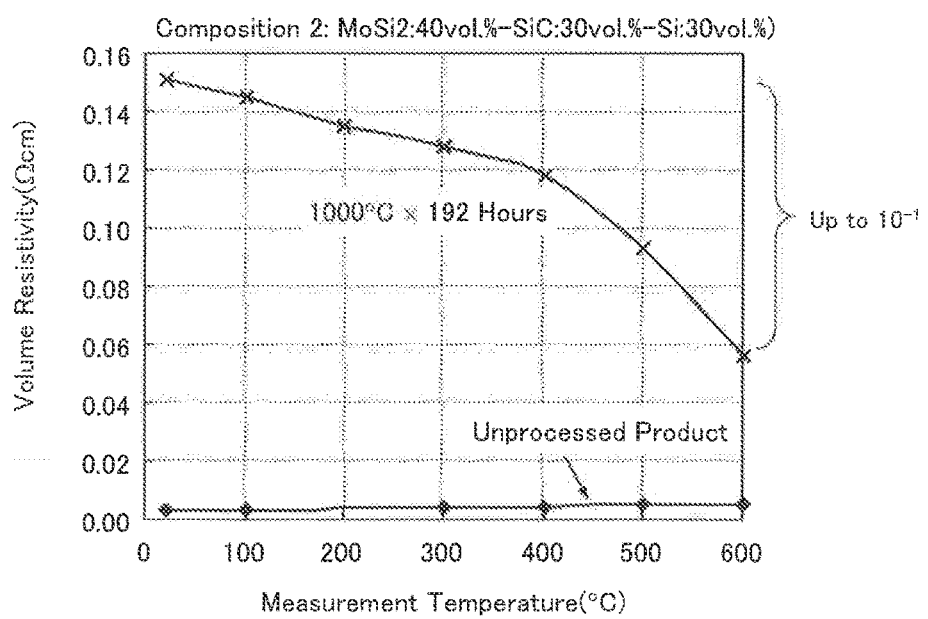
Figure 17:
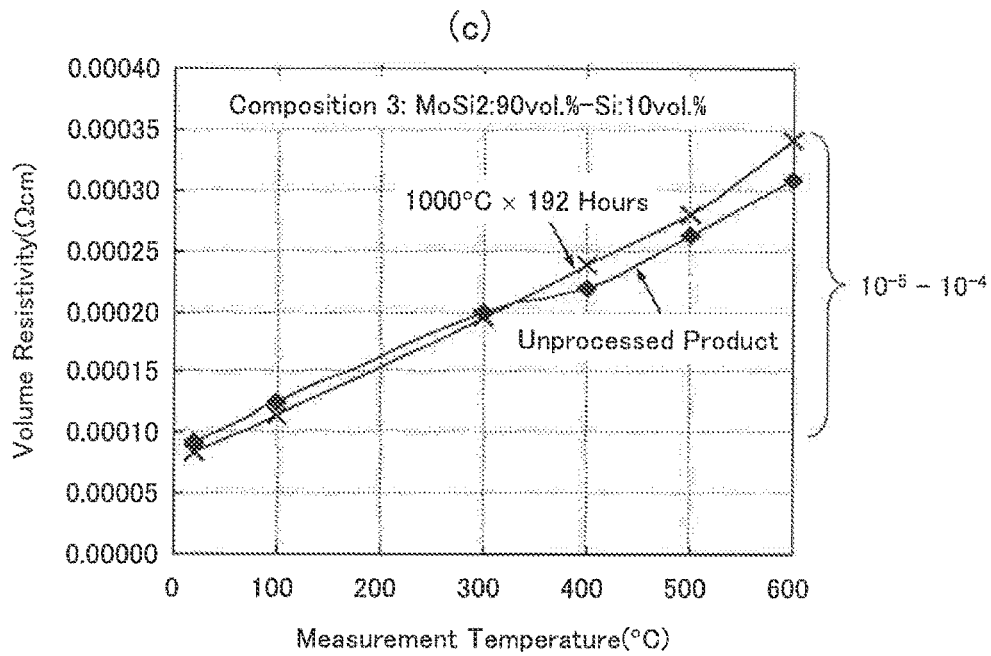
Figure 17:
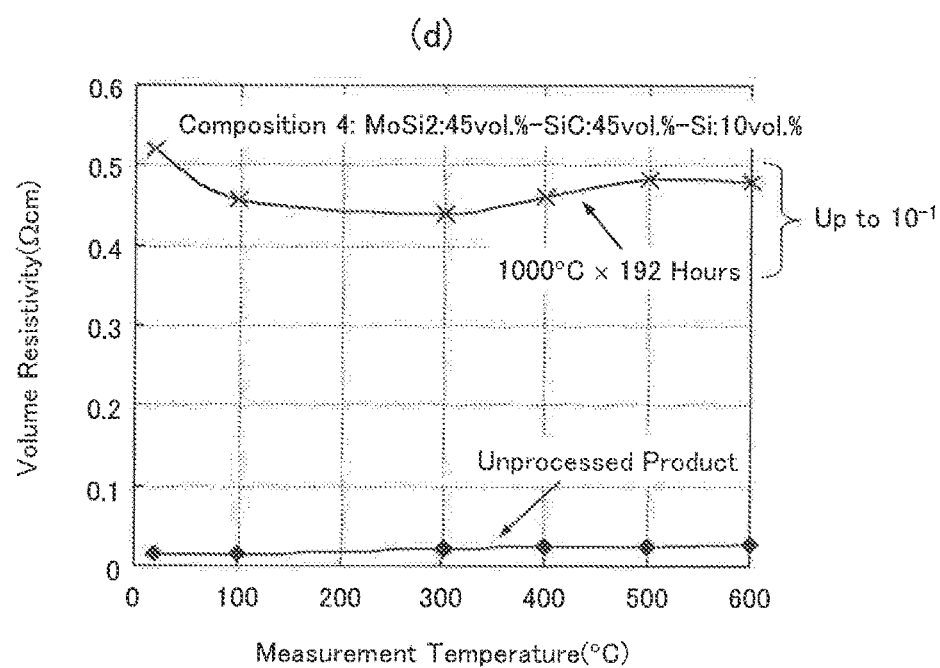
Figure 17:
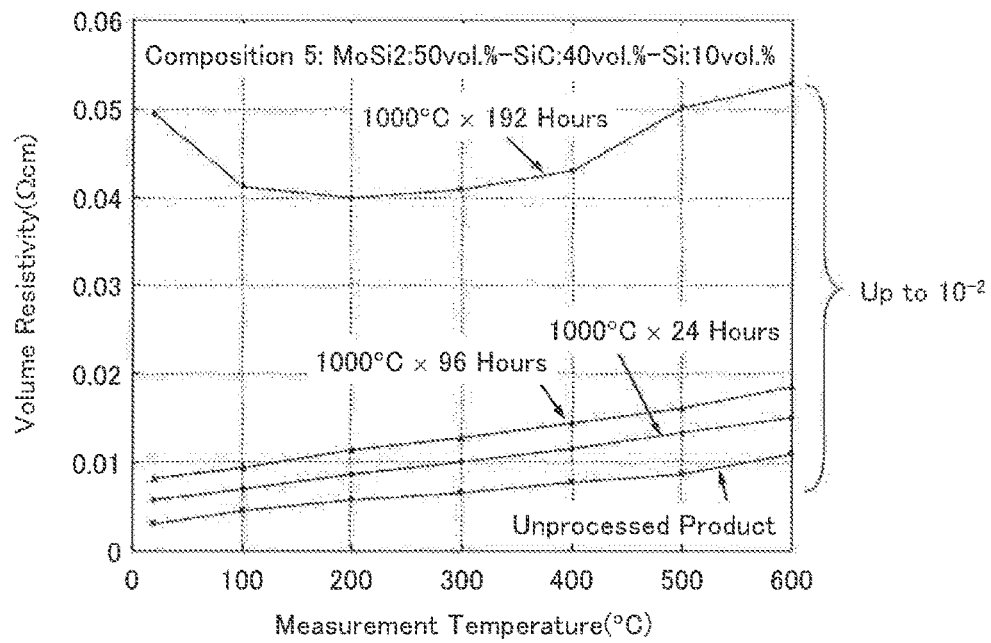
Figure 17:
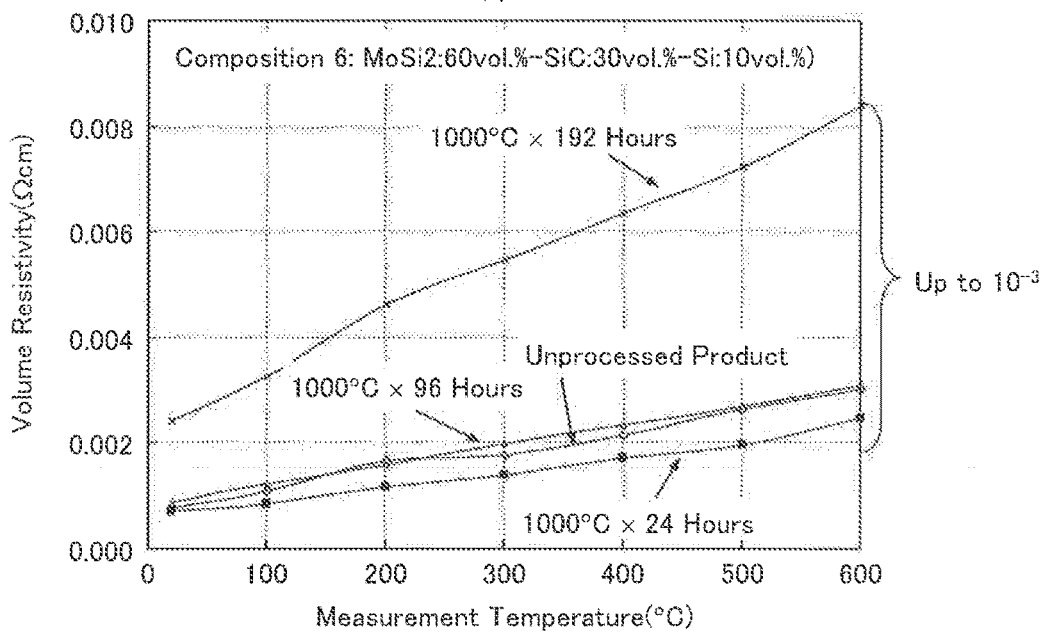
Figure 17:
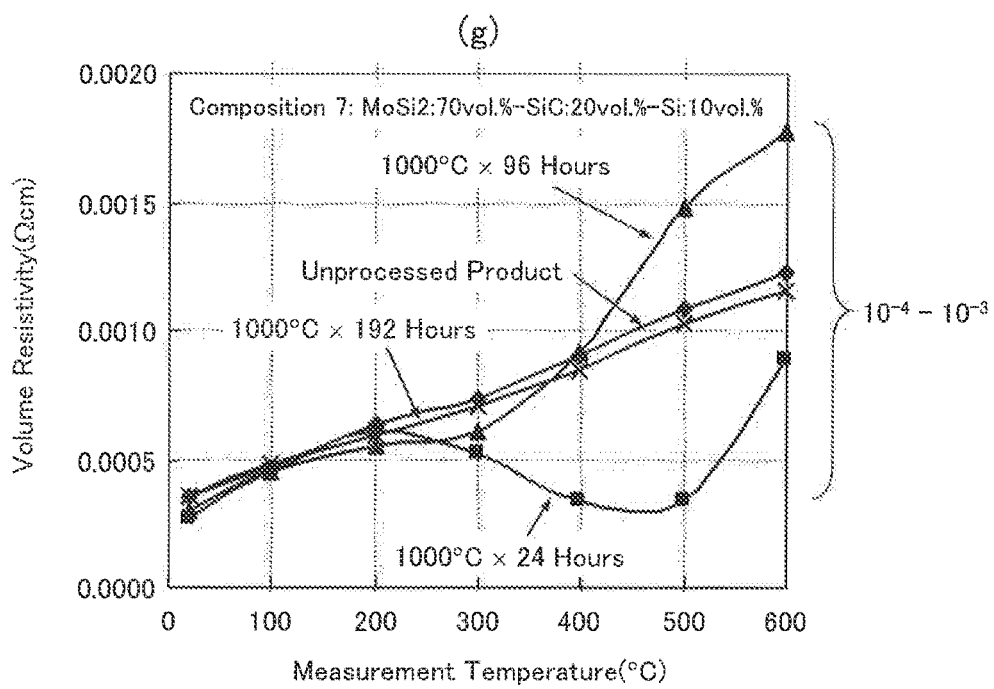
Figure 17:
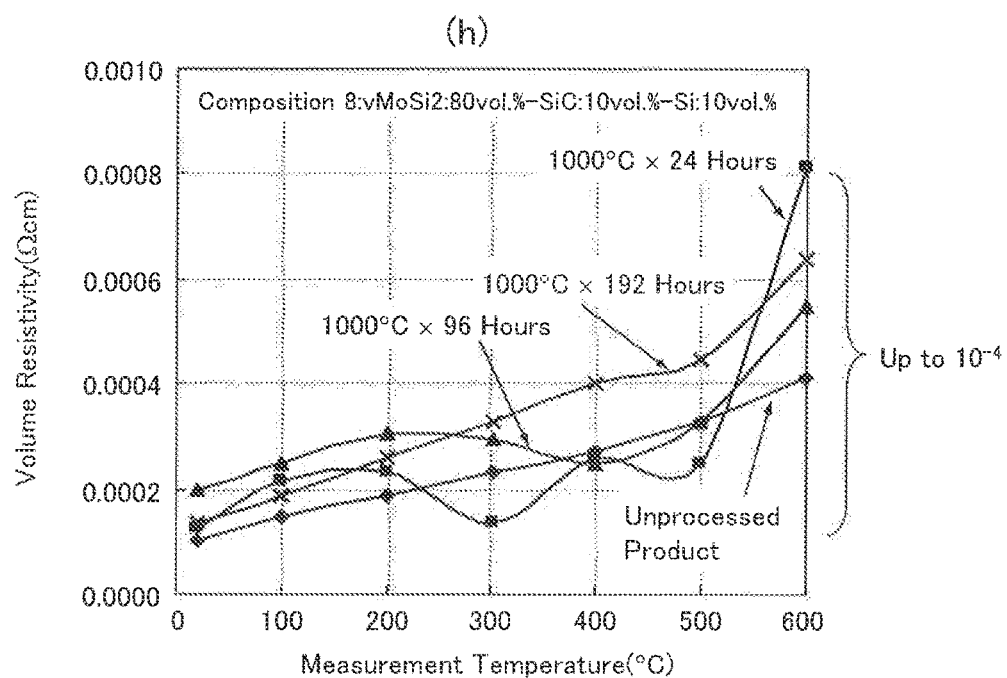

From FIG. 17a, it is seen that the high-temperature volume resistivities of the baked bodies of Composition No. 1, which have been subjected to oxidation treatment at 1000° C. for 192 hours and not subjected to such treatment, tend to slightly increase with an increase in the temperature, but the volume resistivities are at a level of $10^{-3}$ to $10^{-2}$, and Composition No. 1 is thus found to be a conductor even when subjected to oxidation treatment. Meanwhile, as shown in FIG. 17b, it is seen that the high-temperature volume resistivity of Composition No. 2, which has been subjected to oxidation treatment, tends to slightly decrease with an increase in the temperature, but the high-temperature volume resistivity is up to $10^{-3}$.

From FIG. 17c, it is seen that the volume resistivities of Compositions No. 3, which have been subjected to oxidation treatment for 192 hours and not subjected to such treatment, exhibit values at a level as low as $10^{-3}$ to $10^{-4}$, and also exhibit similar high-temperature volume resistivities at the measurement temperature. Thus, such composition is found to be a conductor with excellent oxidation resistance. Meanwhile, from FIG. 17d, it is seen that the volume resistivity of Composition No. 4, which has been subjected to oxidation treatment, is at a level of up to $10^{-1}$, and the volume resistivity has slightly increased, but temperature-independent behavior was exhibited.

From FIG. 17e, it is seen that the volume resistivity of Composition No. 5 tends to increase with an increase in the oxidation treatment time. However, as the volume resistivity of even Composition No. 5 subjected to oxidation treatment for 192 hours is maintained at a level of up to $10^{-2}$, no temperature dependence is recognized. Meanwhile, from FIG. 17f, it is seen that Composition No. 6, which has been subjected to heat treatment for up to 96 hours, has similar tendency to Composition No. 6, which has not been subjected to heat treatment, and Composition No. 6, which has been subjected to heat treatment for 192 hours, exhibits a value four times as large. However, as the volume resistivity of Composition No. 6 is all at a level of up to $10^{-3}$, Composition No. 6 is found to be a conductor.

From FIGS. 17g and 17h, S-shaped curves are recognized in part of high-temperature volume resistivity curves of Composition No. 7 and Composition No. 8. However, as the volume resistivity is at a level as low as $10^{-4}$ to $10^{-3}$, such curves are determined to be due to behavior within experimental errors from the scale in the ordinate axis. Thus, Composition No. 7 and Composition No. 8 are also found to be conductors with excellent oxidation resistance.

Table 26 below shows the above results. The volume resistivities at room temperature of the baked bodies of the eight types of compositions, which have been subjected to oxidation treatment (in the atmosphere at 1000° C.×192 hours) and not subjected to such treatment, are $10^{-5}$ to $10^{-1}$ (Ωcm), while the volume resistivities at a high temperature of 600° C. of such baked bodies are $10^{-4}$ to $10^{-1}$ (Ωcm). Thus, each of the baked bodies of the eight types of compositions studied this time is found to be a conductor with excellent oxidation resistance.

TABLE 26

|  | Product Not Subjected to Oxidation Treatment | Product Subjected to Oxidation Treatment in Atmosphere at 1000° C. for 192 Hr |
|---|---|---|
| Volume Resistivity at Room Temperature (Ωcm) | $10^{-5}$-$10^{-2}$ | $10^{-5}$-$10^{-1}$ |
| Volume Resistivity at 600° C. (Ωcm) | $10^{-4}$-$10^{-2}$ | $10^{-4}$-$10^{-1}$ |

(Volume Resistivities of MoSi$_2$/Si-Based Baked Bodies)

With respect to MoSi$_2$/Si-based composite materials, the volume resistivities at room temperature to 600° C. of baked bodies of the two-component-based materials with different compositions and baking conditions were measured, so that whether or not the baked bodies can be applied to an electrode terminal, an electrode film, and a bonding material made of the aforementioned two-component based composite materials.

As the experimental method, first, starting materials each having an average grain size shown in Table 27 below were used to prepare three compositions of MoSi$_2$/Si-based materials shown in Table 28. Then, the materials were baked under the following three conditions: 1250° C. for 1 hour, which is the bonding condition for a terminal and an electrode film, 1350° C. for 4 hours into which the production conditions for an electrode terminal are taken into consideration, and 1400° C. for 4 hours.

TABLE 27

Average Grain Sizes of Starting Materials

| Raw Material | MoSi$_2$ | Si |
|---|---|---|
| Average Grain Size (Note 1) | 6.1 μm | 8.1 μm |

(Note 1)
Measured with Microtrac ASVR

TABLE 28

| Composition No. | MoSi$_2$ | Si |
|---|---|---|
| Mixed Composition of Each Material (Volume %: Vol. %) | | |
| 12 | 50 | 50 |
| 13 | 40 | 60 |
| 14 | 30 | 70 |
| Mixed Composition of Each Material (Weight %: wt. %) | | |
| 12 | 73 | 27 |
| 13 | 64 | 36 |
| 14 | 54 | 46 |

From each of the baked bodies made of the aforementioned materials having a width of 5 mm×a thickness of 5 mm×a length of 48 mm, a test piece with a width of 5 mm×a thickness of 5 mm×a length of 30 mm was obtained through machining. Four silver wires (0.2 mm)) were wound around each test piece, and silver paste was applied thereto and the test piece was dried at 100° C. for 24 hours, and then, baking treatment was performed in nitrogen under the conditions of 450° C. for two hours (a rate of temperature increase: 200° C./hour), whereby current terminals and voltage terminals were formed. The dimensions of each test piece were measured with a micrometer and a microscope. With respect to the volume resistivity, a four-terminal method was used, and the temperature was increased up to 600° C. at a rate of temperature increase of 300° C./hour in an N$_2$ (a purity of greater than or equal to 99.9995%) gas atmosphere, and then, the test piece was held therein for about 30 minutes. After that, current (I) was supplied across terminals on the outer side of the sample for 30 seconds, and voltage (V) across terminals on the inner side was measured. Next, the temperature was reduced down to 500° C. at a temperature decreasing rate of (300° C./hour), and the test piece was held therein for about 30 minutes, and then, current and voltage were measured in the same way. Hereinafter, the measurement temperature was set to 400° C., 300° C., 100° C., and room temperature. The volume resistivity (ρv) was calculated from Formula 1 above using the aforementioned data.

Table 29 below shows the measurement results of the dimensions of test pieces obtained by baking three types of compositions of MoSi$_2$/Si-based materials under three standard conditions.

TABLE 29

Measurement Results of Dimensions of Test Pieces

| Composition No. | Composition Ratio (Vol %) | Baking Conditions | Width/w (cm) | Thickness/t (cm) | Distance between Voltage Terminals/L (cm) | S/L |
|---|---|---|---|---|---|---|
| 12 | MoSi$_2$:50 | 1250° C × 1 Hr | 0.5001 | 0.5027 | 0.9923 | 0.255 |
| 13 | MoSi$_2$:40 | 1250° C × 1 Hr | 0.5021 | 0.5024 | 0.9969 | 0.253 |
| 14 | MoSi$_2$:30 | 1250° C × 1 Hr | 0.5018 | 0.5024 | 0.9948 | 0.253 |
| 12 | MoSi$_2$:50 | 1350° C × 4 Hr | 0.5021 | 0.5027 | 0.9992 | 0.255 |
| 13 | MoSi$_2$:40 | 1350° C × 4 Hr | 0.5018 | 0.5038 | 0.9898 | 0.253 |
| 14 | MoSi$_2$:30 | 1350° C × 4 Hr | 0.5017 | 0.5036 | 0.9886 | 0.256 |
| 12 | MoSi$_2$:50 | 1400° C × 4 Hr | 0.5029 | 0.5034 | 0.9980 | 0.254 |
| 13 | MoSi$_2$:40 | 1400° C × 4 Hr | 0.5023 | 0.5039 | 0.9905 | 0.256 |
| 14 | MoSi$_2$:30 | 1400° C × 4 Hr | 0.5027 | 0.5038 | 0.9940 | 0.255 |

From Table 29, it is seen that the dimensions of each test piece after machining are a width of 0.5 cm×a thickness of 0.5 cm, and the distance between the voltage terminals is all 1.0 cm and thus is constant.

Table 30 below shows the volume resistivity at room temperature to 600° C. of Composition No. 12 baked at 1250° C. for 1 hour.

TABLE 30

Volume Resistivity at Each Temperature of Composition No. 12: MoSi$_2$: 50 vol. % - Si: 50 vol. % Baked at 1250° C. for 1 Hour

| Temperature (° C.) | Current (A) | Voltage (V) | Resistance (Ω) | Volume Resistivity (Ω · cm) |
|---|---|---|---|---|
| 34 | 1.000 | 1.780 × 10$^{-2}$ | 1.8 × 10$^{-2}$ | 4.5 × 10$^{-3}$ |
| 100 | 1.000 | 2.137 × 10$^{-2}$ | 2.1 × 10$^{-2}$ | 5.5 × 10$^{-3}$ |
| 200 | 1.000 | 2.840 × 10$^{-2}$ | 2.8 × 0$^{-2}$ | 7.2 × 10$^{-3}$ |
| 300 | 1.000 | 3.380 × 10$^{-2}$ | 3.4 × 10$^{-2}$ | 8.6 × 10$^{-3}$ |
| 400 | 1.000 | 3.777 × 10$^{-2}$ | 3.8 × 10$^{-2}$ | 9.6 × 10$^{-3}$ |
| 500 | 1.000 | 4.150 × 10$^{-2}$ | 4.2 × 10$^{-2}$ | 1.1 × 10$^{-2}$ |
| 600 | 1.000 | 4.590 × 10$^{-2}$ | 4.6 × 10$^{-2}$ | 1.2 × 10$^{-2}$ |

From Table 30, it is seen that the value is at a level as low as 10$^{-3}$ to 10$^{-2}$ Ωcm, and the baked body is thus found to be a conductor.

Next, Table 31 and Table 32 below show the volume resistivities at room temperature to 600° C. of Composition No. 13 and Composition No. 14 baked at 1250° C. for 1 hour, respectively.

TABLE 31

Volume Resistivity at Each Temperature of Composition No. 13: MoSi$_2$: 40 vol. % - Si: 60 vol. % Baked at 1250° C. for 1 Hour

| Temperature (° C.) | Current (A) | Voltage (V) | Resistance (Ω) | Volume Resistivity (Ω · cm) |
|---|---|---|---|---|
| 34 | 0.100 | 5.350 × 10$^{-2}$ | 5.4 × 10$^{-1}$ | 1.4 × 10$^{-1}$ |
| 100 | 0.100 | 5.200 × 10$^{-2}$ | 5.2 × 10$^{-1}$ | 1.3 × 10$^{-1}$ |
| 200 | 0.100 | 5.250 × 10$^{-2}$ | 5.3 × 10$^{-1}$ | 1.3 × 10$^{-1}$ |
| 300 | 0.100 | 4.745 × 10$^{-2}$ | 4.8 × 10$^{-1}$ | 1.2 × 10$^{-1}$ |
| 400 | 0.100 | 4.020 × 10$^{-2}$ | 4.0 × 10$^{-1}$ | 1.0 × 10$^{-1}$ |
| 500 | 0.100 | 3.670 × 10$^{-2}$ | 3.7 × 10$^{-1}$ | 9.3 × 10$^{-2}$ |
| 600 | 0.100 | 3.660 × 10$^{-2}$ | 3.7 × 10$^{-1}$ | 9.3 × 10$^{-2}$ |

TABLE 32

Volume Resistivity at Each Temperature of Composition No. 14: MoSi$_2$: 30 vol. % - Si: 70 vol. % Baked at 1250° C. for 1 Hour

| Temperature (° C.) | Current (A) | Voltage (V) | Resistance (Ω) | Volume Resistivity (Ω · cm) |
|---|---|---|---|---|
| 34 | 0.010 | 2.283 × 10$^{-1}$ | 2.3 × 10$^{1}$ | 5.8 × 10$^{0}$ |
| 100 | 0.010 | 1.368 × 10$^{-1}$ | 1.4 × 10$^{1}$ | 3.5 × 10$^{0}$ |
| 200 | 0.010 | 6.110 × 10$^{-2}$ | 6.1 × 10$^{0}$ | 1.6 × 10$^{0}$ |
| 300 | 0.010 | 3.670 × 10$^{-2}$ | 3.7 × 10$^{0}$ | 9.3 × 10$^{-1}$ |
| 400 | 0.010 | 2.290 × 10$^{-2}$ | 2.3 × 10$^{0}$ | 5.8 × 10$^{-1}$ |
| 500 | 0.010 | 1.700 × 10$^{-2}$ | 1.7 × 10$^{0}$ | 4.3 × 10$^{-1}$ |
| 600 | 0.010 | 1.400 × 10$^{-2}$ | 1.4 × 10$^{0}$ | 3.6 × 10$^{-1}$ |

From Table 31, it is seen that the volume resistivity of the baked product of Composition No. 13 is at a level of 10$^{-2}$ to 10$^{-1}$ Ωcm, which is slightly higher than that of Composition No. 12, but shows that the composition is a conductor. In addition, the temperature dependence of volume resistivity is low. Meanwhile, from Table 32, it is seen that the volume resistivity of Composition No. 14 baked at 1250° C. for 1 hour is at a level of 10$^{-1}$ to several Ωcm, which is slightly higher than that of Composition No. 13, but shows that the composition is also a conductor. The reason that the volume resistivity of Composition No. 14 is slightly higher than those of Compositions 12 and 13 is that the content of MoSi$_2$ is low.

Figure 18:
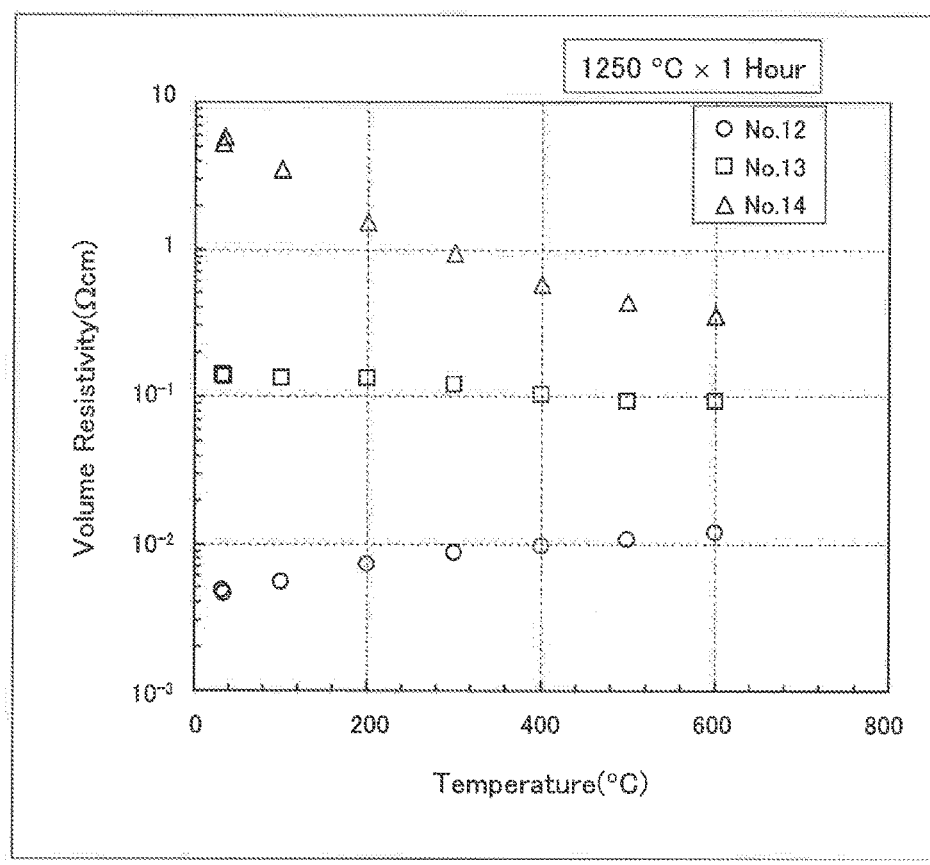
FIG. 18(a) is a diagram showing the relationship between the temperature and the volume resistivity of each of Compositions No. 12, 13, and 14 subjected to heat treatment at 1250° C. for 1 hour.
FIG. 18(b) is a diagram showing the relationship between the temperature and the volume resistivity of each of Compositions No. 12, 13, and 14 subjected to heat treatment at 1350° C. for 4 hours.
FIG. 18(c) is a diagram showing the relationship between the temperature and the volume resistivity of each of Compositions No. 12, 13, and 14 subjected to heat treatment at 1400° C. for 4 hours.
Figure 18:
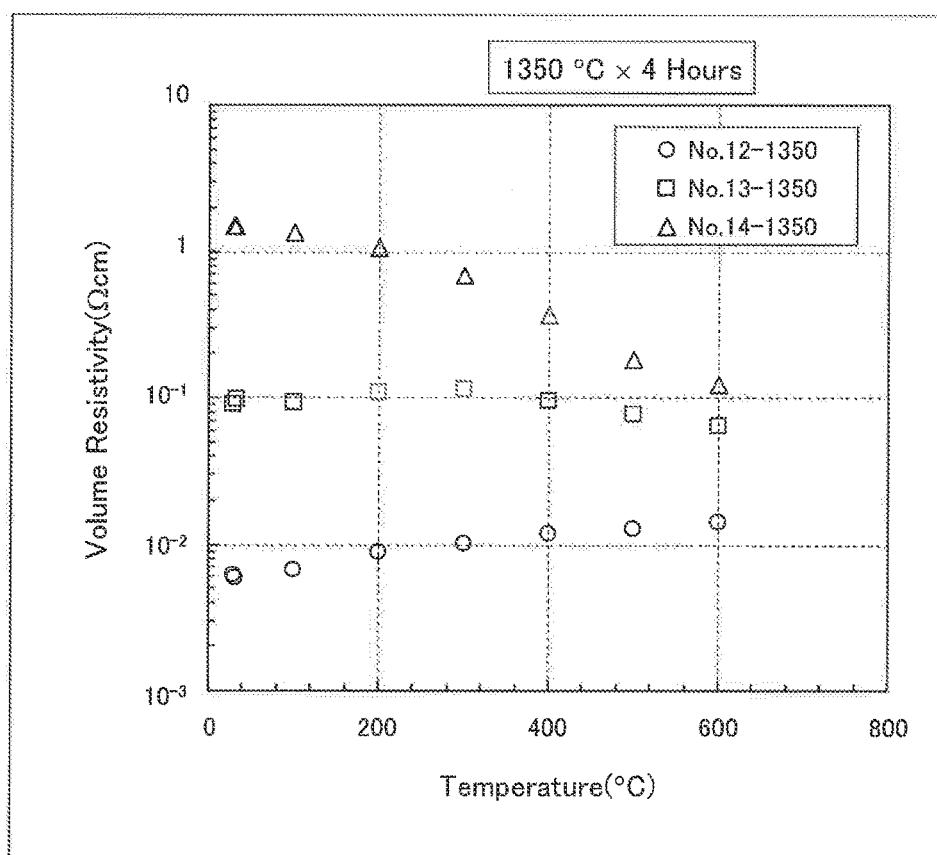
Figure 18:
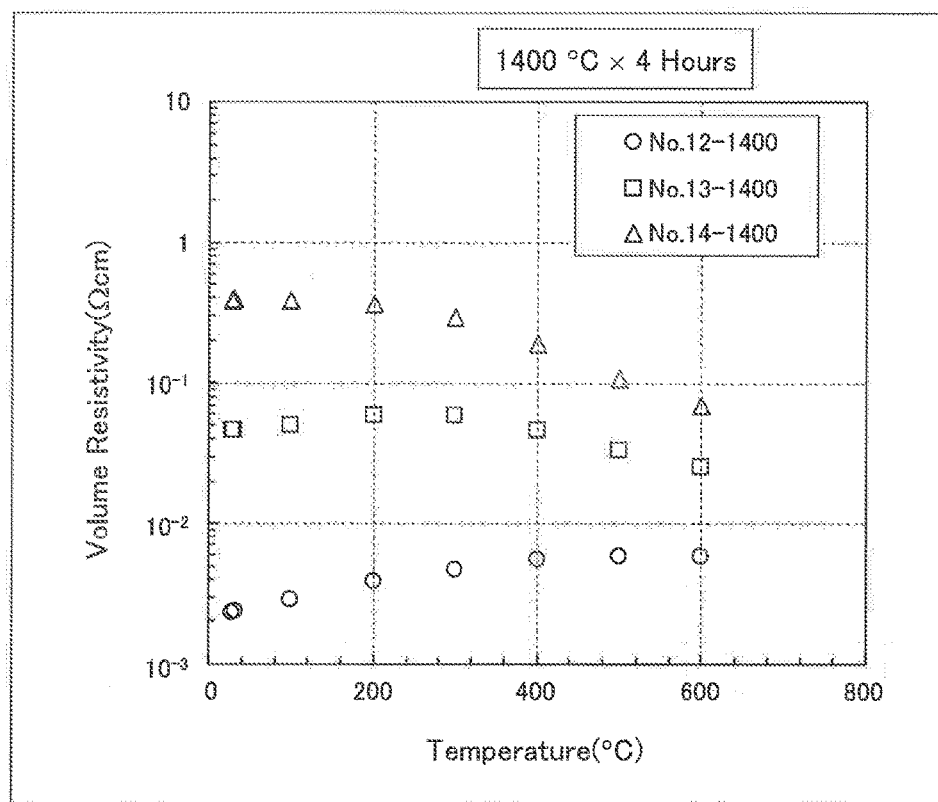

FIG. 18*a* shows the results of the series of volume resistivity shown in Tables 30 to 32.

From FIG. 18*a*, Composition No. 14 is recognized to have temperature dependence of volume resistivity, while the temperature dependence of volume resistivity of each of Composition No. 12 and Composition No. 13 is found to be as low as within measurement errors.

Table 33 and Table 34 below show the volume resistivities of Composition No. 12 and Composition No. 13 baked at 1350° C. for 4 hours, respectively.

TABLE 33

Volume Resistivity at Each Temperature of Composition No. 12: MoSi$_2$: 50 vol. % - Si: 50 vol. % Baked at 1350° C. for 4 Hours

| Temperature (° C.) | Current (A) | Voltage (V) | Resistance (Ω) | Volume Resistivity (Ω · cm) |
|---|---|---|---|---|
| 32 | 1.000 | 2.350 × 10$^{-2}$ | 2.4 × 10$^{-2}$ | 5.9 × 10$^{-3}$ |
| 100 | 1.000 | 2.650 × 10$^{-2}$ | 2.7 × 10$^{-2}$ | 6.7 × 10$^{-3}$ |
| 200 | 1.000 | 3.520 × 10$^{-2}$ | 3.5 × 10$^{-2}$ | 8.9 × 10$^{-3}$ |
| 300 | 1.000 | 4.000 × 10$^{-2}$ | 4.0 × 10$^{-2}$ | 1.0 × 10$^{-2}$ |

TABLE 33-continued

Volume Resistivity at Each Temperature of Composition No. 12: $MoSi_2$:
50 vol. % - Si: 50 vol. % Baked at 1350° C. for 4 Hours

| Temperature (° C.) | Current (A) | Voltage (V) | Resistance (Ω) | Volume Resistivity (Ω · cm) |
|---|---|---|---|---|
| 400 | 1.000 | $4.660 \times 10^{-2}$ | $4.7 \times 10^{-2}$ | $1.2 \times 10^{-2}$ |
| 500 | 1.000 | $5.080 \times 10^{-2}$ | $5.1 \times 10^{-2}$ | $1.3 \times 10^{-2}$ |
| 600 | 1.000 | $5.640 \times 10^{-2}$ | $5.6 \times 10^{-2}$ | $1.4 \times 10^{-2}$ |

TABLE 34

Volume Resistivity at Each Temperature of Composition No. 13: $MoSi_2$:
40 vol. % - Si: 60 vol. % Baked at 1350° C. for 4 Hours

| Temperature (° C.) | Current (A) | Voltage (V) | Resistance (Ω) | Volume Resistivity (Ω · cm) |
|---|---|---|---|---|
| 34 | 1.000 | $3.848 \times 10^{-1}$ | $3.9 \times 10^{-1}$ | $9.8 \times 10^{-2}$ |
| 100 | 1.000 | $3.640 \times 10^{-1}$ | $3.6 \times 10^{-1}$ | $9.3 \times 10^{-2}$ |
| 200 | 1.000 | $4.232 \times 10^{-1}$ | $4.2 \times 10^{-1}$ | $1.1 \times 10^{-1}$ |
| 300 | 1.000 | $4.460 \times 10^{-1}$ | $4.5 \times 10^{-1}$ | $1.1 \times 10^{-1}$ |
| 400 | 1.000 | $3.743 \times 10^{-1}$ | $3.7 \times 10^{-1}$ | $9.6 \times 10^{-2}$ |
| 500 | 1.000 | $3.045 \times 10^{-1}$ | $3.1 \times 10^{-1}$ | $7.8 \times 10^{-2}$ |
| 600 | 1.000 | $2.530 \times 10^{-1}$ | $2.5 \times 10^{-1}$ | $6.5 \times 10^{-2}$ |

Table 33 shows that the volume resistivity of Composition No. 12 is at a level as low as $10^{-3}$ to $10^{-2}$ Ωcm, which shows that the composition is a conductor. Meanwhile, from Table 34, it is seen that the baked product of Composition No. 13 has a volume resistivity at a level of $10^{-2}$ to $10^{-1}$ Ωcm, which is slightly higher than that of Composition No. 12, but shows that the composition is also a conductor.

Table 35 below shows the volume resistivity of Composition No. 14 baked at 1350° C. for 4 hours.

TABLE 35

Volume Resistivity at Each Temperature of Composition No. 14: $MoSi_2$:
30 vol. % - Si: 70 vol. % Baked at 1350° C. for 4 Hours

| Temperature (° C.) | Current (A) | Voltage (V) | Resistance (Ω) | Volume Resistivity (Ω · cm) |
|---|---|---|---|---|
| 32 | 0.100 | $5.835 \times 10^{-1}$ | $5.8 \times 10^{0}$ | $1.5 \times 10^{0}$ |
| 100 | 0.100 | $5.230 \times 10^{-1}$ | $5.2 \times 10^{0}$ | $1.3 \times 10^{0}$ |
| 200 | 0.100 | $4.195 \times 10^{-1}$ | $4.2 \times 10^{0}$ | $1.1 \times 10^{0}$ |
| 300 | 0.100 | $2.714 \times 10^{-1}$ | $2.7 \times 10^{0}$ | $6.9 \times 10^{-1}$ |
| 400 | 0.100 | $1.431 \times 10^{-1}$ | $1.4 \times 10^{0}$ | $3.7 \times 10^{-1}$ |
| 500 | 0.100 | $7.030 \times 10^{-2}$ | $7.0 \times 10^{-1}$ | $1.8 \times 10^{-1}$ |
| 600 | 0.100 | $4.870 \times 10^{-2}$ | $4.9 \times 10^{-1}$ | $1.2 \times 10^{-1}$ |

From Table 35, it is seen that the volume resistivity is increased as compared to that of Composition No. 13 by a level of $10^{-1}$ to several Ωcm, but the baked body of Composition No. 14 also maintains conductivity.

FIG. 18b is a diagram obtained by plotting the measurement results of the series of volume resistivity shown in Tables 33 to 35.

From FIG. 18b, it is seen that the volume resistivity of Composition No. 14 tends to slightly decrease with an increase in the temperature, but has low temperature dependence and thus is a permissible value. Meanwhile, the volume resistivity of each of Composition No. 12 and Composition No. 13 is within measurement errors, and thus is recognized to have no temperature dependence.

Tables 36 and 37 below show the volume resistivities of Composition No. 12 and Composition No. 13 baked at 1400° C. for 4 hours, respectively.

TABLE 36

Volume Resistivity at Each Temperature of Composition No. 12: $MoSi_2$:
50 vol. % - Si: 60 vol. % Baked at 1400° C. for 4 Hours

| Temperature (° C.) | Current (A) | Voltage (V) | Resistance (Ω) | Volume Resistivity (Ω · cm) |
|---|---|---|---|---|
| 32 | 1.000 | $9.380 \times 10^{-3}$ | $9.4 \times 10^{-3}$ | $2.4 \times 10^{-3}$ |
| 100 | 1.000 | $1.150 \times 10^{-2}$ | $1.2 \times 10^{-2}$ | $2.9 \times 10^{-3}$ |
| 200 | 1.000 | $1.530 \times 10^{-2}$ | $1.5 \times 10^{-2}$ | $3.9 \times 10^{-3}$ |
| 300 | 1.000 | $1.870 \times 10^{-2}$ | $1.9 \times 10^{-2}$ | $4.7 \times 10^{-3}$ |
| 400 | 1.000 | $2.166 \times 10^{-2}$ | $2.2 \times 10^{-2}$ | $5.5 \times 10^{-3}$ |
| 500 | 1.000 | $2.320 \times 10^{-2}$ | $2.3 \times 10^{-2}$ | $5.9 \times 10^{-3}$ |
| 600 | 1.000 | $2.300 \times 10^{-2}$ | $2.3 \times 10^{-2}$ | $5.8 \times 10^{-3}$ |

TABLE 37

Volume Resistivity at Each Temperature of Composition No. 13: $MoSi_2$:
40 vol. % - Si: 60 vol. % Baked at 1400° C. for 4 Hours

| Temperature (° C.) | Current (A) | Voltage (V) | Resistance (Ω) | Volume Resistivity (Ω · cm) |
|---|---|---|---|---|
| 31 | 1.000 | $1.792 \times 10^{-1}$ | $1.8 \times 10^{-1}$ | $4.6 \times 10^{-2}$ |
| 100 | 1.000 | $1.974 \times 10^{-1}$ | $2.0 \times 10^{-1}$ | $5.0 \times 10^{-2}$ |
| 200 | 1.000 | $2.325 \times 10^{-1}$ | $2.3 \times 10^{-1}$ | $5.9 \times 10^{-2}$ |
| 300 | 1.000 | $2.290 \times 10^{-1}$ | $2.3 \times 10^{-1}$ | $5.9 \times 10^{-2}$ |
| 400 | 1.000 | $1.820 \times 10^{-1}$ | $1.8 \times 10^{-1}$ | $4.7 \times 10^{-2}$ |
| 500 | 1.000 | $1.301 \times 10^{-1}$ | $1.3 \times 10^{-1}$ | $3.3 \times 10^{-2}$ |
| 600 | 1.000 | $9.800 \times 10^{-2}$ | $9.8 \times 10^{-2}$ | $2.5 \times 10^{-2}$ |

From Table 36, it is seen that the volume resistivity of Composition No. 12 baked at 1400° C. for 4 hours is at a level as low as up to $10^{-3}$ Ωcm, which shows that the baked product is a conductor. Meanwhile, from Table 37, it is seen that the volume resistivity of the baked product of Composition No. 13 is at a level of up to $10^{-2}$ Ωcm, which is slightly higher than that of Composition No. 12, but shows that the baked product is also a conductor.

Table 38 below shows the volume resistivity of Composition No. 14 baked at 1400° C. for 4 hours.

TABLE 38

Volume Resistivity at Each Temperature of Composition No. 14: $MoSi_2$:
30 vol. % - Si: 70 vol. % Baked at 1400° C. for 4 Hours

| Temperature (° C.) | Current (A) | Voltage (V) | Resistance (Ω) | Volume Resistivity (Ω · cm) |
|---|---|---|---|---|
| 31 | 0.100 | $1.552 \times 10^{-1}$ | $1.6 \times 10^{0}$ | $4.0 \times 10^{-1}$ |
| 100 | 0.100 | $1.506 \times 10^{-1}$ | $1.5 \times 10^{0}$ | $3.8 \times 10^{-1}$ |
| 200 | 0.100 | $1.421 \times 10^{-1}$ | $1.4 \times 10^{0}$ | $3.6 \times 10^{-1}$ |
| 300 | 0.100 | $1.151 \times 10^{-1}$ | $1.2 \times 10^{0}$ | $2.9 \times 10^{-1}$ |
| 400 | 0.100 | $7.500 \times 10^{-2}$ | $7.5 \times 10^{-1}$ | $1.9 \times 10^{-1}$ |
| 500 | 0.100 | $4.220 \times 10^{-2}$ | $4.2 \times 10^{-1}$ | $1.1 \times 10^{-1}$ |
| 600 | 0.100 | $2.740 \times 10^{-2}$ | $2.7 \times 10^{-1}$ | $7.0 \times 10^{-2}$ |

From Table 38, it is seen that the volume resistivity of the baked product is also at a level of $10^{-2}$ to $10^{-1}$ Ωcm, which shows that the baked product is a conductor.

FIG. 18c is a diagram obtained by plotting the volume resistivity shown in Tables 36 to 38 relative to the temperature.

From FIG. 18c, each of Compositions No. 12, 13, and 14 is found to have no temperature dependence of volume resistivity as it is within experimental errors.

Table 39 below shows a data list of the above results.

TABLE 39

Volume Resistivites of Test Pieces with Different Compositions and Baking Conditions

| Composition No. | Baking Conditions | Measurement Temperature (° C.) | | | | | | |
|---|---|---|---|---|---|---|---|---|
| | | 30 | 100 | 200 | 300 | 400 | 500 | 600 |
| 12 | 1250° C. × 1 Hr | $4.5 \times 10^{-3}$ | $5.5 \times 10^{-3}$ | $7.2 \times 10^{-3}$ | $8.6 \times 10^{-3}$ | $9.6 \times 10^{-3}$ | $1.1 \times 10^{-2}$ | $1.2 \times 10^{-2}$ |
| 13 | 1250° C. × 1 Hr | $1.4 \times 10^{-1}$ | $1.3 \times 10^{-1}$ | $1.3 \times 10^{-1}$ | $1.2 \times 10^{-1}$ | $1.0 \times 10^{-1}$ | $9.3 \times 10^{-2}$ | $9.3 \times 10^{-2}$ |
| 14 | 1250° C. × 1 Hr | $5.8 \times 10^{0}$ | $3.5 \times 10^{0}$ | $1.6 \times 10^{0}$ | $9.3 \times 10^{-1}$ | $5.8 \times 10^{-1}$ | $4.3 \times 10^{-1}$ | $3.6 \times 10^{-1}$ |
| 12 | 1350° C. × 4 Hr | $5.9 \times 10^{-3}$ | $6.7 \times 10^{-3}$ | $8.9 \times 10^{-3}$ | $1.0 \times 10^{-2}$ | $1.2 \times 10^{-2}$ | $1.3 \times 10^{-2}$ | $1.4 \times 10^{-2}$ |
| 13 | 1350° C. × 4 Hr | $9.8 \times 10^{-2}$ | $9.3 \times 10^{-2}$ | $1.1 \times 10^{-1}$ | $1.1 \times 10^{-1}$ | $9.6 \times 10^{-2}$ | $7.8 \times 10^{-2}$ | $6.5 \times 10^{-2}$ |
| 14 | 1350° C. × 4 Hr | $1.5 \times 10^{0}$ | $1.3 \times 10^{0}$ | $1.1 \times 10^{0}$ | $6.9 \times 10^{-1}$ | $3.7 \times 10^{-1}$ | $1.8 \times 10^{-1}$ | $1.2 \times 10^{-1}$ |
| 12 | 1400° C. × 4 Hr | $2.4 \times 10^{-3}$ | $2.9 \times 10^{-3}$ | $3.9 \times 10^{-3}$ | $4.7 \times 10^{-3}$ | $5.5 \times 10^{-3}$ | $5.9 \times 10^{-3}$ | $5.8 \times 10^{-3}$ |
| 13 | 1400° C. × 4 Hr | $4.6 \times 10^{-2}$ | $5.0 \times 10^{-2}$ | $5.9 \times 10^{-2}$ | $5.9 \times 10^{-2}$ | $4.7 \times 10^{-2}$ | $3.3 \times 10^{-2}$ | $2.5 \times 10^{-2}$ |
| 14 | 1400° C. × 4 Hr | $4.0 \times 10^{-1}$ | $3.8 \times 10^{-1}$ | $3.6 \times 10^{-1}$ | $2.9 \times 10^{-1}$ | $1.9 \times 10^{-1}$ | $1.1 \times 10^{-1}$ | $7.0 \times 10^{-2}$ |

Figure 19:
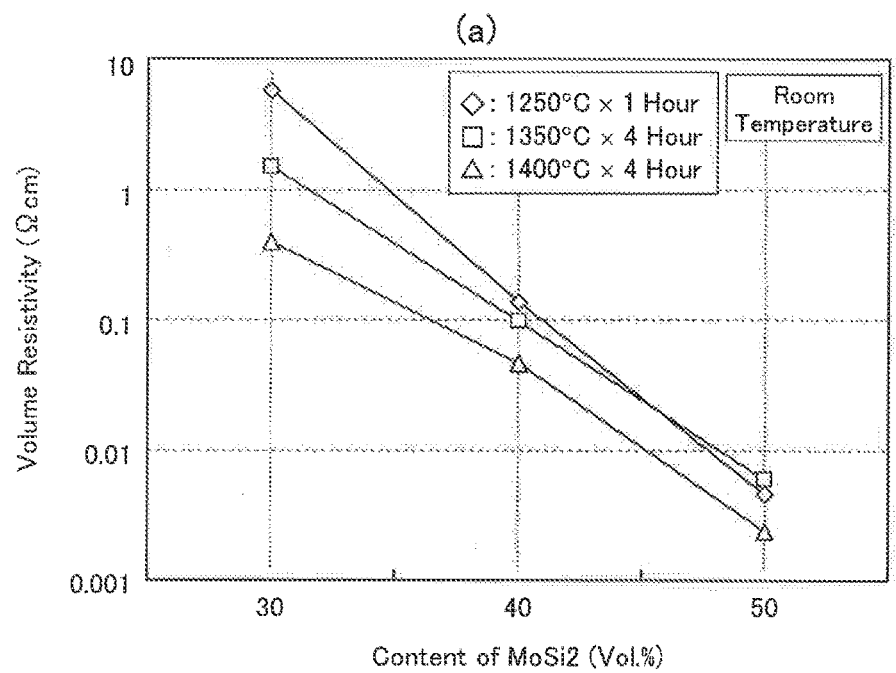
FIG. 19(a) is a diagram showing the relationship between the content of $MoSi_2$ and the volume resistivity at room temperature of each of Compositions No. 12, No. 13, and No. 14 subjected to heat treatment at 1250° C. for 1 hour, subjected to heat treatment at 1350° C. for 4 hours, and subjected to heat treatment at 1400° C. for 4 hours.
FIG. 19(b) is a diagram showing the relationship between the content of $MoSi_2$ and the volume resistivity at 600° C. of each of Compositions No. 12, No. 13, and No. 14 subjected to heat treatment at 1250° C. for 1 hour, subjected to heat treatment at 1350° C. for 4 hours, and subjected to heat treatment at 1400° C. for 4 hours.
Figure 19:
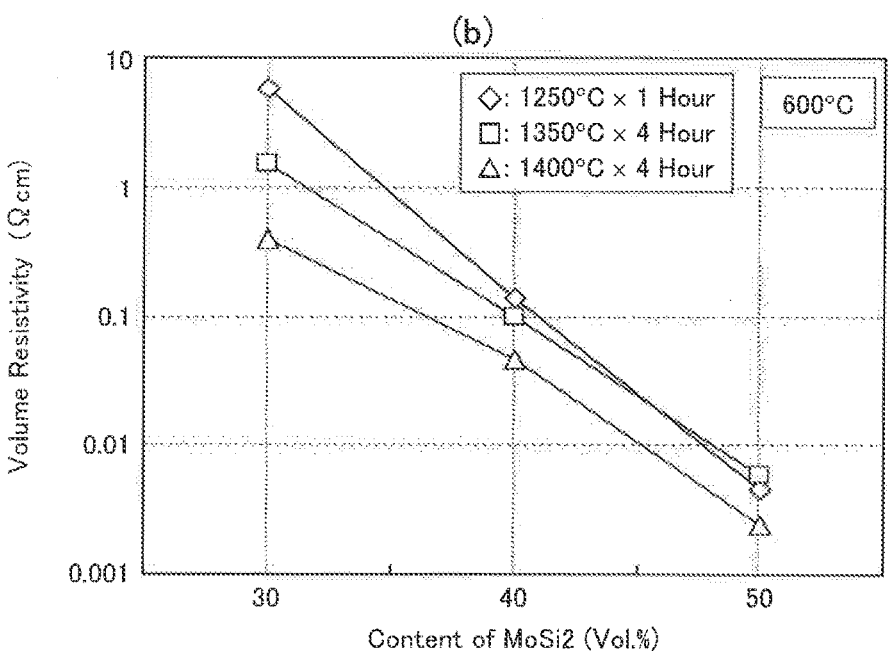

Table 40 and FIG. 19a show the volume resistivity at room temperature based on Table 39.

TABLE 40

Volume Resistivity (Unit: Ω cm) at Room Temperature Depending on Content of $MoSi_2$ and Baking Temperature

| Composition No. | 14 | 13 | 12 |
|---|---|---|---|
| Vol. % of Content of $MoSi_2$ | 30 | 40 | 50 |
| 1250° C. × 1 Hr | 5.786 | 0.135 | 0.005 |
| 1350° C. × 4 Hr | 1.491 | 0.098 | 0.006 |
| 1400° C. × 4 Hr | 0.395 | 0.046 | 0.002 |

From Table 40 and FIG. 19a, it is seen that the volume resistivity tends to decrease as the content of $MoSi_2$ is higher. In addition, the volume resistivity tends to decrease with an increase in the baking temperature, and with respect to the $MoSi_2$/Si-based material, densification progresses with an increase in the baking temperature. Thus, a decrease in the porosity is found to be a cause of a decrease in the volume resistivity.

Likewise, Table 41 below and FIG. 19b show the volume resistivity at 600° C. based on Table 39.

TABLE 41

Volume Resistivity (Unit: Ω cm) at 600° C. depending on Content of $MoSi_2$ and Baking Temperature

| Composition No. | 14 | 13 | 12 |
|---|---|---|---|
| Vol. % of Content of $MoSi_2$ | 30 | 40 | 50 |
| 1250° C. × 1 Hr | 0.355 | 0.093 | 0.012 |
| 1350° C. × 4 Hr | 0.124 | 0.065 | 0.014 |
| 1400° C. × 4 Hr | 0.070 | 0.025 | 0.006 |

From Table 41 and FIG. 19b, it is seen that the volume resistivity at 600° C. tends to be similar to that at room temperature.

[Measurement of Four-Point Flexural Strength and Results Thereof]

Next, the flexural strength of each of baked bodies made of $MoSi_2$/SiC/Si-based, $MoSi_2$/SiC-based, and $MoSi_2$/Si-based composite materials is evaluated.

(Measurement of Four-Point Flexural Strength at Room Temperature)

Figure 20:
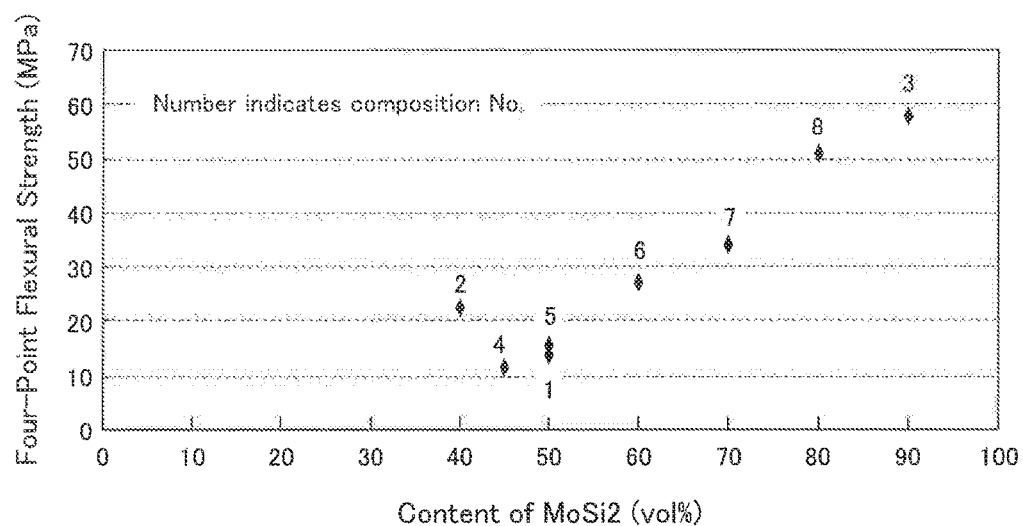
FIG. 20 is a diagram showing the relationship between the content of $MoSi_2$ and the four-point flexural strength at room temperature of each of Compositions No. 1 to No. 8 baked at 1500° C. for 4 hours.

As the experimental method, a four-point bending test was performed at room temperature in conformity with JIS R1601 using test pieces, which have been obtained by baking eight types of compositions of materials made of two or three of $MoSi_2$/SiC/Si, in an Ar atmosphere at 1500° C. for 4 hours. Table 42 below shows the compounding ratio of the components of each sintered body and the flexural strength thereof at room temperature, and FIG. 20 shows the correlation between the content of $MoSi_2$ and the four-point flexural strength.

TABLE 42

Copositions of Sintered Bodies and Four-Point Flexural Strengths thereof at Room Temperature

| Composition No. | MoSi2 (Vol %) | SiC (Vol %) | Si (Vol %) | N Number | Flexural Strength at Room Temperature | |
|---|---|---|---|---|---|---|
| | | | | | Mean Value | Standard Deviation |
| 3 | 90 | 0 | 10 | 10 | 57.7 | 5.0 |
| 8 | 80 | 10 | 10 | 10 | 50.8 | 8.4 |
| 7 | 70 | 20 | 10 | 10 | 34.1 | 4.6 |
| 6 | 60 | 30 | 10 | 10 | 27.1 | 4.0 |
| 5 | 50 | 40 | 10 | 10 | 15.8 | 0.9 |
| 1 | 50 | 50 | 0 | 10 | 14.0 | 1.9 |
| 4 | 45 | 45 | 10 | 10 | 11.6 | 0.7 |
| 2 | 40 | 30 | 30 | 10 | 22.7 | 2.5 |

From Table 42 and FIG. 20, it is seen that the four-point flexural strength at room temperature (a mean value of N=10) of each of the eight types of compositions made of two or three of $MoSi_2$/SiC/Si, which have been baked at 1500° C. for 4 hours, is 12 to 58 MPa, and the four-point flexural strength tends to increase with an increase in the content of $MoSi_2$. This bending test shows the results of the test pieces baked at the same temperature for the same hours. Thus, it is considered that a further increase in the strength is possible if optimal baking conditions for each composition are clarified.

(Measurement of Four-Point Flexural Strength at High Temperature)

Next, the four-point flexural strength at high temperature of each of the baked bodies of the eight types of compositions is evaluated to study the possibility of the baked body as a material for an electrode terminal or an electrode film from the perspective of high-temperature strength.

Figure 21:
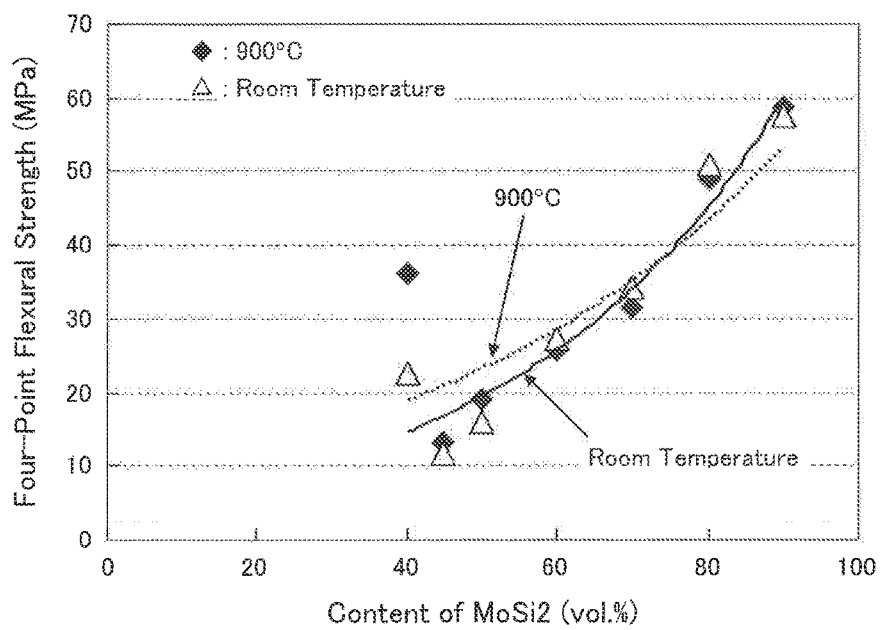
FIG. 21 is a diagram showing the relationship between the content of $MoSi_2$ and the four-point flexural strength at room temperature and at 900° C. of each of Compositions No. 1 to No. 8 baked at 1500° C. for 4 hours.

As the experimental method, a four-point bending test was performed at high temperature in conformity with JIS R1604 using eight sintered bodies of $MoSi_2$/SiC/Si-based materials. It should be noted that N=5. Table 43 below shows the composition of each sintered body, the four-point flexural strength at high temperature, and the four-point flexural strength at room temperature. FIG. 21 shows the strength at a high temperature of 900° C. and the strength at room temperature as representative examples.

TABLE 43

Compositions of Eight Types of Baked Bodies and Four-Point Flexural Strengths thereof at High Temperature (Room temperature is also shown for reference.)

| Composition No. | MoSi2 (Vol %) | SiC (Vol %) | Si (Vol %) | Mean Value of Flexural Strength (MPa) | | | Room Temperature |
|---|---|---|---|---|---|---|---|
| | | | | 300° C. | 600° C. | 900° C. | |
| 3 | 90 | 0 | 10 | 60.5 | 57.8 | 58.7 | 57.7 |
| 8 | 80 | 10 | 10 | 45.1 | 53.7 | 49.1 | 50.8 |
| 7 | 70 | 20 | 10 | 37.7 | 32.6 | 31.6 | 34.4 |
| 6 | 60 | 30 | 10 | 24.5 | 28.9 | 25.8 | 27.1 |
| 5 | 50 | 40 | 10 | 17.9 | 17.8 | 25.8 | 15.8 |
| 1 | 50 | 50 | 0 | 19.2 | 20.8 | 19.7 | 14.0 |
| 4 | 45 | 45 | 10 | 12.0 | 11.9 | 13.3 | 11.6 |
| 2 | 40 | 30 | 30 | 27.6 | 27.8 | 36.2 | 22.7 |

From Table 43, it is seen that the four-point flexural strengths at high temperatures of 300° C., 600° C., and 900° C. of the baked bodies of the eight types of compositions of the $MoSi_2$/SiC/Si-based materials have no difference from those at room temperature, and there has been no decrease in the strength at high temperature in the current measurement temperature range. Thus, it is concluded that the present $MoSi_2$/SiC/Si-based materials have strength that can withstand under the use environment of EHC and thus are novel materials that can be applied to an electrode terminal or an electrode film.

(Measurement of Four-Point Flexural Strengths at Room Temperature of Baked Bodies of $MoSi_2$/Si-Based Materials)

Next, with respect to baked bodies made of two-component-based materials of $MoSi_2$/Si, the four-point flexural strengths at room temperature of test pieces, which have been obtained through die casting, degreasing, and baking with the use of granulated powder, are evaluated.

Figure 22:
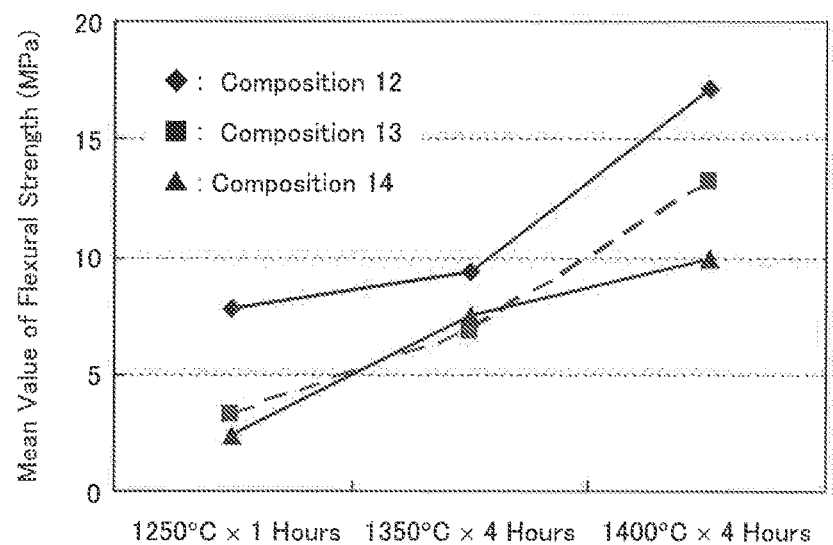
FIG. 22 is a diagram showing the relationship between the heat treatment temperature and the flexural strength of each of Compositions No. 12, No. 13, and No. 14 subjected to heat treatment at 1250° C. for 1 hour, subjected to heat treatment at 1350° C. for 4 hours, and subjected to heat treatment at 1400° C. for 4 hours.

As the experimental method, a four-point bending test was performed at room temperature in conformity with JIS R1601 using test pieces, which have been obtained by baking three types of compositions of two-component-based materials of $MoSi_2$/Si, in an Ar atmosphere at 1250 to 1450° C. Table 44 below shows the flexural strength at room temperature of each sintered body of $MoSi_2$/S depending on the compounding ratio of the components and the baking temperature, and FIG. 22 shows the correlation between the baking temperature and the four-point flexural strength.

TABLE 44

Four-Point Flexural Strengths (Unit: MPa) of Two-Component-based Materials of $MoSi_2$/Si Depending on Baking Temperature

| Composition | MoSi2 (vol %) | Si (vol %) | Baking Conditions | N Number | Four-Point Flexural Strength at Room Temperature | |
|---|---|---|---|---|---|---|
| | | | | | Mean Value (MPa) | Standard (MPa) Deviation |
| 12 | 50 | 50 | 1250° C. × 1 Hr | 5 | 7.8 | 1.2 |
| 13 | 40 | 60 | | 4 | 3.2 | 0.3 |
| 14 | 30 | 70 | | 5 | 2.4 | 0.2 |
| 12 | 50 | 50 | 1350° C. × 4 Hr | 5 | 9.3 | 1.1 |
| 13 | 40 | 60 | | 5 | 6.8 | 1.0 |
| 14 | 30 | 70 | | 5 | 7.5 | 1.2 |
| 12 | 50 | 50 | 1400° C. × 4 Hr | 5 | 17.2 | 3.2 |
| 13 | 40 | 60 | | 5 | 13.2 | 1.7 |
| 14 | 30 | 70 | | 4 | 9.9 | 1.0 |
| 12 | 50 | 50 | 1450° C. × 4 Hr | | | |
| 13 | 40 | 60 | | | | |
| 14 | 30 | 70 | | | | |

The four-point flexural strengths of sintered bodies, which have been produced by changing the composition ratio of $MoSi_2$/Si and the baking temperature, were evaluated. From Table 44 and FIG. 22, it is seen that the strength is greater as the compounding ratio of $MoSi_2$ is higher and as the baking temperature is higher. A baked body, which has been baked at 1400° C. for 4 hours, has a strength of 9.9 to 17.2 MPa. It should be noted that a product baked at 1450° C., which is greater than the melting point (1410° C.) of Si, had Si eluted from the surface of the test piece, and thus deformed. Thus, it was impossible to evaluate the strength.

[Evaluation of Characteristics of Pores with Mercury Porosimeter]

Next, the characteristics of the distribution of pores of baked bodies made of $MoSi_2$/SiC/Si-based, $MoSi_2$/SiC-based, and $MoSi_2$/Si-based composite materials are evaluated with a mercury porosimeter.

Figure 23:
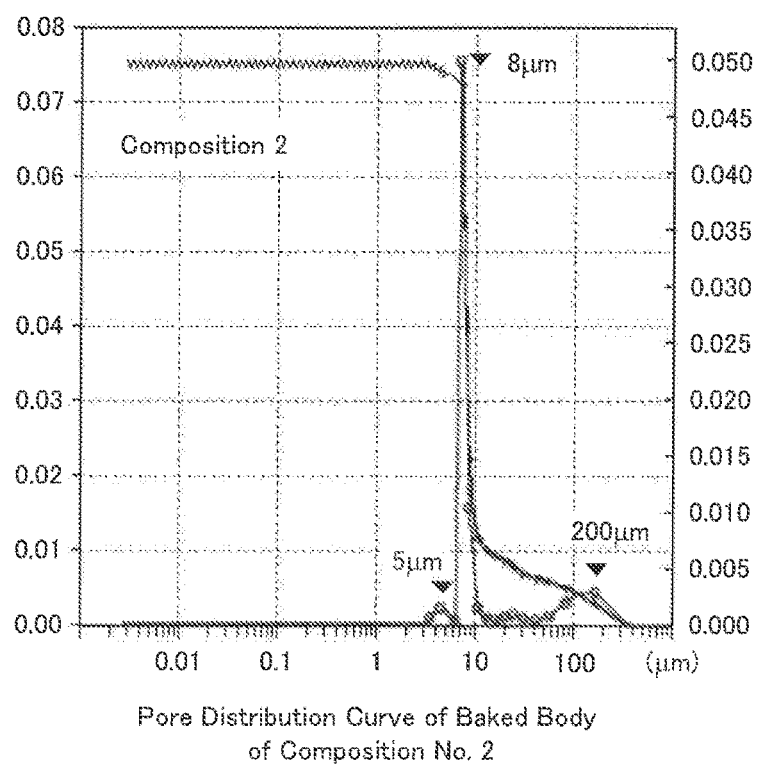
FIG. 23 is a diagram showing a micropore distribution curve of a baked body of Composition No. 2.

As the experimental method, eight samples of sintered bodies of $MoSi_2$/SiC/Si-based composite materials are used to determine the sizes of all pores, the medium pore size (i.e., average pore size), the porosity, and a pore distribution curve using a mercury porosimeter method in conformity with JIS R1601. Table 45 below shows the characteristics of pores of the eight types of compositions and a pore size corresponding to the peak position, and FIG. 23 shows a pore distribution curve of a baked body of Composition No. 2 as a representative example of the eight types of compositions.

TABLE 45

Compositions of Sintered Bodies, Characteristics of Pores, and Pore Size Corresponding to Peak Position

| Composition No. | Composition (Vol %) | | | Volume of All Pores (ml/g) | Median Pore Size | Porosity (%) | Pore Size (μm) | |
|---|---|---|---|---|---|---|---|---|
| | MoSi2 | SiC | Si | | | | Main Peak | Minor Peak |
| 3 | 90 | | 10 | 0.027 | 8.28 | 9.9 | 8 | 4, 50, 200 |
| 8 | 80 | 10 | 10 | 0.016 | 7.32 | 5.4 | 4, 7 | 30, 200 |
| 7 | 70 | 20 | 10 | 0.052 | 4.24 | 15.4 | 5 | 20, 100 |
| 6 | 60 | 30 | 10 | 0.07 | 4.86 | 19.7 | 5 | 20, 100 |
| 5 | 50 | 40 | 10 | 0.087 | 4.06 | 22.1 | 4 | 30, 200 |
| 1 | 50 | 50 | | 0.163 | 3.38 | 39.6 | 4 | 200 |
| 4 | 45 | 45 | 10 | 0.074 | 4.12 | 18.8 | 5 | 200 |
| 2 | 40 | 30 | 30 | 0.075 | 9.05 | 20.3 | 8 | 5, 200 |

From Table 45 and FIG. 23, it is seen that the volume of all pores, the medium pore size (i.e., average pore size), and the porosity of each of the eight types of sintered bodies of $MoSi_2$/SiC/Si-based materials (baked at 1500° C. for 4 hours) measured with a mercury porosimeter vary in the range of 0.016 to 0.163 ml/g, 3.38 to 9.05 μm, and 5.40 to 39.60%, respectively. In addition, the pore distribution curve has clarified that the main peak of the pore size is in the range of 4 to 8 μm.

[Measurement of Change in Weight and Results Thereof]

Next, an increase in the weight of each of the baked bodies of the $MoSi_2/SiC/Si$-based, $MoSi_2/SiC$-based, and $MoSi_2/Si$-based composite materials due to high-temperature oxidation is measured to evaluate the oxidation resistance.

As the experimental method, baked bodies of the eight types of compositions were machined into test pieces for measuring the amount of increase of oxidation, each having dimensions of a width of 5 mm×a thickness of 5 mm×a length of 30 mm. However, if the dimensions of some baked body were insufficient, the dimensions were reduced and the baked body was machined until a parallel plane appeared. Each of test pieces whose weights had been measured in advance was mounted on a plate of an $Al_2O_3$ sintered body and was loaded into a small box-shaped electric furnace, and then, the temperature was increased from the room temperature at a rate of 10° C./minute. The test piece was held in the atmosphere at 1000° C. for 24 hours, 48 hours, 96 hours, or 192 hours, and was cooled in the furnace. Upon termination of the oxidation test, the weight was measured again to determine the rate of weight increase from the initial weight. Table 46 below shows the results of oxidation tests at 1000° C. of the baked bodies of the eight types of compositions.

Figure 24:
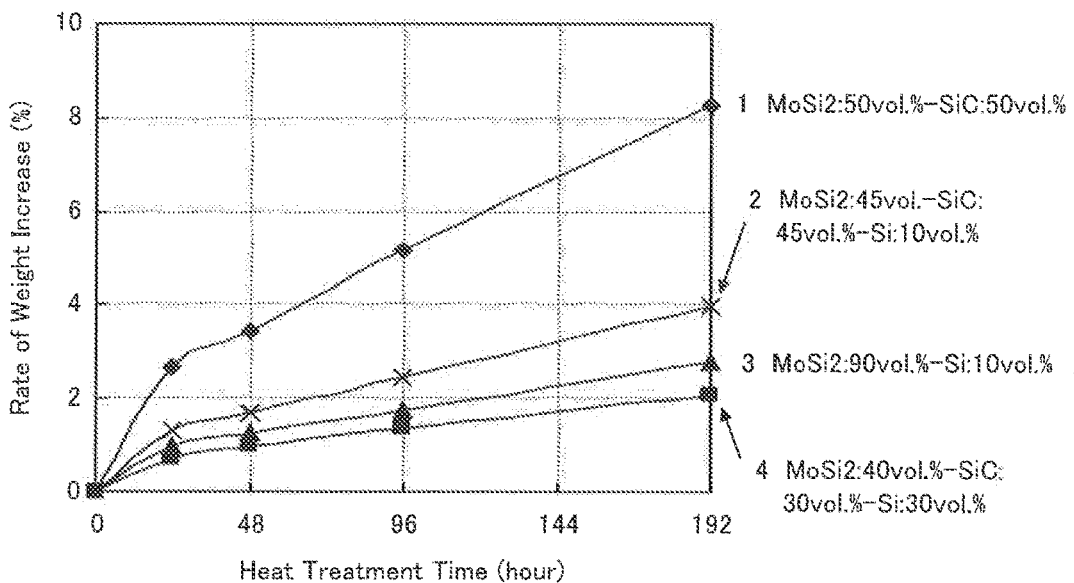
FIG. 24(a) is a diagram showing the relationship between the heat treatment time in the atmosphere at 1000° C. and the rate of weight increase of each of Compositions No. 1 to No. 4.
FIG. 24(b) is a diagram showing the relationship between the heat treatment time in the atmosphere at 1000° C. and the rate of weight increase of each of Compositions No. 5 to No. 8.
Figure 24:
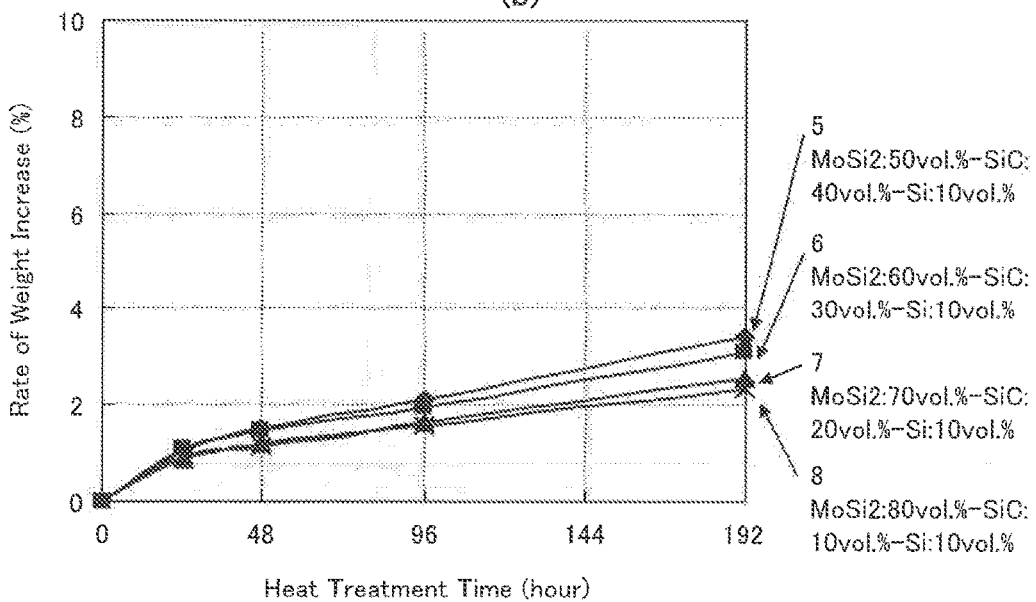

From the results in Table 46, the rates of weight increase in accordance with the heat treatment time of Compositions No. 1, 2, 3, and 4 and Compositions No. 5, 6, 7, and 8 are shown in FIGS. 24a and 24b, respectively.

From FIG. 24a, the rates of weight increase due to oxidation are in the order of Composition No. 1>Composition No. 4>Composition No. 3>Composition No. 2, and the rates of weight increase are in conformity with the parabolic law. Further, it is found that the rate of weight increase of each of Compositions No. 2, 3, and 4, which have been subjected to heat treatment for 192 hours, excluding Composition No. 1, is less than or equal to 4%, and thus has excellent oxidation resistance. Meanwhile, from FIG. 24b, it is also found that the rate of weight increase of each of Compositions No. 5, 6, 7, and 8 due to oxidation is in conformity with the parabolic law, and is 2.4 to 3.4% after heat treatment for 192 hours. As the rates of weight increase due to oxidation are low, Compositions No. 5, 6, 7, and 8 are also found to be baked bodies with excellent oxidation resistance as with Compositions No. 2, 3, and 4.

Figure 25:
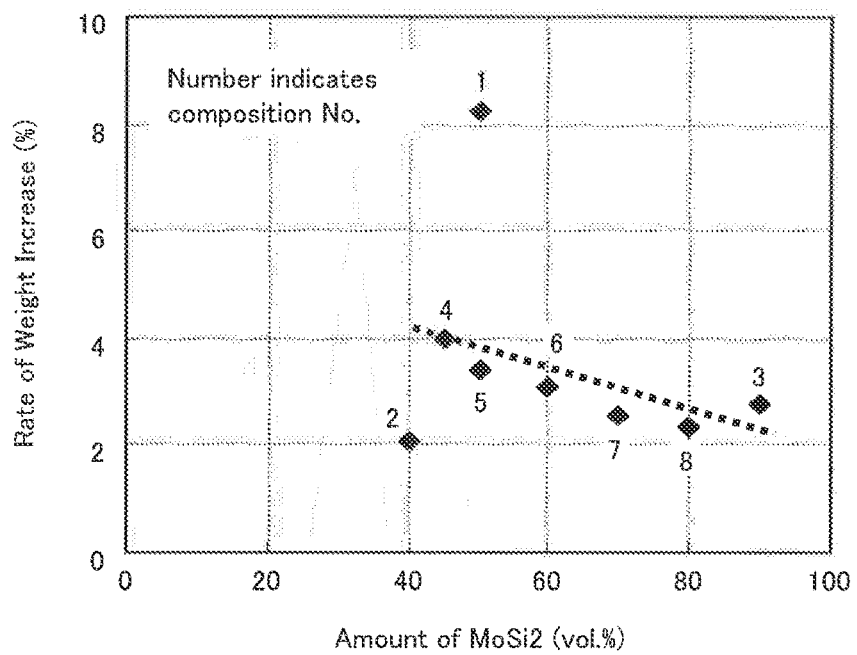
FIG. 25 is a diagram showing the relationship between the content of $MoSi_2$ and the rate of weight increase of each of Compositions No. 1 to No. 8 after subjected to heat treatment in the atmosphere at 1000° C. for 192 hours.

Next, Table 47 below shows data in Table 46 that is rearranged in order of decreasing amount of $MoSi_2$, and FIG. 25 is a diagram obtained by plotting the data relative to the content of $MoSi_2$.

TABLE 46

Results of Oxidation Test of Each Baked Body in Atmosphere at 1000° C.

| Composition No. | Composition (Vol %) | Heat Treatment Temperature (° C.) | Treatment Time (Hr) | Initial Weight (g) | Weight after Heat Treatment (g) | Rate of Weight Increase (%) |
|---|---|---|---|---|---|---|
| 1 | $MoSi_2$:50 | 1000 | 24 | 1.89015 | 1.94057 | 2.67 |
|  | —SiC:50 |  | 48 | 1.88934 | 1.95357 | 3.40 |
|  |  |  | 96 | 1.91736 | 2.01644 | 5.17 |
|  |  |  | 192 | 1.87093 | 2.02522 | 8.25 |
| 2 | $MoSi_2$:40 | 1000 | 24 | 1.88895 | 1.90268 | 0.73 |
|  | —SiC:30 |  | 48 | 1.89237 | 1.91055 | 0.96 |
|  | —Si:30 |  | 96 | 1.91326 | 1.93973 | 1.38 |
|  |  |  | 192 | 1.91972 | 1.95953 | 2.07 |
| 3 | $MoSi_2$:90 | 1000 | 24 | 1.92323 | 1.94167 | 0.96 |
|  | —Si:10 |  | 48 | 1.95726 | 1.98126 | 1.23 |
|  |  |  | 96 | 1.97682 | 2.01099 | 1.73 |
|  |  |  | 192 | 1.96738 | 2.02224 | 2.79 |
| 4 | $MoSi_2$:45 | 1000 | 24 | 1.84022 | 1.86421 | 1.30 |
|  | —SiC:45 |  | 48 | 1.82096 | 1.85208 | 1.71 |
|  | —Si:10 |  | 96 | 1.80997 | 1.85461 | 2.47 |
|  |  |  | 192 | 1.81933 | 1.89177 | 3.98 |
| 5 | $MoSi_2$:50 | 1000 | 24 | 1.9101 | 1.9298 | 1.03 |
|  | —SiC:40 |  | 48 | 1.8976 | 1.9264 | 1.52 |
|  | —Si:10 |  | 96 | 1.9005 | 1.9403 | 2.09 |
|  |  |  | 192 | 1.8881 | 1.9524 | 3.41 |
| 6 | $MoSi_2$:60 | 1000 | 24 | 2.0340 | 2.0564 | 1.10 |
|  | —SiC:30 |  | 48 | 2.0619 | 2.0920 | 1.46 |
|  | —Si:10 |  | 96 | 2.0513 | 2.0913 | 1.95 |
|  |  |  | 192 | 2.0927 | 2.1574 | 3.09 |
| 7 | $MoSi_2$:70 | 1000 | 24 | 1.8958 | 1.9127 | 0.89 |
|  | —SiC:20 |  | 48 | 1.9166 | 1.9390 | 1.17 |
|  | —Si:10 |  | 96 | 1.9186 | 1.9497 | 1.62 |
|  |  |  | 192 | 1.9212 | 1.9701 | 2.55 |
| 8 | $MoSi_2$:80 | 1000 | 24 | 2.1046 | 2.1238 | 0.91 |
|  | —SiC:10 |  | 48 | 2.1133 | 2.1378 | 1.16 |
|  | —Si:10 |  | 96 | 2.1026 | 2.1353 | 1.56 |
|  |  |  | 192 | 2.0913 | 2.1407 | 2.36 |

TABLE 47

Rates of Weight Increase of Compositions, Which Have Been Subjected to Heat Treatment in Atmosphere at 1000° C. for 192 Hours, Rearranged in order of Decreasing Amount of MoSi$_2$

| Composition No. | MoSi$_2$ (Vol %) | SiC (Vol %) | Si (Vol %) | Rate of Weight Increase (%) |
|---|---|---|---|---|
| 3 | 90 | 0 | 10 | 2.79 |
| 8 | 80 | 10 | 10 | 2.36 |
| 7 | 70 | 20 | 10 | 2.55 |
| 6 | 60 | 30 | 10 | 3.09 |
| 1 | 50 | 50 | 0 | 8.25 |
| 5 | 50 | 40 | 10 | 3.41 |
| 4 | 45 | 45 | 10 | 3.98 |
| 2 | 40 | 30 | 30 | 2.07 |

From Table 47 and FIG. 25, it is seen that the amount of increase of oxidation of six compositions excluding Compositions No. 1 and 2 tend to slightly decrease with an increase in the content of MoSi$_2$. That is, it has been clarified that with respect to the MoSi$_2$/SiC/Si-based composite materials, oxidation resistance improves as the amount of MoSi$_2$ is larger. This is considered to be due to the fact that the oxidation resistance of the MoSi$_2$ baked body is high.

Figure 26:
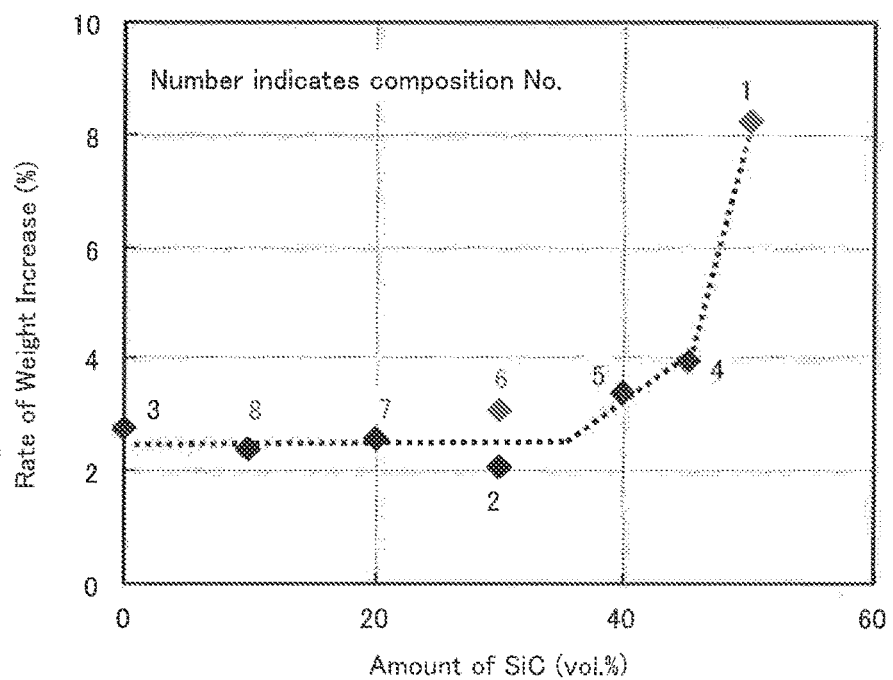
FIG. 26 is a diagram showing the relationship between the content of SiC and the rate of weight increase of each of Compositions No. 1 to No. 8 after subjected to heat treatment in the atmosphere at 1000° C. for 192 hours.

Next, Table 48 below shows the data that is rearranged in order of decreasing amount of SiC in the same way, and FIG. 26 is a diagram obtained by plotting the rate of weight increase relative to the content of SiC.

TABLE 48

Rates of Weight Increase of Compositions, Which Have Been Subjected to Heat Treatment in Atmosphere at 1000° C. for 192 Hours, Rearranged in order of Decreasing Amount of SiC

| Composition No. | SiC (Vol %) | MoSi$_2$ (Vol %) | Si (Vol %) | Rate of Weight Increase (%) |
|---|---|---|---|---|
| 1 | 50 | 50 | 0 | 8.25 |
| 4 | 45 | 45 | 10 | 3.98 |
| 5 | 40 | 50 | 10 | 3.41 |
| 6 | 30 | 60 | 10 | 3.09 |
| 2 | 30 | 40 | 30 | 2.07 |
| 7 | 20 | 70 | 10 | 2.55 |
| 8 | 10 | 80 | 10 | 2.36 |
| 3 | 0 | 90 | 10 | 2.79 |

From Table 48 and FIG. 26, it is recognized that with respect to a composition whose SiC content is less than or equal to about 30 Vo. %, the rate of weight increase has no dependence on the SiC amount. However, when the amount of SiC further increases, the rate of weight increase also increases, and the rate of weight increase of Composition No. 1 is as high as 8.25%, which is about double the rates of weight increase of the seven other compositions. Herein, the rate of weight increase of Composition No. 1 is considered to be due to the oxidation reaction of SiC→SiO$_2$.

[Evaluation of Oxidation Resistance]

Next, the constituent phase of the inside of each of baked bodies made of MoSi$_2$/SiC/Si-based, MoSi$_2$/SiC-based, and MoSi$_2$/Si-based composite materials is identified and the amount of oxide generated is analyzed through semi-quantitative XRD analysis to evaluate the oxidation resistance.

As the experimental method, each of baked bodies of Compositions No. 2 and 5 having dimensions of 3 mm×5 mm×30 mm was cut at the center, and the cut surface was polished with water to analyze the polished surface through XRD. In the XRD analysis, only the center portion of each test piece was irradiated with a beam narrowed down to 800 µm. When the angle of rotation of the goniometer is taken into consideration, the test piece should be irradiated with an X-ray at an elliptic region with a minor axis of about 800 µm and a major axis of 3 mm, so that information on the region is obtained.

Measurement conditions of the XRD analysis are shown in Table 7 above.

Figure 27:
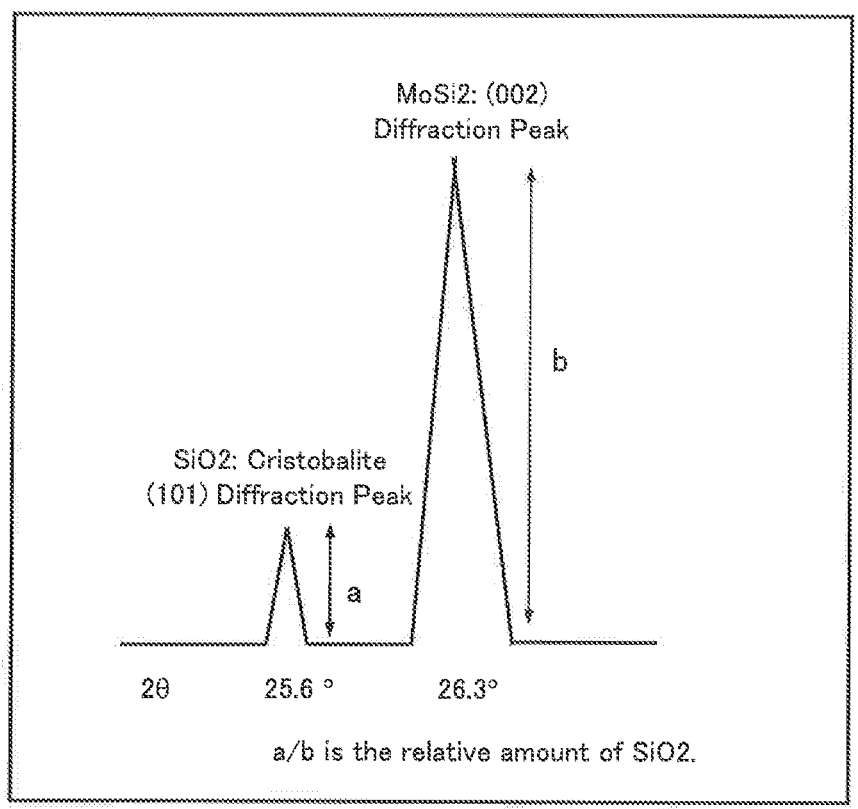
FIG. 27 is a diagram illustrating a summary of semi-quantitative analysis that is performed based on the peak-length ratio.

With respect to the quantitative ratio of SiO$_2$ (cristobalite) to MoSi$_2$, the height (a) of the (101) diffraction peak of SiO$_2$ (cristobalite) where 2θ=25.6° and the height (b) of the (002) diffraction peak of MoSi$_2$ where 2θ=26.3° were measured as shown in FIG. 27, and a/b was determined to the relative amount of SiO$_2$ (cristobalite). It should be noted that in order to perform more accurate quantitative determination, a known amount of each powder should be mixed to create a calibration curve of an X-ray peak ratio/mixed amount in advance. This time, however, semi-quantitative analysis was performed using a simple method such as the one described above.

Figure 28:
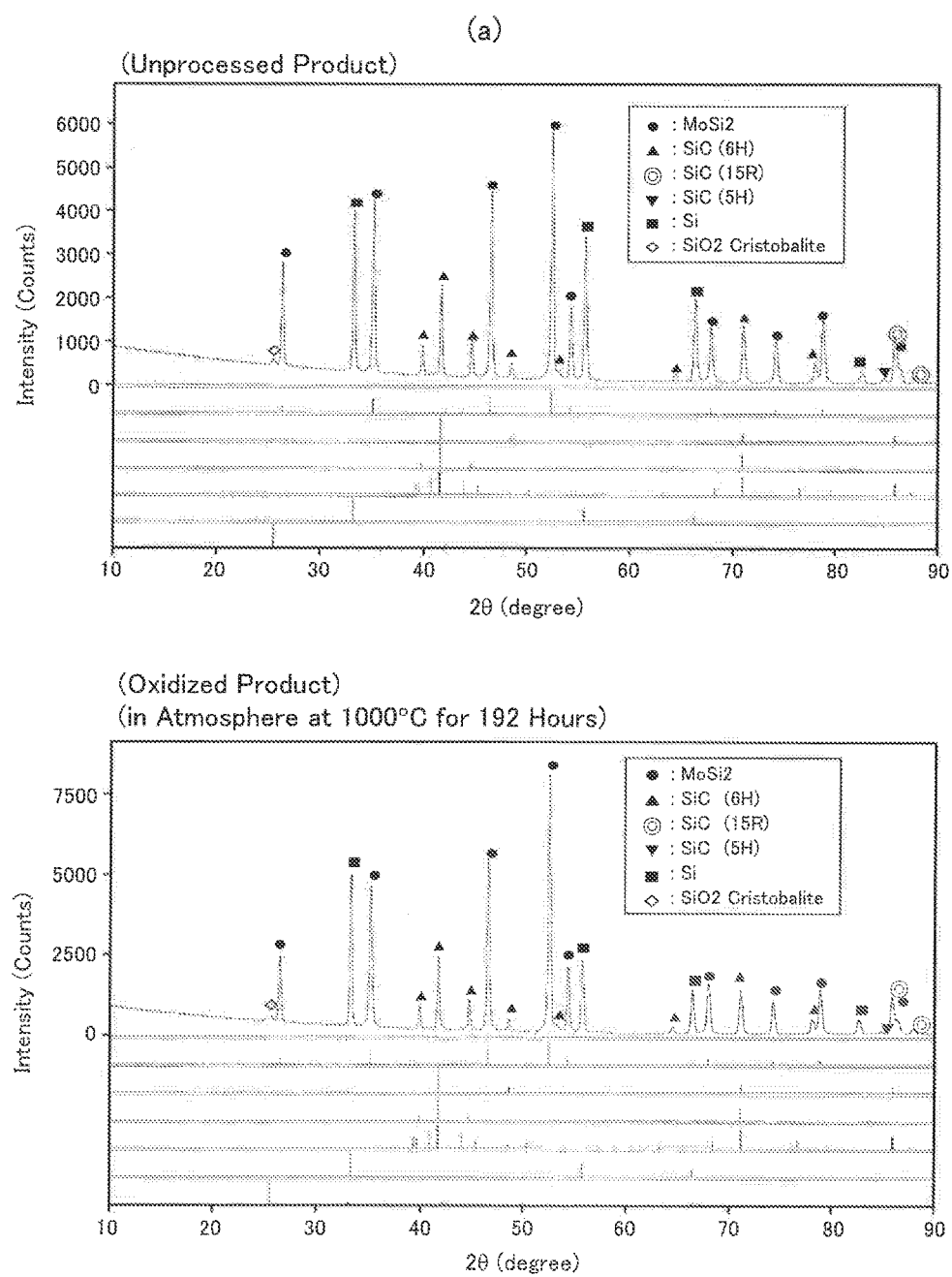
FIG. 28(a) show XRD diagrams of the insides of baked bodies of Composition No. 2 (i.e., $MoSi_2$/SiC/Si composite material).
FIG. 28(b) show XRD diagrams of the insides of baked bodies of Composition No. 5 (i.e., $MoSi_2$/SiC/Si composite material).
Figure 28:
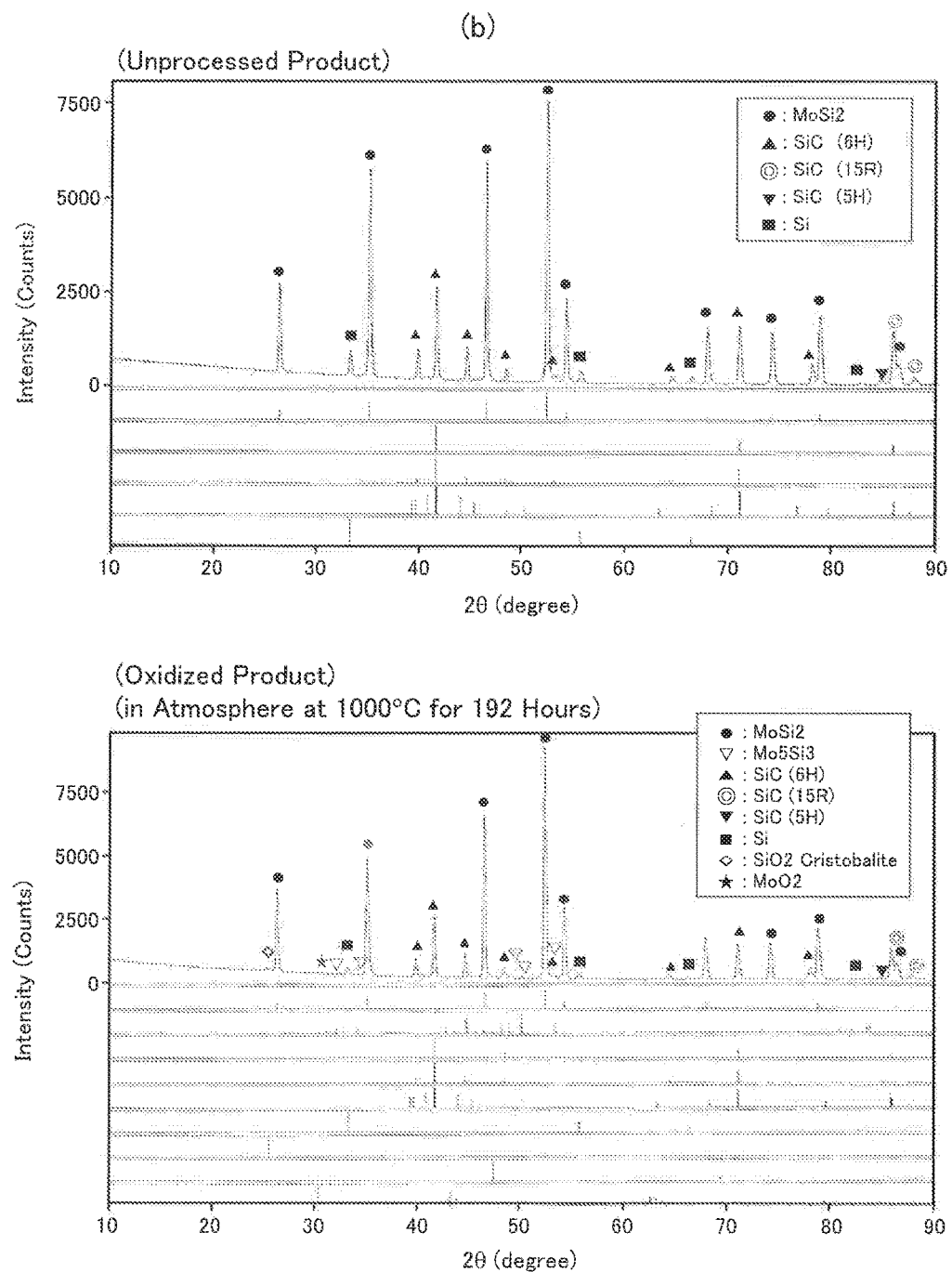

The upper and lower diagrams of FIG. 28a show XRD diagrams of the insides of baked bodies of Composition No. 2 (MoSi$_2$: 50 vol. %—SiC: 40 vol. %—Si: 10 vol. %), which have not been subjected to oxidation treatment and subjected to oxidation treatment in the atmosphere at 1000° C. for 192 hours, respectively.

From FIG. 28a, it is found that the constituent phases of the insides of the products, which have been subjected to heat treatment and not subjected to heat treatment, are similar, and SiO$_2$ (cristobalite) is detected in addition to the starting materials.

The upper and lower diagrams of FIG. 28b show XRD diagrams of the insides of baked bodies of Composition No. 5 (MoSi$_2$: 50 vol. %—SiC: 40 vol. %—Si: 10 vol. %), which have not been subjected to oxidation treatment and subjected to oxidation treatment in the atmosphere at 1000° C. for 192 hours, respectively.

From FIG. 28b, it is found that only the starting materials are detected from the non-oxidized product of Composition No. 5, while the oxidized product also contains trace amounts of SiO$_2$ (cristobalite).

From the above results, the constituent phases of the insides of the baked bodies of Composition No. 2 and Composition No. 5 are shown in Table 49 below. It should be noted that the constituent phases of the surfaces are also shown for reference.

TABLE 49

Constituent Phases of Insides and Surfaces of Composition No. 2 and Composition No. 5

| Sample Composition (Vol %) | Inside | | Surface (for Reference) | |
|---|---|---|---|---|
| | Unprocessed Product | Product Processed at 1000° C. for 192 Hr | Unprocessed Product | Product Processed at 1000° C. for 192 Hr |
| No. 2: MoSi$_2$: 40 - SiC: 30 - Si: 30 | MoSi$_2$ SiC Si SiO$_2$ (Cristobalite) | MoSi$_2$ SiC Si SiO$_2$ (Cristobalite) | MoSi$_2$ SiC Si SiO$_2$ (Cristobalite) | MoSi$_2$ SiC Si SiO$_2$ (Cristobalite) |
| No. 5: MoSi$_2$: 50 - SiC: 40 - Si: 10 | MoSi$_2$ SiC Si | MoSi$_2$ SiC Si SiO$_2$ (Cristobalite) MoO$_2$ (Trace) | MoSi$_2$ SiC Si | MoSi$_2$ SiC, Si Mo$_5$Si$_3$ SiO$_2$ (Cristobalite) MoO$_2$ (Trace) |

From Table 49, $SiO_2$ (cristobalite) is detected from all samples excluding the inside and the surface of unprocessed Composition No. 5.

The oxidation resistance of the baked body of the $MoSi_2$/SiC/Si-based composite material was attempted to be determined through semi-quantitative analysis of the amount of $SiO_2$ (cristobalite) generated relative to $MoSi_2$. That is, Table 50 below and FIG. 29 show the ($SiO_2(101)$ peak length(a)/$MoSi_2(002)$ peak length(b)) value, that is, the a/b value determined from the XRD diagram as shown in FIG. 27.

TABLE 50 a/b Value of Each Sample

| | Surface | | Inside | |
|---|---|---|---|---|
| Sample Composition (Vol %) | Unprocessed Product | Product Processed at 1000° C. for 192 | Unprocessed Product | Product Processed at 1000° C. for 192 |
| No. 2: $MoSi_2$: 40 - SiC: 30 - Si: 30 | 0.139 | 0.424 | 0.06 | 0.08 |
| No. 5: $MoSi_2$: 50 - SiC: 40 - Si: 10 | 0 | 0.063 | 0 | 0.033 |

Figure 29:
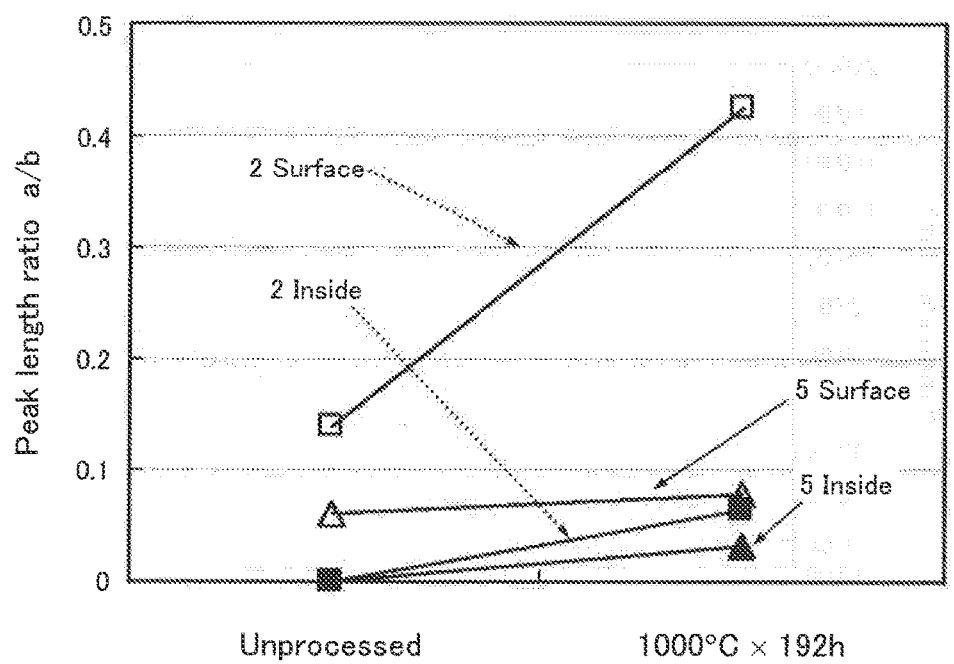
FIG. 29 is a diagram showing the diffraction peak ratio (a/b) of an unprocessed product and an oxidized product of $SiO_2$/$MoSi_2$.
Figure 30:
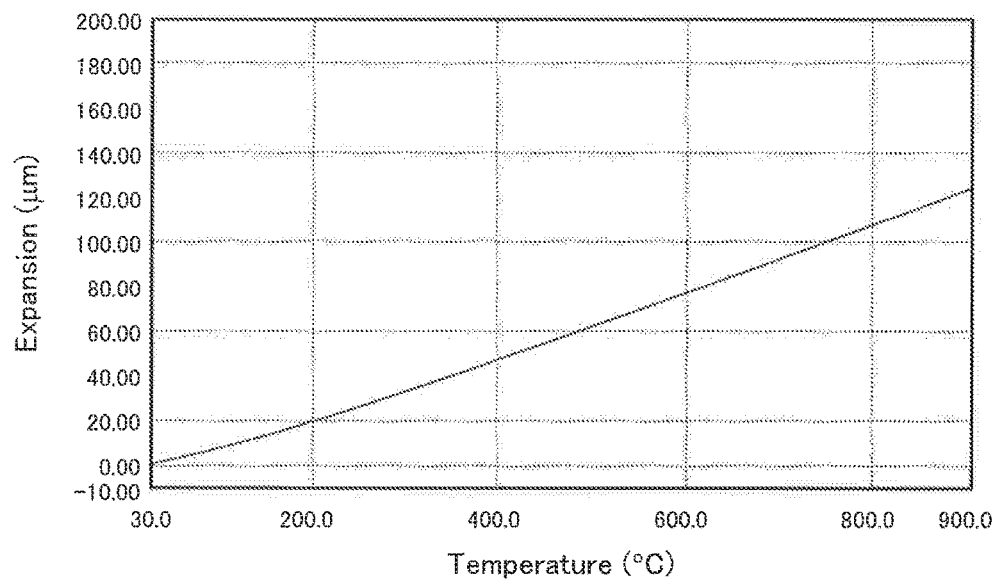
FIG. 30(a) is a diagram showing the relationship between the temperature and expansion of a baked body of Composition No. 1.
FIG. 30(b) is a diagram showing the relationship between the temperature and expansion of a baked body of Composition No. 2.
FIG. 30(c) is a diagram showing the relationship between the temperature and expansion of a baked body of Composition No. 3.
FIG. 30(d) is a diagram showing the relationship between the temperature and expansion of a baked body of Composition No. 4.
FIG. 30(e) is a diagram showing the relationship between the temperature and expansion of a baked body of Composition No. 5.
FIG. 30(f) is a diagram showing the relationship between the temperature and expansion of a baked body of Composition No. 6.
FIG. 30(g) is a diagram showing the relationship between the temperature and expansion of a baked body of Composition No. 7.
FIG. 30(h) is a diagram showing the relationship between the temperature and expansion of a baked body of Composition No. 8.
Figure 30:
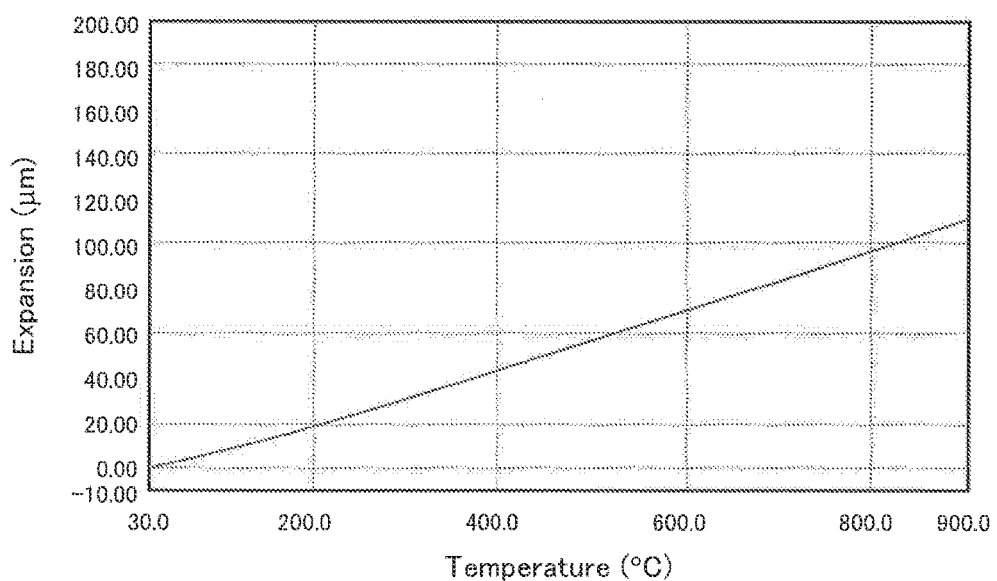
Figure 30:
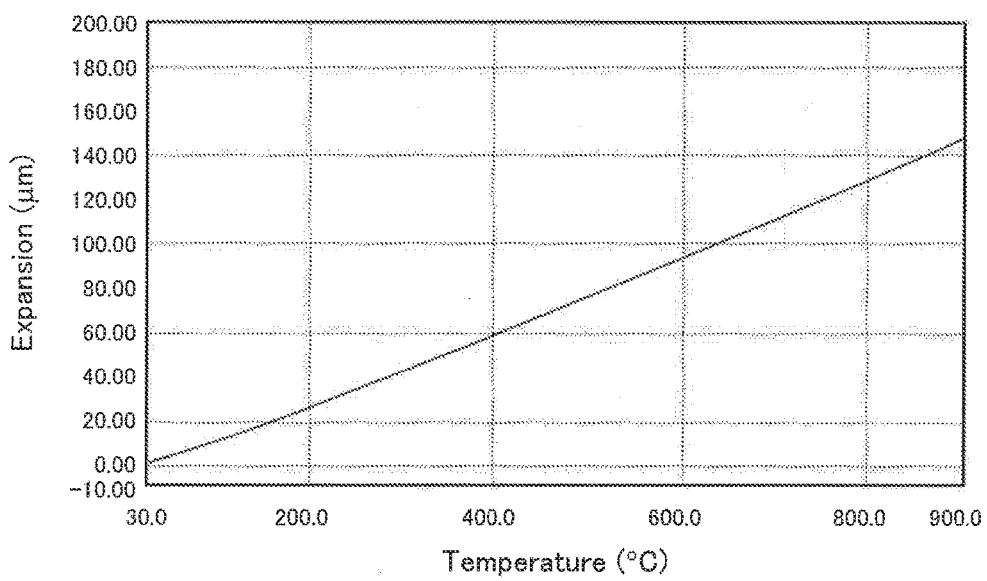
Figure 30:
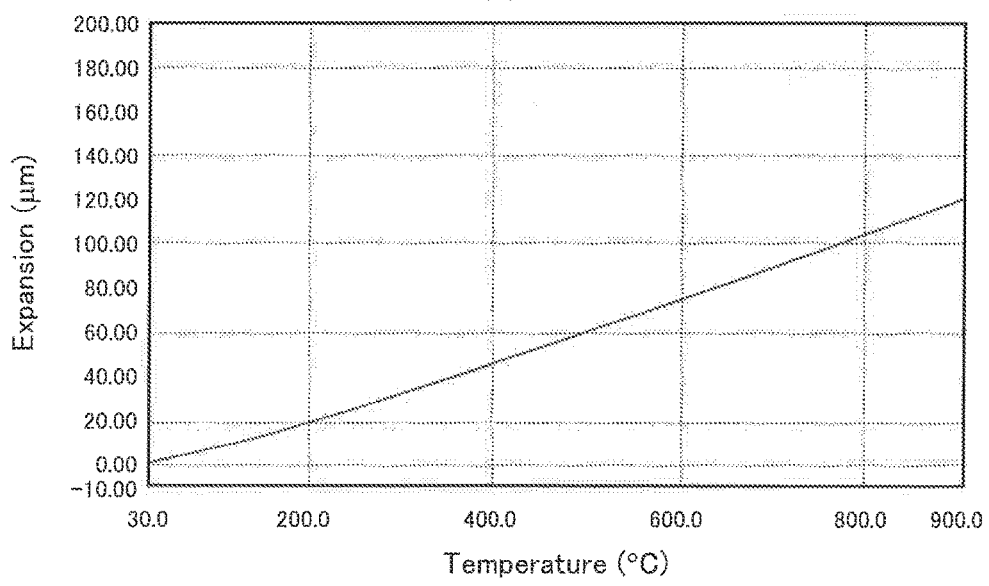
Figure 30:
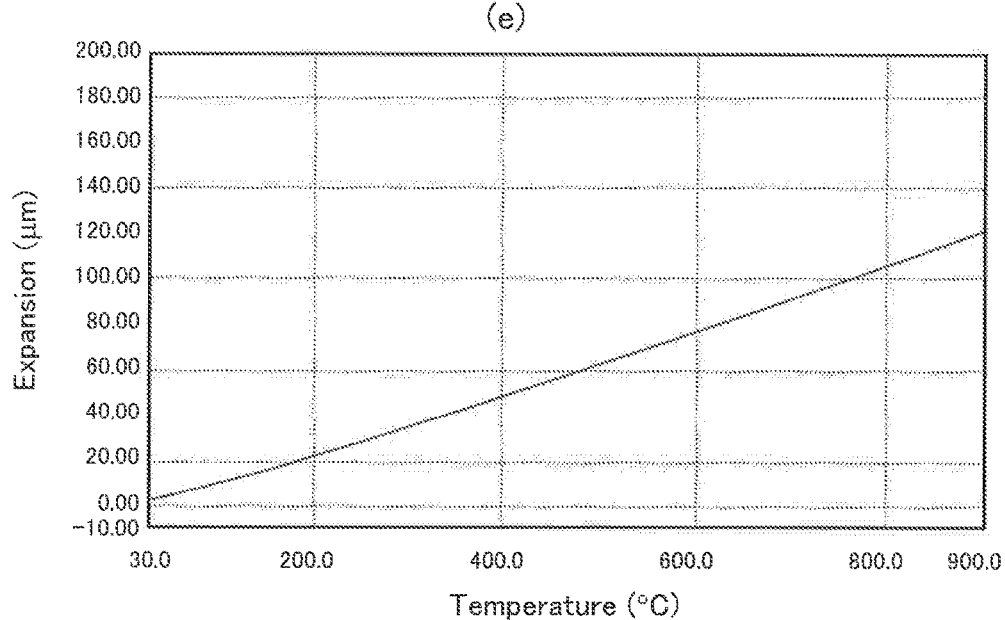
Figure 30:
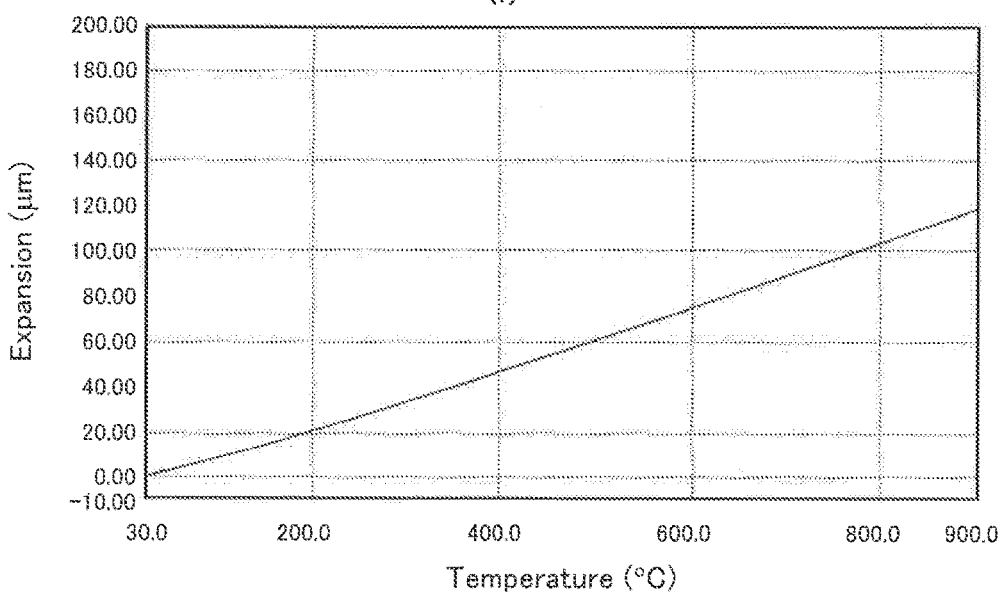
Figure 30:
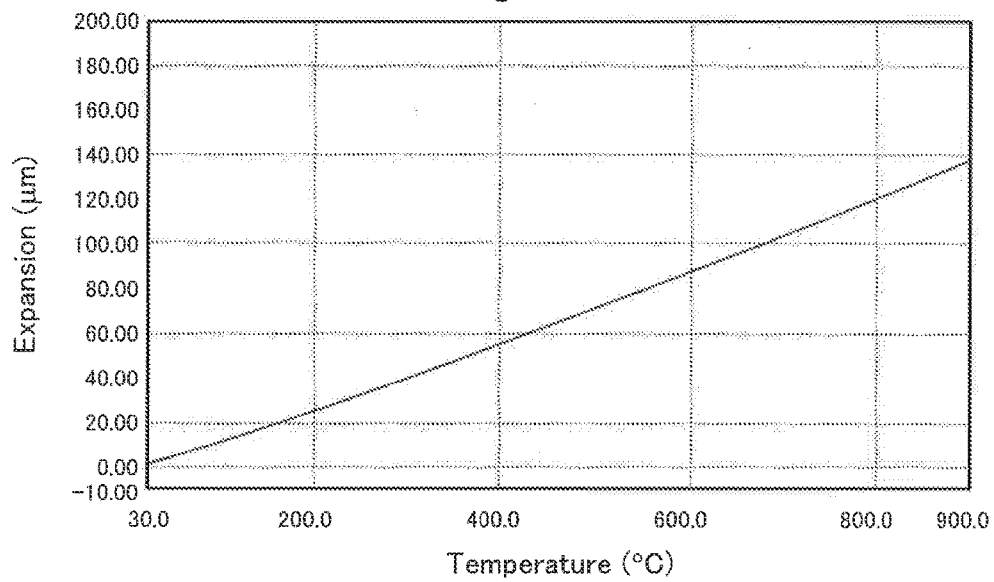
Figure 30:
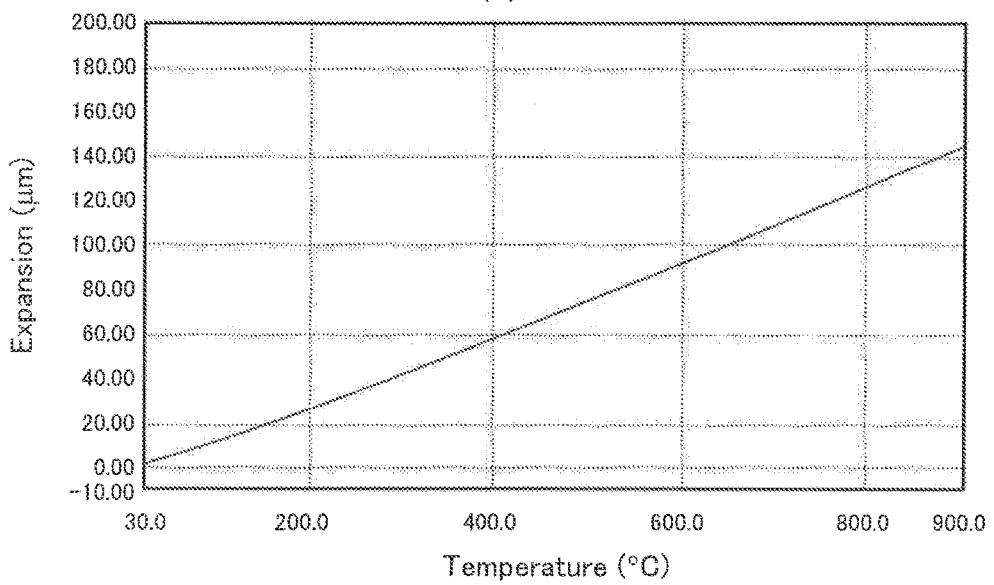

From Table 50 and FIG. 29, it is concluded that the inside of the baked body of the $MoSi_2$/SiC/Si-based material is less easily oxidized than the surface thereof from the perspective of semi-quantitative analysis. Further, it is also found that as the a/b value of Composition No. 5 is lower than that of Composition No. 2, a baked body that contains a higher content of $MoSi_2$ is less easily oxidized. Further, as the amount of $MoO_2$ is found to be trace from the XRD diagram, it is considered that passivation of $MoSi_2$ has been generated, and thus, a baked body of a composite material that contains a large amount of passivated $MoSi_2$ has higher oxidation resistance.

[Evaluation of Thermal Expansion Characteristics]

Next, the thermal expansion characteristics of baked bodies made of $MoSi_2$/SiC/Si-based, $MoSi_2$/SiC-based, and $MoSi_2$/Si-based composite materials are evaluated.

As the experimental method, baked bodies of the eight types of Compositions No. 1 to 8 each having a width of 4 mm×a thickness of 3 mm×a length of 48 mm were processed into test pieces for measurement each having width of 4 mm×a thickness of 3 mm×a length of 20 mm, and then, linear expansion (%) and the average linear thermal expansion coefficient was determined at room temperature to 900° C. The rate of temperature increase was set to 10° C./minute and measurement was performed in a $N_2$ atmosphere. Sapphire was used as a reference sample, and an R-type thermocouple was used as a thermocouple for measuring the temperature. The linear expansion (%) and the average linear thermal expansion ($\alpha$) at room temperature tr to the measurement temperature t (° C.) were determined from Formulae 2 and 3 below.

Linear thermal expansion(%)=($\Delta L/Lr$)×100 (Formula 2)

Average linear thermal expansion coefficient($\alpha$)=(1/$Lr$)×($Lt-Lr$)/($t-tr$) (Formula 3)

Herein, Lr represents the length of a sample at room temperature, Lt represents the length of the sample at the measurement temperature, t represents the measurement temperature, and tr represents the room temperature (30° C.). The device used for the measurement is a device that uses a differential thermal expansion scheme and is able to detect difference in the amount of expansion between a sample and a reference sample whose expansion coefficient is known in advance, as a measurement system including a support jig and the like.

$\Delta L$ that is the amount of expansion of the sample was determined from Formula 4 below.

$\Delta L = \Delta LM - \Delta LB + \Delta LR$ (Formula 4)

Herein, $\Delta LM$ represents the amount of expansion from the room temperature to t (° C.) of the entire measurement system obtained in the measurement of a sample, $\Delta LR$ represents the amount of expansion of a reference sample from the room temperature to t(° C.), and $\Delta LB$ represents the amount of expansion obtained in a blank test (which corresponds to the amount of expansion of a support jig and the like). For the blank test, two reference samples with the same length were used, and measurement was performed at the same rate of temperature increase as that in the measurement of the sample.

FIGS. 30a to 30h show the linear expansion curves of the baked bodies of Compositions No. 1 to No. 8, respectively.

From FIGS. 30a to 30h, it is found that expansion of each sample increases almost linearly with an increase in the temperature, and no change point in the expansion is recognized in the range of from the room temperature to 900° C.

Table 51 shows the measurement results of the linear thermal expansion (%) of Compositions No. 1 to No. 8 in each temperature range. Further, Table 52 shows the thermal expansion coefficient (i.e., average linear thermal expansion coefficient) in each temperature range.

TABLE 51

Linear Thermal Expansion (%) of Baked Bodies of Compositions No. 1 to No. 8

| Measurement Temperature (° C.) | Composition | | | | | | | |
|---|---|---|---|---|---|---|---|---|
| | No. 1 | 2 | 3 | 4 | 5 | 6 | 7 | 8 |
| 30-300 | 0.16 | 0.15 | 0.21 | 0.16 | 0.17 | 0.16 | 0.19 | 0.20 |
| 30-400 | 0.24 | 0.22 | 0.29 | 0.23 | 0.24 | 0.23 | 0.27 | 0.29 |
| 30-500 | 0.31 | 0.28 | 0.38 | 0.30 | 0.31 | 0.30 | 0.35 | 0.37 |
| 30-600 | 0.38 | 0.35 | 0.46 | 0.37 | 0.38 | 0.37 | 0.43 | 0.45 |
| 30-700 | 0.46 | 0.42 | 0.55 | 0.45 | 0.46 | 0.44 | 0.51 | 0.54 |
| 30-800 | 0.54 | 0.48 | 0.64 | 0.52 | 0.53 | 0.51 | 0.60 | 0.63 |
| 30-900 | 0.61 | 0.55 | 0.73 | 0.60 | 0.61 | 0.59 | 0.68 | 0.72 |

TABLE 52

Thermal Expansion Coefficients (×$10^{-6}$/° C.) of Baked Bodies of Compositions No. 1 to No. 8

| Measurement Temperature (° C.) | Composition | | | | | | | |
|---|---|---|---|---|---|---|---|---|
| | No. 1 | 2 | 3 | 4 | 5 | 6 | 7 | 8 |
| 30-300 | 6.0 | 5.7 | 7.7 | 5.9 | 6.2 | 6.0 | 7.1 | 7.5 |
| 30-400 | 6.3 | 5.9 | 7.9 | 6.2 | 6.4 | 6.2 | 7.3 | 7.7 |
| 30-500 | 6.6 | 6.0 | 8.0 | 6.4 | 6.6 | 6.4 | 7.4 | 7.9 |
| 30-600 | 6.7 | 6.1 | 8.2 | 6.5 | 6.7 | 6.5 | 7.5 | 8.0 |
| 30-700 | 6.8 | 6.2 | 8.2 | 6.7 | 6.8 | 6.6 | 7.6 | 8.1 |
| 30-800 | 7.0 | 6.3 | 8.3 | 6.8 | 6.9 | 6.7 | 7.7 | 8.2 |
| 30-900 | 7.1 | 6.4 | 8.4 | 6.9 | 7.0 | 6.8 | 7.8 | 8.3 |

From Tables 51 and 52, it is found that each of the linear expansion coefficient and the thermal expansion coefficient tends to increase in the higher temperature range.

Figure 31:
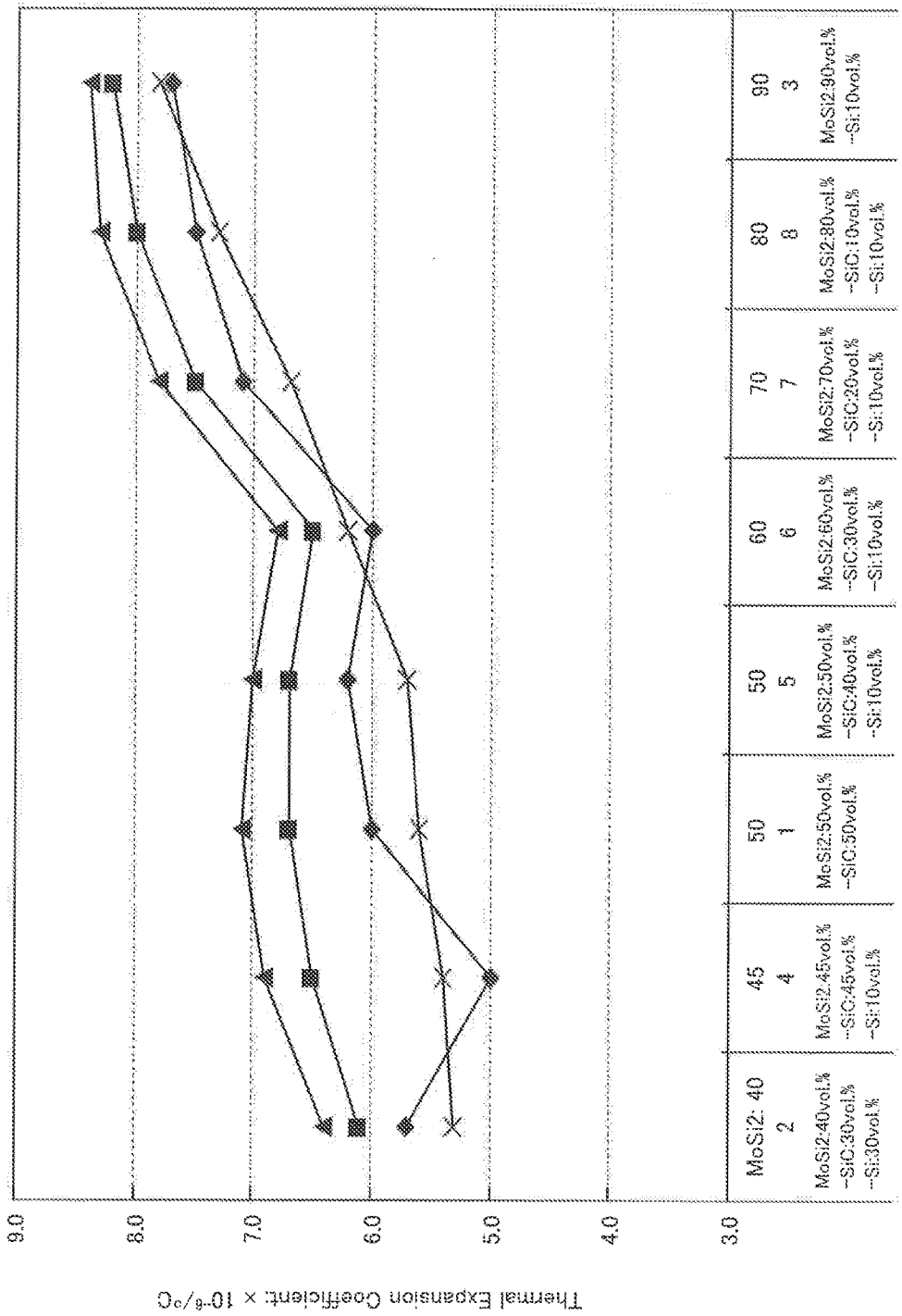
FIG. 31 is a diagram showing the relationship between the content of $MoSi_2$ and the thermal expansion coefficient of each of Compositions No. 1 to 8.

Table 53 and FIG. 31 show the correlation of the thermal expansion coefficient relative to the content of $MoSi_2$ of each of the eight compositions.

TABLE 53

Content of $MoSi_2$ and Thermal Expansion Coefficient

| Composition No. | $MoSi_2$ (Vol %) | SiC (Vol %) | Si (Vol %) | Thermal Expansion Coefficient ($\times 10^{-6}/°$ C.) | | | |
|---|---|---|---|---|---|---|---|
| | | | | 30-300° C. | 30-600° C. | 30-900° C. | (*)Calculated |
| 3 | 90 | 0 | 10 | 7.7 | 8.2 | 8.4 | 7.8 |
| 8 | 80 | 10 | 10 | 7.5 | 8.0 | 8.3 | 7.3 |
| 7 | 70 | 20 | 10 | 7.1 | 7.5 | 7.8 | 6.7 |
| 6 | 60 | 30 | 10 | 6.0 | 6.5 | 6.8 | 6.2 |
| 5 | 50 | 40 | 10 | 6.2 | 6.7 | 7.0 | 5.7 |
| 1 | 50 | 50 | 0 | 6.0 | 6.7 | 7.1 | 5.6 |
| 4 | 45 | 45 | 10 | 5.0 | 6.5 | 6.9 | 5.4 |
| 2 | 40 | 30 | 30 | 5.7 | 6.1 | 6.4 | 5.3 |

(*)Calculated values are those determined based on the law of mixture using the values in the document: $MoSi_2$: 8.3, SiC: 2.9, and Si: 3.9 ($\times 10^{-6}/°$ C.)

From Table 53 and FIG. 31, it is found that the thermal expansion coefficients of the materials at 30 to 300° C. are quite close to the values calculated based on the law of mixture using data on the respective materials in the document. Meanwhile, it is found that the thermal expansion coefficients of the composite materials at 30 to 600° C. and 30 to 900° C. are controllable within the ranges of 6.1 to 8.2×10⁻⁶/° C. and 6.4 to 8.4×10⁻⁶/° C., respectively. In view of the fact that the average thermal expansion coefficient at 30 to 900° C. of a honeycomb substrate that is mainly considered is 4.7 to 4.8×10⁻⁶/° C., a thermal expansion coefficient can be controlled to a value that is close to the value of the substrate depending on the composition selected. Thus, a composite material that is advantageous in terms of a bonding face with a substrate has been developed.

(Regarding Thermal Expansion Coefficients of Baked Bodies of $MoSi_2$/Si-Based Composite Materials)

Next, with respect to baked bodies of $MoSi_2$/Si-based composite materials, the thermal expansion coefficients at room temperature to 900° C. of baked bodies with different compositions and baking conditions are measured to determine whether or not the two-component-based composite materials can be applied to an electrode terminal, an electrode film, and a bonding material.

As the experimental method, sintered bodies of three types of compositions of $MoSi_2$/Si-based materials were machined into test pieces for measurement each having a width of 4 mm×a thickness of 3 mm×a length of 20 mm, and the test pieces were mounted on a thermo-mechanical analyzer. Then, linear thermal expansion coefficients at room temperature to 900° C. were measured under an $N_2$ atmosphere.

Figure 32:
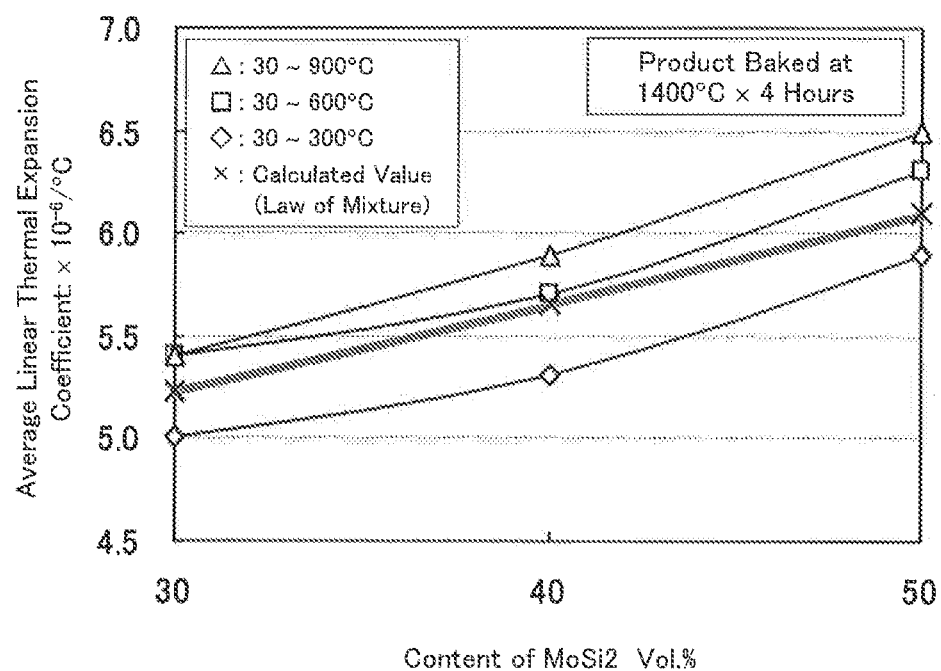
FIG. 32 is a diagram showing the relationship between the content of $MoSi_2$ and the average thermal expansion coefficient of a $MoSi_2$/Si composite material baked at 1400° C. for 4 hours.

Table 54 shows the thermal expansion coefficients in each temperature range of the test pieces of the three types of different compositions that have been obtained under three different baking conditions, and FIG. 32 shows the average linear expansion coefficients of the products baked at 1400° C. for 4 hours.

TABLE 54

Thermal Expansion Coefficients ($\times 10^{-6}/°$ C.) of Baked Bodies of Three Types of Compositions of $MoSi_2$/Si-Based Composite Materials

| Measurement Temperature (° C.) | Baked at 1250° C. for 1 Hr | | | Baked at 1350° C. for 4 Hr | | | Baked at 1400° C. for 4 Hr | | |
|---|---|---|---|---|---|---|---|---|---|
| $MoSi_2$ (Vol. %) | 50 | 40 | 30 | 50 | 40 | 30 | 50 | 40 | 30 |
| 30-300 | 5.8 | 5.3 | 4.7 | 6.1 | 5.5 | 4.9 | 5.9 | 5.3 | 5.0 |
| 30-600 | 6.5 | 5.9 | 5.4 | 6.5 | 5.8 | 5.3 | 6.3 | 5.7 | 5.4 |
| 30-900 | 6.7 | 6.2 | 5.7 | 6.5 | 5.9 | 5.4 | 6.5 | 5.9 | 5.4 |

From Table 54 and FIG. 32, it is found that the average thermal expansion coefficients at room temperature to 900° C. of the test pieces of the three types of compositions are 5.4 to 6.7×10⁻⁶/° C. Meanwhile, the thermal expansion coefficient at 30 to 900° C. of a honeycomb substrate for EHC made of SiC/Si, which is currently considered, is 4.7 to 4.8×10⁻⁶/° C. As there is only small difference between the thermal expansion coefficients, it can be said that the present $MoSi_2$/Si-based composite materials can be applied to an electrode terminal and an electrode film, and further to a bonding material for an electrode and an electrode film from the perspective of the thermal expansion coefficient.

Although the embodiments of the present invention have been described in detail with reference to the drawings, specific configurations are not limited to those described in the embodiments. Any design changes and the like that are within the spirit and scope of the present invention fall within the range of the present invention.

REFERENCE SIGNS LIST

1 Honeycomb substrate
1a Cell wall
1A Split part
2 Electrode film

3 Electrode terminal
4 External electrode
5 External circuit
5a Cable
5b Power supply
6 Outer tube (i.e., metal casing)
7 Bonding material
10, 10A, 10B Electrically heated catalytic converter (EHC)

The invention claimed is:

1. An electrode film provided on a surface of a honeycomb substrate with a catalyst coating layer, the electrode film being formed of a composite material comprising $MoSi_2$ and at least one of Si or SiC, the electrode film being a constituent element of an electrically heated catalytic converter, wherein a content of $MoSi_2$ of the electrode film is greater than 35 mass % of the electrode film, and the volume resistivity of the electrode film is lower than or equal to $1/1000$ of the volume resistivity of the honeycomb substrate.

* * * * *